(12) United States Patent
Bae et al.

(10) Patent No.: US 12,479,845 B2
(45) Date of Patent: Nov. 25, 2025

(54) IMIDAZOPYRIDINE DERIVATIVE COMPOUNDS AND USE OF SAME

(71) Applicant: HANMI PHARM. CO., LTD., Hwaseong-si (KR)

(72) Inventors: In Hwan Bae, Hwaseong-si (KR); Won Jeoung Kim, Hwaseong-si (KR); Ji Sook Kim, Hwaseong-si (KR); Ji Young Song, Hwaseong-si (KR); Jae Yul Choi, Hwaseong-si (KR); Min Jeong Kim, Hwaseong-si (KR); Jung Soo Nam, Hwaseong-si (KR); Young Gil Ahn, Hwaseong-si (KR)

(73) Assignee: HANMI PHARM. CO., LTD., Hwaseong-si (KR)

( * ) Notice: Subject to any disclaimer, the term of this patent is extended or adjusted under 35 U.S.C. 154(b) by 1154 days.

(21) Appl. No.: 17/426,896

(22) PCT Filed: Jan. 31, 2020

(86) PCT No.: PCT/KR2020/001491
§ 371 (c)(1),
(2) Date: Jul. 29, 2021

(87) PCT Pub. No.: WO2020/159285
PCT Pub. Date: Aug. 6, 2020

(65) Prior Publication Data
US 2022/0098205 A1    Mar. 31, 2022

(30) Foreign Application Priority Data

Feb. 1, 2019  (KR) .................. 10-2019-0013582
Jan. 31, 2020  (KR) .................. 10-2020-0011623

(51) Int. Cl.
*C07D 487/04*     (2006.01)
*C07D 487/08*     (2006.01)
*C07D 487/10*     (2006.01)
*C07D 491/048*    (2006.01)
*C07D 519/00*     (2006.01)

(52) U.S. Cl.
CPC ......... *C07D 487/04* (2013.01); *C07D 487/08* (2013.01); *C07D 487/10* (2013.01); *C07D 491/048* (2013.01); *C07D 519/00* (2013.01)

(58) Field of Classification Search
CPC .............................. C07D 487/04; A61P 35/00
See application file for complete search history.

(56) References Cited

U.S. PATENT DOCUMENTS

| | | |
|---|---|---|
| 8,815,854 B2 | 8/2014 | Ashwell et al. |
| 9,238,656 B2 | 1/2016 | Breslin et al. |
| 9,902,719 B2 | 2/2018 | Chen et al. |
| 10,064,854 B2 | 9/2018 | Johnson et al. |
| 10,968,221 B2 | 4/2021 | Wu et al. |
| 2006/0035921 A1 | 2/2006 | Castelhano et al. |
| 2017/0369487 A1 | 12/2017 | Wu et al. |
| 2019/0209548 A1 | 7/2019 | Sintim et al. |

FOREIGN PATENT DOCUMENTS

| | | |
|---|---|---|
| CN | 108530424 A | 9/2018 |
| WO | 2012/135113 A2 | 10/2012 |
| WO | 2012/177852 A1 | 12/2012 |
| WO | 2013/116291 A1 | 8/2013 |
| WO | 2016/007722 A1 | 1/2016 |
| WO | 2016/014674 A1 | 1/2016 |

OTHER PUBLICATIONS

Taiwanese Office Action issued Aug. 9, 2023 in TW Application No. 109103208.
Yujiang Shi, et al., "Histone Demethylation Mediated by the Nuclear Amine Oxidase Homolog LSD1", Cell, Dec. 29, 2004, pp. 941-953, vol. 119.
International Search Report for PCT/KR2020/001491 dated May 22, 2020.
Written Opinion for PCT/KR2020/001491 dated May 22, 2020.

*Primary Examiner* — Timothy P Thomas
(74) *Attorney, Agent, or Firm* — Sughrue Mion, PLLC

(57) ABSTRACT

Provided is a compound selected from a compound of chemical formula 1 having lysine-specific demethylase-1 (LSD1) inhibitory activity, and a tautomer, a stereoisomer, and a solvate thereof, and pharmaceutically acceptable salts of the aforementioned components. The compound is effective in the prevention or treatment of diseases caused by abnormal activation of LSD1. Also disclosed is a composition containing the compound as an active ingredient and its uses in preventing and/or treating diseases caused by abnormal activation of LSD1.

11 Claims, No Drawings

IMIDAZOPYRIDINE DERIVATIVE COMPOUNDS AND USE OF SAME

CROSS REFERENCE TO RELATED APPLICATIONS

This application is a National Stage of International Application No. PCT/KR2020/001491 filed Jan. 31, 2020, claiming priority based on Korean Patent Application No. 10-2019-0013582 filed Feb. 1, 2019 and Korean Patent Application No. 10-2020-0011623 filed Jan. 31, 2020.

TECHNICAL FIELD

The present disclosure relates to an imidazopyridine derivative compound and a use thereof, and more particularly, to an imidazopyridine derivative compound, or a tautomer, stereoisomer, or solvate thereof, having inhibitory activity against Lysine-specific histone demethylase-1 (LSD1) and a pharmaceutical composition including the imidazopyridine derivative compound.

BACKGROUND ART

Cancer stem cells or cancer-initiating cells have some pluripotent stem cell characteristics that contribute to the heterogeneity of cancer cells. These characteristics can make cancer cells more resistant to traditional therapies, such as chemotherapy or radiation therapy, and then cause recurrence after treatment. Therefore, efforts to develop anticancer drugs that are more advanced than conventional chemotherapy or radiation therapy are continuing.

Epigenetics is the study of the phenomenon whereby genetic expression patterns and activity are altered, and the genetic expression patterns and activity are inherited by the next generation without changes in the DNA sequence. Epigenetics research is focused on mechanisms such as DNA methylation, histone modification, and chromatin remodeling. Epigenetic modification has been found to be a major cause of outbreaks of various diseases. It was found that the onset and maintenance of epigenetic modification involve DNA methylation, histone modification, and genetic modifications relating to non-coding RNA (ncRNA), and many epigenetic regulatory genes are often mutated, or the expression of the epigenetic regulatory genes is abnormal in many cancers.

Lysine-specific histone demethylase-1 (LSD1, also known as KDM1A) may terminate a methyl group, thus regulating genetic expression that is important in terms of the development of cancer and cell proliferation (Shi, Y., et al., Histone demethylation mediated by the nuclear amine oxidase homolog LSD1. Cell, 2004. 119(7): p. 941-53).

The LSD1 inhibitors studied so far do not exhibit sufficiently selective inhibitory activity against LSD1 or have side effects such as showing resistance to drugs or showing toxicity to normal cells, and thus, there is a problem in that LSD1 inhibitors cannot be effectively used for the treatment of cancer and neoplastic diseases.

PRIOR ART DOCUMENT

Patent Document (Patent document 1) WO2016007722
(Patent document 2) WO2012135113

Non-Patent Document

Cell, 2004. 119(7): p. 941-953

DESCRIPTION OF EMBODIMENTS

Technical Problem

Provided is a novel imidazopyridine derivative compound having a sufficient inhibitory activity on Lysine-specific histone demethylase-1 (LSD1).

Provided is a pharmaceutical use of the novel compound for preventing or treating a disease caused by abnormal activation of LSD1.

Solution to Problem

An aspect of the present disclosure provides a compound represented by Formula 1, or a tautomer, stereoisomer, solvate, or pharmaceutically acceptable salt thereof:

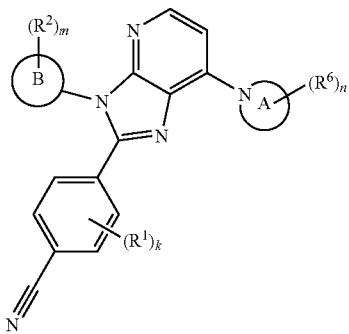

Formula 1

Another aspect of the present disclosure provides a pharmaceutical composition for preventing or treating a disease caused by abnormal activation of Lysine-specific demethylase-1 (LSD1), the pharmaceutical composition including: the compound represented by Formula 1, or a tautomer, stereoisomer, solvate, or pharmaceutically acceptable salt thereof as an active ingredient; and a pharmaceutically acceptable carrier.

Another aspect of the present disclosure provides a method of treating a disease caused by abnormal activation of LSD1, the method including administering, to a subject, a therapeutically effective amount of the compound represented by Formula 1, or a tautomer, stereoisomer, solvate, or pharmaceutically acceptable salt thereof.

Advantageous Effects of Disclosure

A compound selected from a compound of Formula 1, and a tautomer, stereoisomer, solvate, and pharmaceutically acceptable salt thereof, according to an aspect of present disclosure, or a pharmaceutical composition including the same according to another aspect of present disclosure can suppress Lysine-specific histone demethylase-1 (LSD1).

MODE OF DISCLOSURE

The present disclosure will be described in further detail.
Unless otherwise defined, all terms (including technical and scientific terms) used herein have the same meaning as commonly understood by one of ordinary skill in the art to which this invention belongs. Although exemplary methods or materials are listed herein, other similar or equivalent ones are also within the scope of the present invention. Also, the numerical values set forth herein are considered to include the meaning of "about" unless explicitly stated. All publications disclosed as references herein are incorporated in their entirety by reference.

An aspect of the present disclosure provides a compound represented by Formula 1, or a tautomer, stereoisomer, solvate, or pharmaceutically acceptable salt thereof:

Formula 1

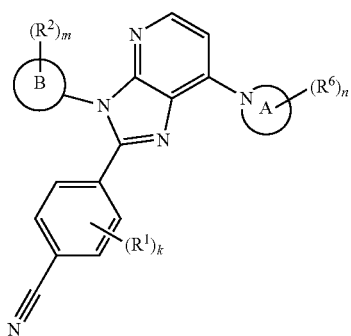

The term "alkyl" as used herein refers to a saturated monovalent hydrocarbon radical. For example, a $C_1$-$C_{20}$ alkyl refers to a $C_1$-$C_{20}$ linear or branched hydrocarbon. Examples of the alkyl include methyl, ethyl, n-propyl, i-propyl, n-butyl, i-butyl, and t-butyl, but embodiments are not limited thereto. The term "alkoxy" as used herein refers to —O— alkyl. The term "alkylthio" as used herein refers to —S— alkyl. The term "alkylcarbonyl" refers to an alkyl group which is the same as defined above while being bonded via a carbonyl group (—C(=O)—).

The term "alkenyl" as used herein refers to a monovalent hydrocarbon radical including one or more carbon-carbon double bond (C=C). For example, a $C_2$-$C_{20}$ alkenyl refers to a $C_2$-$C_{20}$ linear or branched hydrocarbon. Each double bond may have an E- or Z-steric configuration. Examples of the alkenyl group are vinyl, 2-propenyl, and 2-butenyl, but are not limited thereto.

The term "alkynyl" as used herein refers to a monovalent hydrocarbon radical having one or more carbon-carbon triple bonds (C≡C). For example, the $C_2$-$C_{20}$ alkynyl refers to a 2 to 20 carbon atoms ($C_2$-$C_{20}$) linear or branched hydrocarbon. Examples of the alkynyl include ethynyl, 2-propynyl, and 2-butynyl, but embodiments are not limited thereto.

The double bond of the alkenyl group and the triple bond of the alkynyl group may each be located at any location of a corresponding group, in which as long as each compound is sufficiently stable and suitable for the desired purpose, such as for use as a medicinal substance, a substituted alkyl group, a substituted alkenyl group, and a substituted alkynyl group may be substituted at any position. The term "halogen" as used herein includes fluorine, chlorine, bromine, or iodine, but are not limited thereto. The term "halo $C_1$-$C_6$ alkyl" as used herein refers to a halogen atom-substituted $C_1$-$C_6$ alkyl group, for example, a trifluoromethyl.

The term "$C_1$-$C_6$ alkoxy group" as used herein refers to a group in which the end of "$C_1$-$C_6$ alkyl group" is bonded to an oxygen atom. Examples thereof are a methoxy group, an ethoxy group, a propoxy group, an isopropoxy group, a butoxy group, an isobutoxy group, a sec-butoxy group, a tert-butoxy group, a pentoxy group, an isopentoxy group, a 2-methylbutoxy group, a neopentoxy group, a hexyloxy-group, a 4-methylpentoxy group, a 3-methylpentoxy group, and a 2-methylpentoxy group.

The term "$C_1$-$C_3$ alkoxy $C_1$-$C_6$ alkyl group" as used herein refers to a $C_1$-$C_6$ alkyl group that is substituted with a $C_1$-$C_3$ alkoxy group. The substitution location of the alkoxy group may be the carbon atom at the end of the alkyl group, but is not limited thereto. Examples thereof are a methoxymethyl group, an ethoxymethyl group, a propoxymethyl group, a 3-methoxypropyl group, a 3-ethoxypropyl group, a 4-methoxybutyl group, a 5-methoxypentyl group, and a 6-methoxyhexyl group.

The term "amine" or "amino" as used herein refers to a unsubstituted or substituted —$NH_2$. The term "alkylamino group" as used herein refers to an amino group which is bonded to a parent molecular moiety via at least one alkyl group. The alkylamino group refers to a group of compounds in which nitrogen of —$NH_2$ is bonded to at least one alkyl group, for example, a $C_1$-$C_{15}$ alkyl group. Examples of the alkylamino group are a benzylamino group, a methylamino group, an ethylaminophenethylamino group, and a cyclopropyl-methyl-amino group. The term "dialkylamino" as used herein refers to a group in which nitrogen of —$NH_2$ is bonded to two additional alkyl groups. Examples of the dialkylamino group are dimethylamino and diethylamino.

The term "carboxyl" as used herein refers to a unsubstituted or substituted —$CO_2H$. For example, a carboxyl group substituted with a $C_1$-$C_{20}$ alkyl may be a carboxylester group (—C(=O)OR') (herein, $R^1$ refers to $C_1$-$C_{20}$ alkyl).

The terms "a carbocyclic group," "carbocycle," "carbocyclyl," and "carbocyclic ring" as used herein may be exchangeable. The term "$C_3$-$C_{30}$ carbocyclic group" as used herein refers to a $C_3$ to $C_{30}$ monocyclic, bicyclic, or polycyclic group, each including only carbon as a ring-forming atom. The term "bicarbocyclic group" as used herein refers to a bicyclic carbocyclic group. The $C_3$-$C_{30}$ carbocyclic group may be an aromatic carbocyclic group or a non-aromatic carbocyclic group. For example, the $C_3$-$C_{30}$ carbocyclic group may be a ring such as a benzene, a monovalent group such as a phenyl group or a bivalent group such as a phenylene group. In one or more embodiments, according to the number of substituents linked to the $C_3$-$C_{30}$ carbocyclic group, the $C_3$-$C_{30}$ carbocyclic group may be variously changed into, for example, a trivalent group or a quadrivalent group. For example, the $C_3$-$C_{20}$ carbocyclic group refers to a $C_2$ to $C_{20}$ aromatic or non-aromatic, saturated or unsaturated hydrocarbon. The carbocyclic group may be, for example, a $C_3$-$C_{15}$ carbocyclic group, a $C_3$-$C_{20}$ cycloalkyl group, a $C_3$-$C_{20}$ cycloalkenyl group, a $C_3$-$C_{20}$ cycloalkynyl group, or a $C_6$-$C_{20}$ aryl group. Examples of the carbocyclic group are a cyclopropane, a cyclobutane, a cyclopentane, a cyclopentene, a cyclohexane, a cyclohexene, a bicyclo[2.1.1]hexane, a bicyclo[2.2.1]heptane, a bicyclo[2.2.1]heptene, a bicyclo[3.1.1]heptane, a bicyclo[3.1.1]heptyl, a bi[2.2.2]octane, a adamantane, benzene, a pyridine, a pyridazine, a pyrimidine, a pyrazine, a pyrrole, a pyrazole, an indole, a pyrazolopyridine, a pyrrolopyridine, a benzimidazole, a benzopyrazole, a benzothiophene, a quinoline, a benzothiazole, an indazole, a benzofuran, a benzodioxine, a benzopyran, an indane, a naphthalene, and an anthracene, wherein a carbocyclic group of each of these groups may be independently substituted with at least one substituent described in the present application.

The terms "heterocyclic group," "heterocycle," "heterocyclyl," and "heterocyclic ring" as used herein may be exchangeable. The term "$C_1$-$C_{30}$ heterocyclic group" as used herein refers to a group which has the same structure as the $C_3$-$C_{30}$ carbocyclic group, and, as a ring-forming atom, in addition to carbon (the number of carbon atoms may be from 1 to 30), at least one hetero atom selected from N, O, P, and S. The heterocyclic group may be, for example, a $C_1$-$C_{20}$ heterocycloalkyl group, a $C_1$-$C_{15}$ heterocycloalkyl group, a $C_2$-$C_{20}$ heterocycloalkenyl group, a $C_3$-$C_{20}$ heterocycloalkynyl group, or $C_2$-$C_{20}$ heteroaryl group, and may be classified into, for example, a monocyclic group, a bicyclic group, or a tricyclic group, depending on the number of cycles. Examples of the monoheterocyclic group are a piperidinyl, a pyrrolidinyl, a piperazinyl, an azepinyl, a pyrrolyl, a pyrazolyl, an oxetanyl, a pyrazolinyl, an imidazolyl, an imidazolinyl, an imidazolidinyl, a triazolyl, an oxazolyl, an oxazolidinyl, an isoxazolinyl, an isoxazolyl, a thiazolyl, a thiadiazolyl, a thiazolidinyl, an isothiazolyl, an isothiazolidinyl, a furyl, a tetrahydrofuryl, a thienyl, an oxadiazolyl, a 2-oxopiperazinyl, a 2-oxopiperidinyl, a 2-oxopyrrolodinyl, a 2-oxoazepinyl, a 4-piperidonyl, a pyridyl, a pyridyl N-oxide, a pyrazinyl, a pyrimidinyl, a pyridazinyl, a tetrahydropyranyl, a morpholinyl, a thiamorpholinyl, a thiamorpholinyl sulfoxide, and a thiamorpholinyl sulfone.

The term "heterobicyclic" as used herein refers to a heterocycle that is defined as described above and fused with a heterocycle or one or more other cycles. Examples of the heterobicyclic group are an indolyl, a dihydroindolyl, an octahydroindole, an octahydroisoindole, a benzothiazolyl, a benzoxazinyl, a benzoxazolyl, a benzothienyl, a benzothiazinyl, a quiquinuclidinyl, a quinolinyl, a tetrahydroquinolinyl, a decahydroquinolinyl, an isoquinolinyl, a tetrahydroisoquinolinyl, a decahydroisoquinolinyl, an azabicyclooctanyl, a benzimidazolyl, a benzopyranyl, an indolizinyl, a benzofuryl, a chromonyl, a kumarinyl, a benzopyranyl, a sinolinyl, a quinoxalinyl, an indazolyl, a pyrrolopyridyl, a furopyridinyl, a dihydroisoindolyl, a dihydroquinazolinyl, and a phthalazinyl.

Examples of the heterotricyclic group are a carbazolyl, a dibenzoazepinyl, a dithienoazepinyl, a benzindolyl, a phenanthrolinyl, an acridinyl, a phenanthridinyl, a phenoxazinyl, a phenothiazinyl, a xanthenyl, and a carbolinyl.

The term "cycloalkyl" as used herein refers to a substituted or unsubstituted cyclic alkyl. For example, the $C_3$-$C_{20}$ cycloalkyl may be a monovalent saturated hydrocarboncyclic system having 3 to 20 carbon atoms. The cycloalkyl group may be a monocyclic or multicyclic (for example, bicyclic, or tricyclic). Examples of the cycloalkyl are cyclopropyl, cyclobutyl, cyclopentyl, cyclohexyl, cycloheptyl, and cyclooctyl, but are not limited thereto. The term "cycloalkoxy" refers to —O— cycloalkyl. For example, the $C_3$-$C_9$ cycloalkoxy may include a cyclopropyloxy group, a cyclobutyloxy group, a cyclopentyloxy group, or the like.

The term "$C_3$-$C_{20}$ cycloalkenyl" as used herein refers to a monovalent non-aromatic hydrocarbon cyclic system having 3 to 20 carbon atoms and at least one carbon-carbon double bond (C=C). Examples thereof are a cyclopentenyl, a cyclohexenyl, and a cycloheptenyl, but are not limited thereto.

The term "$C_3$-$C_{20}$ cycloalkynyl" as used herein refers to a monovalent non-aromatic hydrocarbon cyclic system having 3 to 20 carbon atoms and at least one carbon-carbon triple bond. Examples thereof are a cyclopropynyl, a cyclobutynyl, a cyclopentynyl, a cycloehxynyl, and a cycloheptynyl, but are not limited thereto.

The term "heterocycloalkyl" as used herein refers to a monocyclic or bicyclic or more, substituted or unsubstituted monovalent unsaturated hydrocarbon cyclic system that has at least one hetero atom, for example, one to four hetero atoms (for example, O, N, P, or S). For example, the $C_1$-$C_{20}$ heterocycloalkyl may include a cycloalkyl having at least one hetero atom and 2 to 20 carbon atoms. For example, the heterocycloalkyl may include a 5 to 8-membered monocyclic system, a 8 to 12-membered bicyclic system, or a 11 to 14-membered tricyclic system. Examples of the mono heterocycloalkyl are a piperazinyl, a piperidinyl, a pyrrolidinyl, a morpholinyl, an imidazolidinyl, a tetrahydrofuranyl, a diazabicyclooctanyl, a diazaspirooctanyl, and a group that is similar to these, but are not limited thereto.

The term "$C_2$-$C_{20}$ heterocycloalkenyl" as used herein refers to a monovalent unsaturated hydrocarbon cyclic system having at least one hetero atom (for example, O, N, P, or S) and at least one carbon-carbon double bond (C=C). For example, the heterocycloalkenyl may be a non-aromatic 5 to 8-membered monocyclic system, a 8 to 12-membered bicyclic system, or a 11 to 14-membered tricyclic system.

The term "$C_2$-$C_{20}$ heterocycloalkynyl" as used herein refers to a monovalent unsaturated hydrocarbon cyclic system having at least one hetero atom (for example, O, N, P, or S) and at least one carbon-carbon triple bond (C≡C). Examples of the heterocycloalkynyl are a cycloprophinyl, a cyclobutynyl, a cyclopentynyl, a cyclohexynyl, and a cycloheptynyl, but are not limited thereto.

The term "aryl" as used herein refers to, for example, a $C_6$-$C_{20}$ monovalent aromatic hydrocarbon that is induced by removing a single hydrogen atom from a single carbon atom in a parent aromatic cyclic system. The aryl may include a saturated bicyclic radical including an aromatic ring fused with a partially unsaturated ring. Examples of the aryl group are a radical induced by benzene(phenyl), a substituted phenyl, a substituted biphenyl, a substituted naphthyl, a substituted tolyl, a substituted naphthalenyl, a substituted anthracenyl, a substituted indenyl, and a substituted indanyl. The term "aryloxy" refers to —O— aryl. The term "arylthio" refers to —S— aryl.

The term "heteroaryl" as used herein refers to a monocyclic or bicyclic or more aromatic group having at least one hetero atom, for example, one to four hetero atoms independently selected from nitrogen, oxygen, phosphorous, and sulfur. Examples of the monocyclic or bicyclic heteroaryl group are a pyrrolyl, a pyrazolyl, an imidazolyl, a triazolyl, an oxazolyl, an isoxazolyl, a thiazolyl, a tetrazole, an isothiazolyl, a furyl, a thienyl, a 2-pyridyl, a 3-pyridyl, a 4-pyridyl, a pyridyl N-oxide, a pyrazinyl, a pyrimidinyl, a pyridazinyl, an indolyl, a benzothiazolyl, a benzoxazolyl, a benzothienyl, a quinolinyl, an isoquinolinyl, a benzimidazolyl, and a benzofuryl. The term "heteroaryloxy" refers to —O— heteroaryl. The term "heteroarylthio" refers to S-heteroaryl. The heteroaryl may include a fused ring system of, for example, 5-, 6-, or 7-membered ring (at least one of which is aromatic).

The terms "carbocyclic, heterocyclic, alkyl, alkoxy, alkenyl, alkynyl, cycloalkyl, cycloalkoxy, cycloalkenyl, heterocycloalkyl, heterocycloalkenyl, aryl, aryloxy, arylthio, heteroaryl, heteroaryloxy, heteroarylthio, or amine" may each independently be substituted with at least one substituent described in the present application.

The term "hetero" as used herein refers to, unless defined otherwise, inclusion of at least one hetero atom selected from N, O, S, and P in a corresponding formula.

The term "spiro" as used herein refers to, unless defined otherwise, two rings sharing one atom, wherein the two rings are linked to each other via a bridge. The term "spirocycloalkyl" refers to, unless defined otherwise, a saturated carbocycle forming two rings, wherein the two rings share a single carbon atom as a part of a ring. Examples of the spirocycloalkyl are a 7 to 12-membered spirocycloalkyl, for example, a diazaspiro[3.5]nonanyl group, a diazaspiro[4.4]nonanyl group, a diazaspiro[4.5]decanyl group, and a diazaspiro[5.5]undecanyl group, but are not limited thereto. The term "hetero spirocycloalkyl" refers to, unless defined otherwise, a spirocycloalkyl containing at least one hetero atom selected from O, N, and S. The term "spiro linkage" refers to a linking group that shares one atom, unless stated otherwise.

The term "substitution" as used herein refers to, unless defined otherwise in the present application, replacing of at least one hydrogen atom with a substituent selected from a halogen atom (for example F, Cl, Br, or I), a cyano group, a hydroxyl group, a thiol group, a nitro group, an amino group, an imino group, an azido group, an amidino group, a hydrazino group, a hydrazono group, an oxo group, a carbonyl group, a carbamyl group, an ester group, an ether group, a carboxyl group or salt thereof, a sulfonic group or salt thereof, a phosphoric acid or salt thereof, a $C_1$-$C_6$ alkyl group, a halo $C_1$-$C_6$ alkyl group, a $C_2$-$C_6$ alkenyl group, a halo $C_2$-$C_6$ alkenyl group, a $C_2$-$C_6$ alkynyl group, a halo $C_2$-$C_6$ alkynyl group, a $C_1$-$C_6$ alkoxy group, a halo $C_1$-$C_6$ alkoxy group, a $C_1$-$C_{20}$ alkylthio group, a $C_3$-$C_{20}$ carbocyclic group (for example, a $C_3$-$C_9$ cycloalkyl group, a halo $C_3$-$C_9$ cycloalkyl group, a $C_3$-$C_9$ cycloalkenyl group, a halo $C_3$-$C_9$ cycloalkenyl group, a $C_1$-$C_9$ heterocycloalkyl group, a halo $C_1$-$C_9$ heterocycloalkyl group, a $C_2$-$C_9$ heterocycloalkenyl group, a halo $C_2$-$C_9$ heterocycloalkenyl group), a $C_1$-$C_{20}$ heterocyclic group (for example, a $C_6$-$C_{20}$ aryl group, a $C_6$-$C_{20}$ aryloxy group, a $C_6$-$C_{20}$ arylthio group, a $C_2$-$C_{20}$ heteroaryl group, a $C_2$-$C_{20}$ heteroaryloxy group, a $C_2$-$C_{20}$ heteroarylthio group), —N($Q_a$)($Q_b$), —C(=O)($Q_a$), —N—C(=O)($Q_a$), —N—C(=O)—N($Q_a$)($Q_b$), —O—C(=O)($Q_a$), S(=O)($Q_a$), —S(=O)$_2$($Q_a$), —P(=O)($Q_a$)($Q_b$), and —N—C(=NH)—N($Q_a$)($Q_b$), $Q_a$ and $Q_b$ may each independently be any one selected from hydrogen, a halogen, a cyano group, a hydroxy group, a thiol group, a nitro group, a carboxylic group, a $C_1$-$C_6$ alkyl group, a halo $C_1$-$C_6$ alkyl group, a $C_2$-$C_6$ alkenyl group, a halo $C_2$-$C_6$ alkenyl group, a $C_2$-$C_6$ alkynyl group, a halo $C_2$-$C_6$ alkynyl group, a $C_3$-$C_9$ cycloalkyl group, a halo $C_3$-$C_9$ cycloalkyl group, a $C_3$-$C_9$ cycloalkenyl group, a halo $C_3$-$C_9$ cycloalkenyl group, a $C_1$-$C_9$ heterocycloalkyl group, a halo $C_1$-$C_9$ heterocycloalkyl group, a $C_2$-$C_9$ heterocycloalkenyl group, a halo $C_2$-$C_9$ heterocycloalkenyl group, a $C_1$-$C_6$ alkoxy group, a halo $C_1$-$C_6$ alkoxy group, —N($Q_c$)($Q_d$), —N—C(=O)($Q_c$), —N—C(=O)—N($Q_c$)($Q_d$), and —N—C(=NH)—N($Q_c$)($Q_d$), and $Q_c$ and $Q_d$ may each independently be any one selected from hydrogen, a halogen, a hydroxyl group, a thiol group, an amino group, a carboxylic group, a $C_1$-$C_6$ alkyl group, a halo $C_1$-$C_6$ alkyl group, a $C_1$-$C_6$ alkylamino group, a $C_1$-$C_6$ dialkylamino group, a $C_3$-$C_6$ cycloalkyl group, a halo $C_3$-$C_6$ cycloalkyl group, a $C_1$-$C_{12}$ heterocycloalkyl group, a halo $C_1$-$C_{12}$ heterocycloalkyl group, a $C_1$-$C_6$ alkoxy group, and a halo $C_1$-$C_6$ alkoxy group.

In one embodiment, A in $C_A$ refers to the number of carbon atoms in a substituted or unsubstituted hydrocarbon, and in the case of the substituted hydrocarbon, the number of carbon atoms includes the number of carbon atoms of the substituted group. For example, in the case of the substituted $C_3$-$C_{20}$ carbocyclic, the substituted $C_1$-$C_{20}$ heterocyclic, the substituted $C_1$-$C_{20}$ alkyl, the substituted $C_1$-$C_{20}$ alkoxy, the substituted $C_2$-$C_{20}$ alkenyl, the substituted $C_2$-$C_{20}$ alkynyl, the substituted $C_3$-$C_{20}$ cycloalkyl, the substituted $C_3$-$C_{20}$ cycloalkoxy, the substituted $C_3$-$C_{20}$ cycloalkenyl, the substituted $C_1$-$C_{20}$ heterocycloalkyl, the substituted $C_1$-$C_{20}$ heterocycloalkenyl, the substituted $C_6$-$C_{20}$ aryl, the substituted $C_6$-$C_{20}$ aryloxy, the substituted $C_6$-$C_{20}$ arylthio, the substituted $C_2$-$C_{20}$ heteroaryl, the substituted $C_2$-$C_{20}$ heteroaryloxy, or the substituted $C_2$-$C_{20}$ heteroarylthio, the number of carbon atoms including the carbon atoms of the substituted substituent may be 20 or less.

The present inventors have made intensive efforts to develop new anticancer drugs by targeting Lysine-specific histone demethylase-1 (LSD1) as an important target for cancer therapy, and have developed a novel imidazopyridine derivative compound represented by Formula 1 that can sufficiently inhibit LSD1 that involves in the transcription of several genes important for cancer progression and cell proliferation from epigenetic perspectives.

In one embodiment, in Formula 1,

Ⓑ may be a $C_3$-$C_{14}$ carbocyclic group or a $C_1$-$C_{14}$ heterocyclic group;

$R^1$(s) may each independently be any one selected from hydrogen, a halogen, a cyano group, a hydroxy group, a thiol group, a nitro group, an amino group, a $C_1$-$C_3$ alkyl group, a halo $C_1$-$C_3$ alkyl group, a $C_1$-$C_3$ alkoxy group, and a halo $C_1$-$C_3$ alkoxy group;

$R^2$(s) may each independently be any one selected from hydrogen, a halogen, a cyano group, a hydroxy group, an acetyloxy group, a thiol group, a nitro group, an amino group, a $C_1$-$C_6$ alkyl group, a halo $C_1$-$C_6$ alkyl group, a $C_2$-$C_6$ alkenyl group, a halo $C_2$-$C_6$ alkenyl group, a $C_2$-$C_6$ alkynyl group, a $C_1$-$C_6$ alkylhydroxy group, a $C_1$-$C_6$ alkoxy group, a halo $C_1$-$C_6$ alkoxy group, a $C_1$-$C_3$ alkoxy$C_1$-$C_6$ alkyl group, a $C_3$-$C_9$ cycloalkyl group, a halo $C_3$-$C_9$ cycloalkyl group, a $C_3$-$C_9$ cycloalkoxy group, a $C_3$-$C_9$ cycloalkenyl group, —N($Q_5$)($Q_6$), —C(O)N($Q_5$)($Q_6$), —O—($C_1$-$C_6$ alkyl)-N($Q_5$)($Q_6$), $C_3$-$C_9$ heterocycloalkyl group, a $C_3$-$C_9$ heterobi cycloalkyl group, and a $C_3$-$C_9$ heterocycloalkenyl group, In this regard, $Q_5$ and $Q_6$ may each independently be any one selected from hydrogen, a $C_1$-$C_6$ alkyl group, a $C_2$-$C_6$ alkenyl group, a $C_1$-$C_6$ alkoxy group, and a $C_3$-$C_6$ cycloalkyl group, each of which may be unsubstituted or substituted with one to four substituents independently selected from halogen, a hydroxy group, an amino group, a $C_1$-$C_3$ alkyl group, and a $C_1$-$C_3$ alkoxy, In this regard, $Q_5$ and $Q_6$ may form, together with a nitrogen atom to which they are bonded, a $C_3$-$C_8$ heterocyclic group or a $C_6$-$C_{14}$ heterobicyclic group, and the $C_3$-$C_8$ heterocyclic group or the $C_6$-$C_{14}$ heterobicyclic group may be unsubstituted or substituted with any one substituent selected from halogen, a cyano group, a hydroxyl group, an acetyloxy group, a thiol group, a nitro group, an amino group, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy($C_1$-$C_6$ alkyl)amino group, a $C_1$-$C_3$ alkoxydi($C_1$-$C_3$ alkyl)amino group $C_3$-$C_6$ cycloalkyl($C_1$-$C_3$ alkyl) amino group, a $C_1$-$C_3$ alkoxy group, a halo $C_1$-$C_3$ alkoxy group, a $C_1$-$C_3$ alkoxy$C_1$-$C_6$ alkyl group, a $C_3$-$C_6$ cycloalkyl group, and a halo $C_3$-$C_6$ cycloalkyl group;

may be any one selected from a piperidinyl group, a pyrrolidinyl group, a piperazinyl group, an azepanyl group, a diazaspiro$C_5$-$C_{14}$cyclic group, a pyridinyl group, a pyridazinyl group, a pyrimidinyl group, a pyrazinyl group, a pyrazolyl group, an indolyl group, a dihydroindolyl group, a octahydroindolyl group, a octahydroisoindolyl group, a furopyrrolyl group, a pyrrolopyridinyl group, an azabicyclo $C_5$-$C_{10}$ alkanyl group, and a diazabicyclo $C_8$-$C_{12}$ cyclic group;

$R^6$(s) may each independently be any one selected from hydrogen, a halogen, a cyano group, a hydroxy group, a thiol group, a nitro group, an amino group, a $C_1$-$C_6$ alkyl group, a halo $C_1$-$C_6$ alkyl group, a $C_1$-$C_6$ alkylhydroxy group, a $C_2$-$C_6$ alkenyl group, a halo $C_2$-$C_6$ alkenyl group, a $C_2$-$C_6$ alkynyl group, a halo $C_2$-$C_6$ alkynyl group, a $C_3$-$C_9$ cycloalkyl group, a halo $C_3$-$C_9$ cycloalkyl group, a $C_1$-$C_6$ alkoxy group, a halo $C_1$-$C_6$ alkoxy group, a $C_1$-$C_3$ alkylamino group, a $C_1$-$C_3$ dialkylamino group, a $C_3$-$C_6$ cycloalkylamino group, and a halo $C_1$-$C_3$ alkylamino group;

k may be an integer from 0 to 4, wherein, when k is 2 or more, two or more $R^1$(s) may be identical to or different from each other;

m may be an integer from 0 to 8, wherein, when m is 2 or more, two or more $R^2$(s) may be identical to or different from each other;

n may be an integer from 0 to 10, wherein, when n is 2 or more, two or more $R^6$(s) may be identical to or different from each other; and the heterocyclic group, the heterocycloalkyl group, the heterocycloalkenyl group, and the heterobicyclic group each refer to a substituted group in which a ring-forming carbon is substituted with at least one atom selected from O, N, P, and S.

In one embodiment, $$\text{B}$$

in Formula 1 may be a $C_3$-$C_{14}$ carbocyclic group or a $C_1$-$C_{14}$ heterocyclic group, and, for example, a $C_3$-$C_{12}$carbocyclic group, a $C_1$-$C_{12}$ heterocyclic group, a $C_7$-$C_{14}$ bicarbocyclic group, or a bicyclic $C_5$-$C_{14}$ heterocyclic group. In one embodiment, may be any one selected from a phenyl group, a pyridinyl group, a pyridazinyl group, a pyrimidinyl group, a pyrazinyl group, a pyrrolyl group, a pyrazolyl group, an indolyl group, a pyrazolopyridinyl group, a pyrrolopyridinyl group (for example, a pyrrolo[2,3-b]pyridinyl group), a benzimidazolyl group (for example, benzo[d]thiazolyl group), a benzopyrazolyl group, a benzothiophenyl group, a quinolinyl group, a benzothiazolyl group, an indazolyl group, a furopyrrolyl group (for example, furo[3,4-c]pyrrolyl group), a tetrahydro-furo[3,4-c]pyrrolyl group, a benzofuranyl group, a benzodioxinyl group, a benzopyranyl group, an indanyl group, an indenyl group, a dihydroindenyl group, a naphthyl group, a cyclopentyl group, a cyclohexyl group, and a cycloheptyl group.

In one embodiment, $R^1$ in Formula 1 may be any one selected from hydrogen, a halogen, a cyano group, a hydroxy group, a thiol group, a nitro group, an amino group, a substituted or unsubstituted $C_1$-$C_3$ alkyl group, and a substituted or unsubstituted $C_1$-$C_3$ alkoxy group, and, in this regard, the substituent may be any one selected from halogen, a cyano group, a hydroxy group, a thiol group, a nitro group, and an amino group. In one embodiment, $R^1$ may be any one selected from hydrogen, a halogen, a cyano group, a hydroxy group, a thiol group, a nitro group, an amino group, a $C_1$-$C_3$ alkyl group, a halo $C_1$-$C_3$ alkyl group, a $C_1$-$C_3$ alkoxy group, and a halo $C_1$-$C_3$ alkoxy group.

In one embodiment, $R^1$ may be any one selected from hydrogen, a halogen, a cyano group, a hydroxy group, an amino group, a $C_1$-$C_3$ alkyl group, and a $C_1$-$C_3$ alkoxy group.

In one embodiment, $R^2$ in Formula 1 may be any one selected from hydrogen, a halogen, a cyano group, a hydroxy group, an acetyloxy group, a thiol group, a nitro group, an amino group, a substituted or unsubstituted $C_1$-$C_6$ alkyl group, a substituted or unsubstituted $C_2$-$C_6$ alkenyl group, a substituted or unsubstituted $C_2$-$C_6$ alkynyl group, a substituted or unsubstituted $C_1$-$C_6$ alkoxy group, a substituted or unsubstituted $C_3$-$C_9$ cycloalkyl group, a substituted or unsubstituted $C_3$-$C_9$ cycloalkoxy group, a substituted or unsubstituted $C_3$-$C_9$ cycloalkenyl group, —N($Q_5$)($Q_6$), —C(O)N($Q_5$)($Q_6$), —O—($C_1$-$C_6$ alkyl)-N($Q_5$)($Q_6$), a substituted or unsubstituted $C_3$-$C_9$ heterocycloalkyl group, a substituted or unsubstituted bicyclic$C_3$-$C_9$ heterocycloalkyl group, and a substituted or unsubstituted $C_3$-$C_9$ heterocycloalkenyl group. In this regard, the substituent may be any one selected from halogen, a cyano group, a hydroxy group, a thiol group, a nitro group, an amino group, a $C_1$-$C_3$ alkyl group, and a $C_1$-$C_3$ alkoxy group.

In one embodiment, $R^2$ may include any one selected from hydrogen, a halogen, a cyano group, a hydroxy group, an acetyloxy group, a thiol group, a nitro group, an amino group, a $C_1$-$C_6$ alkyl group, a halo $C_1$-$C_6$ alkyl group, a $C_2$-$C_6$ alkenyl group, a halo $C_2$-$C_6$ alkenyl group, a $C_2$-$C_6$ alkynyl group, a $C_1$-$C_6$ alkylhydroxy group, a $C_1$-$C_6$ alkoxy group, a halo $C_1$-$C_6$ alkoxy group, a $C_1$-$C_3$ alkoxy$C_1$-$C_6$ alkyl group, a $C_3$-$C_9$ cycloalkyl group, a halo $C_3$-$C_9$ cycloalkyl group, a $C_3$-$C_9$ cycloalkoxy group, a $C_3$-$C_9$ cycloalkenyl group, —N($Q_5$)($Q_6$), —C(O)N($Q_5$)($Q_6$), —O—($C_1$-$C_6$ alkyl)-N($Q_5$)($Q_6$), a $C_3$-$C_9$ heterocycloalkyl group, a bicyclic $C_3$-$C_9$ heterocycloalkyl group, and a $C_3$-$C_9$ heterocycloalkenyl group.

$Q_5$ and $Q_6$ may each independently be any one selected from hydrogen, a $C_1$-$C_6$ alkyl group, a $C_2$-$C_6$ alkenyl group, a $C_1$-$C_6$ alkoxy group, and a $C_3$-$C_6$ cycloalkyl group, each of which may be unsubstituted or substituted with one to four substituents independently selected from halogen, a hydroxy group, an amino group, a $C_1$-$C_3$ alkyl group, and a $C_1$-$C_3$ alkoxy.

In this regard, $Q_5$ and $Q_6$ may form, together with a nitrogen atom to which they are bonded, a $C_3$-$C_8$ heterocyclic group or bicyclic $C_6$-$C_{14}$ heterocyclic group, and the $C_3$-$C_8$ heterocyclic group or the bicyclic $C_6$-$C_{14}$ heterocyclic group may be unsubstituted or substituted with any one substituent selected from halogen, a cyano group, a hydroxyl group, an acetyloxy group, a thiol group, a nitro group, an amino group, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy($C_1$-$C_6$ alkyl)amino group, a $C_1$-$C_3$ alkoxydi ($C_1$-$C_3$ alkyl)amino group, a $C_3$-$C_6$ cycloalkyl($C_1$-$C_3$ alkyl) amino group, a $C_1$-$C_3$ alkoxy group, a halo $C_1$-$C_3$ alkoxy group, a $C_1$-$C_3$ alkoxy $C_1$-$C_6$ alkyl group, a $C_3$-$C_6$ cycloalkyl group, and a halo $C_3$-$C_6$ cycloalkyl group.

In one embodiment, $R^2$ may be any one selected from hydrogen, a halogen, a cyano group, a hydroxy group, an acetyloxy group, a thiol group, a nitro group, an amino group, a $C_1$-$C_6$ alkyl group, a $C_2$-$C_6$ alkenyl group, a $C_2$-$C_6$ alkynyl group, a $C_1$-$C_3$ alkylamino group, a $C_1$-$C_3$ dialkylamino group, a $C_1$-$C_3$ alkoxy($C_1$-$C_6$ alkyl)amino group, a $C_1$-$C_3$ alkoxydi($C_1$-$C_3$ alkyl)amino group, a $C_1$-$C_3$ cycloalkyl($C_1$-$C_3$ alkyl)amino group, a $C_1$-$C_6$ alkoxy group, a $C_3$-$C_9$ cycloalkyl group, a $C_3$-$C_9$ cycloalkoxy group, a $C_3$-$C_9$ cycloalkenyl group, —C(O)-morpholinyl group, —O—($C_1$-$C_3$ alkyl)-morpholinyl group, a piperidinyl group, a pyrrolidinyl group, a piperazinyl group, an azetidinyl group, a morpholinyl group,

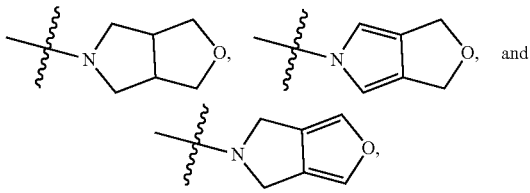

In this regard, a piperidinyl group, a pyrrolidinyl group, a piperazinyl group, an azetidinyl group, a morpholinyl group,

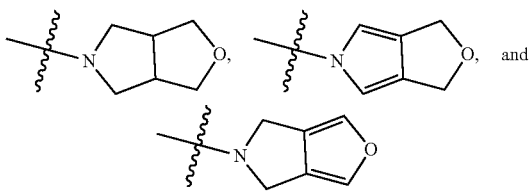

may be unsubstituted or substituted with any one substituent selected from:
halogen, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy group, a halo $C_1$-$C_3$ alkoxy group, and a $C_1$-$C_3$ alkoxy$C_1$-$C_3$ alkyl group.

In one embodiment,

may be any one selected from a piperidinyl group, a pyrrolidinyl group, a piperazinyl group, an azepanyl group, a diazaspiro$C_5$-$C_{14}$cyclic group, a pyridinyl group, a pyridazinyl group, a pyrimidinyl group, a pyrazinyl group, a pyrazolyl group, an indolyl group, a dihydroindolyl group, an octahydroindolyl group, an octahydroisoindolyl group, a furoyl group (for example, a furo[3,4-c]pyrrolyl group, a tetrahydro-1H-furo[3,4-c]pyrrolyl group), a pyrrolopyridinyl group (for example, a pyrrolo[2,3-c]pyridinyl group, an octahydro-6H-pyrrolo[2,3-c]pyridinyl group), an azabicyclo $C_8$-$C_{10}$ alkanyl group, and a diazabicyclo$C_8$-$C_{12}$cyclic group.

In one embodiment, $R^6$ in Formula 1 may be any one selected from hydrogen, a halogen, a cyano group, a hydroxy group, a thiol group, a nitro group, an amino group, a $C_1$-$C_6$ alkyl group, a halo $C_1$-$C_6$ alkyl group, a $C_1$-$C_6$ alkylhydroxy group, a $C_2$-$C_6$ alkenyl group, a halo $C_2$-$C_6$ alkenyl group, a $C_2$-$C_6$ alkynyl group, a halo $C_2$-$C_6$ alkynyl group, a $C_3$-$C_9$ cycloalkyl group, a halo $C_3$-$C_9$ cycloalkyl group, a $C_1$-$C_6$ alkoxy group, a halo $C_1$-$C_6$ alkoxy group, a $C_1$-$C_3$ alkylamino group, a $C_1$-$C_3$ dialkylamino group, a $C_3$-$C_6$ cycloalkylamino group, and a halo $C_1$-$C_3$ alkylamino group.

In one embodiment, in Formula 1, k may be an integer from 0 to 4, wherein, when k is 2 or more, two or more $R^1$(s) may be identical to or different from each other; m may be an integer from 0 to 8, wherein, when may be is 2 or more, two or more $R^2$(s) may be identical to or different from each other; and n may be an integer from 0 to 10, wherein, when n is 2 or more, two or more $R^6$(s) may be identical to or different from each other.

In one embodiment, the heterocyclic group, the heterocycloalkyl group, the heterocycloalkenyl group, and the heterobicyclic group in Formula 1 each refer to a group in which a ring-forming carbon is substituted with at least one atom selected from O, N, P, or S.

In one embodiment, in Formula 1,

may be any one selected from a phenyl group, a pyridinyl group, a pyridazinyl group, a pyrimidinyl group, a pyrazinyl group, a pyrrolyl group, a pyrazolyl group, an indolyl group, a pyrazolopyridinyl group, a pyrrolo[2,3-b]pyridinyl group, a benzothiazolyl group, an indazolyl group, a furo[3,4-c]-pyrrolyl group, an indanyl group, an indenyl group, and a cyclohexyl group;

$R^1$(s) may each independently be any one selected from hydrogen, a halogen, a hydroxy group, a thiol group, a $C_1$-$C_3$ alkyl group, a halo $C_1$-$C_3$ alkyl group, a $C_1$-$C_3$ alkoxy group, and a halo $C_1$-$C_3$ alkoxy group;

$R^2$(s) may each independently be any one selected from hydrogen, a halogen, a cyano group, a hydroxy group, an acetyloxy group, a thiol group, a nitro group, an amino group, a $C_1$-$C_6$ alkyl group, a halo $C_1$-$C_6$ alkyl group, a $C_2$-$C_6$ alkenyl group, a halo $C_2$-$C_6$ alkenyl group, a $C_1$-$C_3$ alkylamino group, a $C_1$-$C_3$ dialkylamino group, a $C_1$-$C_6$ alkylhydroxy group, a $C_1$-$C_6$ alkoxy group, a halo $C_1$-$C_6$ alkoxy group, a $C_1$-$C_3$ alkoxy$C_1$-$C_6$ alkyl group, a $C_3$-$C_9$ cycloalkyl group, a halo $C_3$-$C_9$ cycloalkyl group, a $C_3$-$C_6$ cycloalkoxy group, a $C_3$-$C_6$ cycloalkylamino group, a $C_3$-$C_6$ cycloalkyl($C_1$-$C_3$ alkyl)amino group, —C(O)-morpholinyl group, and —O—($C_1$-$C_3$ alkyl)-morpholinyl group, or any one heterocyclic compound selected from a piperidinyl group, a pyrrolidinyl group, a piperazinyl group, an azetidinyl group, a morpholinyl group,

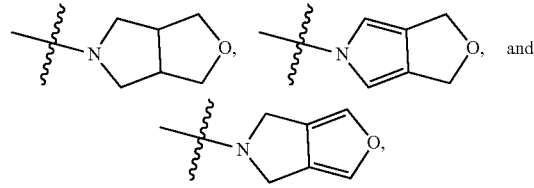

the heterocyclic compound may be unsubstituted or substituted with any one substituent selected from halogen, a cyano group, a hydroxyl group, an acetyloxy group, an amino group, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy group, a halo $C_1$-$C_3$ alkoxy group, and a $C_1$-$C_3$ alkoxy$C_1$-$C_3$ alkyl group;

may be any one selected from a piperidinyl group, a pyrrolidinyl group, piperazinyl group, an azepanyl group, a diazaspiroheptanyl group, a diazaspirononanyl group, a diazaspirodecanyl group, a diazaspiroundecanyl group, a diazabicyclononanyl group, a pyridinyl group, a pyridazinyl group, a pyrimidinyl group, a pyrazinyl group, a pyrazolyl group, a tetrahydro-1H-furo[3,4-c]pyrrolyl group, an octahydro-6H-pyrrolo[2,3-c]pyridinyl group, and an azabicycloC$_8$-C$_{10}$alkanyl group;

R$^6$(s) may each independently be any one selected from hydrogen, a halogen, a cyano group, a hydroxy group, a nitro group, a C$_1$-C$_6$ alkyl group, a halo C$_1$-C$_6$ alkyl group, a C$_1$-C$_6$ alkylhydroxy group, a C$_1$-C$_6$ alkoxy group, a halo C$_1$-C$_6$ alkoxy group, an amino group, a C$_1$-C$_3$ alkylamino group, a C$_1$-C$_3$ dialkylamino group, a C$_3$-C$_6$ cycloalkylamino group, and a halo C$_1$-C$_3$ alkylamino group;

k may be an integer from 0 to 4, wherein, when k is 2 or more, two or more R$^1$(s) may be identical to or different from each other;

m may be an integer from 0 to 4, wherein, when m is 2 or more, two or more R$^2$(s) may be identical to or different from each other, n may be an integer from 0 to 6, wherein, when n is 2 or more, two or more R$^6$ may be identical to or different from each other.

In one embodiment, in Formula 1,

may be any one selected from a phenyl group, a pyridinyl group, a pyridazinyl group, a pyrimidinyl group, a pyrazinyl group, a pyrrolyl group, a pyrazolyl group, an indolyl group, a pyrrolo[2,3-c]pyridinyl group, an indazolyl group, an indanyl group, a benzothiazolyl group, a tetrahydrofuro[3,4-c]pyrrolyl group, and a cyclohexyl group;

R$^1$(s) may each independently be any one selected from hydrogen, a halogen, a hydroxy group, a thiol group, a C$_1$-C$_3$ alkyl group, a halo C$_1$-C$_3$ alkyl group, a C$_1$-C$_3$ alkoxy group, and a halo C$_1$-C$_3$ alkoxy group;

R$^2$(s) may each independently be any one selected from hydrogen, a halogen, a cyano group, a hydroxy group, an acetyloxy group, a thiol group, a nitro group, an amino group, a C$_1$-C$_6$ alkyl group, a C$_2$-C$_6$ alkenyl group, a halo C$_1$-C$_6$ alkyl group, a C$_1$-C$_3$ alkoxyC$_1$-C$_6$ alkyl group, a C$_1$-C$_3$ alkylamino group, a C$_1$-C$_3$ dialkylamino group, a C$_1$-C$_3$ alkoxy(C$_1$-C$_6$ alkyl)amino group, a C$_1$-C$_3$ alkoxydi(C$_1$-C$_3$ alkyl)amino group, a C$_3$-C$_6$ cycloalkyl(C$_1$-C$_3$ alkyl)amino group, a C$_1$-C$_6$ alkoxy group, a halo C$_1$-C$_6$ alkoxy group, a C$_3$-C$_9$ cycloalkyl group, a C$_3$-C$_9$ cycloalkoxy group, a halo C$_3$-C$_9$ cycloalkyl group, a halo C$_3$-C$_9$ cycloalkoxy group, a piperidinyl group, a pyrrolidinyl group, a piperazinyl group, an azetidinyl group, a morpholinyl group, —C(O)-morpholinyl group, —O—(C$_1$-C$_3$ alkyl)-morpholinyl group, and

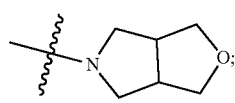 [SMILES: *N1CC2COCC2C1]

in this regard, the piperidinyl group, the pyrrolidinyl group, the piperazinyl group, the azetidinyl group, the morpholinyl group, the —C(O)-morpholinyl group, the —O—(C$_1$-C$_3$ alkyl)-morpholinyl group, or

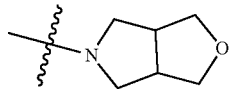 [SMILES: *N1CC2COCC2C1]

may be unsubstituted or substituted with any one substituent selected from halogen, a hydroxy group, an acetyloxy group, a C$_1$-C$_3$ alkyl group, a halo C$_1$-C$_3$ alkyl group, a C$_1$-C$_3$ alkylamino group, a C$_1$-C$_3$ dialkylamino group, a C$_3$-C$_6$ cycloalkyl(C$_1$-C$_3$ alkyl)amino group, a C$_1$-C$_3$ alkoxy group, a halo C$_1$-C$_3$ alkoxy group, a C$_1$-C$_3$ alkoxyC$_1$-C$_6$ alkyl group, a C$_3$-C$_6$ cycloalkyl group, and a halo C$_3$-C$_6$ cycloalkyl group;

may form a piperidinyl group, a pyrrolidinyl group, piperazinyl group, azepanyl group, a diazaspiro[3,3]heptanyl group, a diazaspiro[3.5]nonanyl group, a diazaspiro[4.4]nonanyl group, a diazaspiro[4.5]decanyl group, a diazaspiro[5.5]undecanyl group, a diazabicyclononanyl group, a tetrahydro-1H-furo[3,4-c]pyrrolyl group, an octahydro-6H-pyrrolo[2,3-c]pyridinyl group, a pyridinyl group, a pyridazinyl group, a pyrimidinyl group, a pyrazinyl group, a pyrazolyl group, an azabicyclo[3.2.1]octanyl group, and a diazabicyclo[3.3.1]nonanyl group;

R$^6$(s) may each independently be any one selected from hydrogen, a halogen, a cyano group, a hydroxy group, a nitro group, an amino group, a C$_1$-C$_6$ alkyl group, a halo C$_1$-C$_6$ alkyl group, a C$_1$-C$_6$ alkylhydroxy group, a C$_1$-C$_6$ alkoxy group, a halo C$_1$-C$_6$ alkoxy group, a C$_1$-C$_3$ alkylamino group, a C$_1$-C$_3$ dialkylamino group, a C$_3$-C$_6$ cycloalkylamino group, and a halo C$_1$-C$_3$ alkylamino group;

k may be an integer from 0 to 4, wherein, when k is 2 or more, two or more R$^1$(s) may be identical to or different from each other;

m may be an integer from 0 to 4, wherein, when m is 2 or more, two or more R$^2$(s) may be identical to or different from each other;

n may be an integer from 0 to 6, wherein, when n is 2 or more, two or more R$^6$ may be identical to or different from each other.

In one embodiment, R$^2$(s) in Formula 1 may each independently be any one selected from hydrogen, a halogen, a furopyrrolyl group, a methoxy N-pyrrolidinyl group, an N-piperidinyl group, and a cyclopropyl group.

The furopyrrolyl group used herein refers to any organic hetero bicyclic compound in which furan or hydrofuran is ortho-fused with pyrrole or hydropyrrole.

In one embodiment, R$^2$ in Formula 1 may be a hetero bicyclic group in which furan or hydrofuran is ortho-fused with pyrrole or hydropyrrole. In one embodiment, R$^2$ in Formula 1 may be any one selected from a dihydrofuropyrrolyl group, a tetrahydrofuropyrrolyl group, and a hexahydrofuropyrrolyl group. For example, R$^2$ may be any one selected from

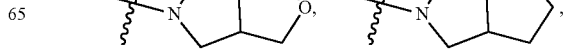

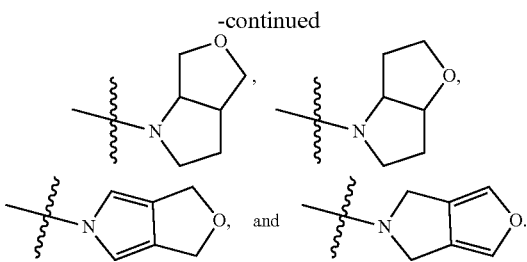

In one embodiment, $R^2$ in Formula 1 may be N-hexahydrofuropyrrolyl. For example, $R^2$ may be a hexahydro-1H-furo[3,4-c]pyrrolyl group, a hexahydro-2H-furo[2,3-c]pyrrolyl group, a hexahydro-1H-furo[3,4-b]pyrrolyl group, or a hexahydro-2H-furo[3,2-b]pyrrolyl group.

In one embodiment, in Formula 1,

may be a piperidinyl group or an azepanyl group;

$R^6$(s) may each independently be hydrogen or an amino group;

may be a phenyl group;

$R^1$(s) may each independently be hydrogen or halogen; and $R^2$(s) may each independently be any one selected from hydrogen, a halogen, an N-hexahydrofuropyrrolyl group, a methoxy N-pyrrolidinyl group, an N-piperidinyl group, and a cyclopropyl group.

In one embodiment, the compound may be selected from a compound represented by Formula 2, and a tautomer, stereoisomer, solvate, and pharmaceutically acceptable salt thereof.

Formula 2

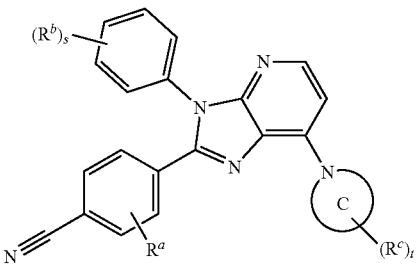

wherein, in Formula 2,

may be any one selected from a piperidinyl group, a pyrrolidinyl group, an azepanyl group, a furo[3,4-c]-pyrrolyl group, a pyrrolo[2,3-c]pyridinyl group, and an azabicyclo $C_8$-$C_{10}$ alkanyl group;

$R^a$(s) may each independently be hydrogen, fluorine, chlorine, bromine, iodine, a $C_1$-$C_3$ alkyl group, or a $C_1$-$C_3$ alkoxy group;

$R^b$(s) may each independently be any one selected from hydrogen, a halogen, a cyano group, a hydroxy group, an acetyloxy group, a thiol group, a $C_1$-$C_6$ alkyl group, a halo $C_1$-$C_6$ alkyl group, a $C_2$-$C_6$ alkenyl group, a $C_1$-$C_6$ alkylhydroxy group, a $C_2$-$C_6$ alkenylhydroxy group, a $C_1$-$C_6$ alkoxy group, a halo $C_1$-$C_6$ alkoxy group, a $C_3$-$C_6$ cycloalkyl group, a $C_3$-$C_6$ cycloalkoxy group, a piperidinyl group, a pyrrolidinyl group, a piperazinyl group, an azetidinyl group, a morpholinyl group, a —C(O)-morpholinyl group, a —O—($C_1$-$C_3$ alkyl)-morpholinyl group,

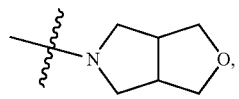 [SMILES: *N1CC2COCC2C1]

—N($Q_{13}$)($Q_{14}$), —C(O)N($Q_{13}$)($Q_{14}$), and —O—($C_1$-$C_6$ alkyl)-N($Q_{13}$)($Q_{14}$), In this regard, $Q_{13}$ and $Q_{14}$ may each independently be any one selected from hydrogen, a $C_1$-$C_6$ alkyl group, a $C_2$-$C_6$ alkenyl group, a halo $C_1$-$C_6$ alkyl group, a $C_1$-$C_6$ alkylhydroxy group, a $C_1$-$C_6$ alkylamino group, a $C_2$-$C_6$ alkenylamino group, a $C_1$-$C_6$ alkoxy group, a halo $C_1$-$C_6$ alkoxy group, a $C_3$-$C_6$ cycloalkyl group, and a $C_3$-$C_6$ heterocycloalkyl group, each of which may be unsubstituted or substituted with any one substituent selected from a hydroxy group, an amino group, a $C_1$-$C_3$ alkyl group, and a $C_1$-$C_3$ alkoxy group;

In this regard, when $R^b$ is a piperidinyl group, a pyrrolidinyl group, a piperazinyl group, an azetidinyl group, a morpholinyl group, a —C(O)-morpholinyl group, a —O—($C_1$-$C_3$ alkyl)-morpholinyl group, or

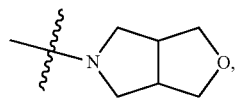 [SMILES: *N1CC2COCC2C1]

the piperidinyl group, the pyrrolidinyl group, the piperazinyl group, the azetidinyl group, the morpholinyl group, the —C(O)-morpholinyl group, the —O—($C_1$-$C_3$ alkyl)-morpholinyl group, or

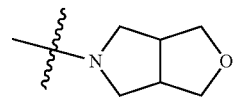 [SMILES: *N1CC2COCC2C1]

may be unsubstituted or substituted with any one substituent selected from halogen, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy group, a halo $C_1$-$C_3$ alkoxy group, and a $C_1$-$C_3$ alkoxy $C_1$-$C_3$ alkyl group;

In this regard, when $R^b$ is a $C_1$-$C_6$ alkyl group, a $C_2$-$C_6$ alkenyl group, or —N($Q_{13}$)($Q_{14}$), two or more $R^b$(s) may be fused with a phenyl group to which they are linked to form

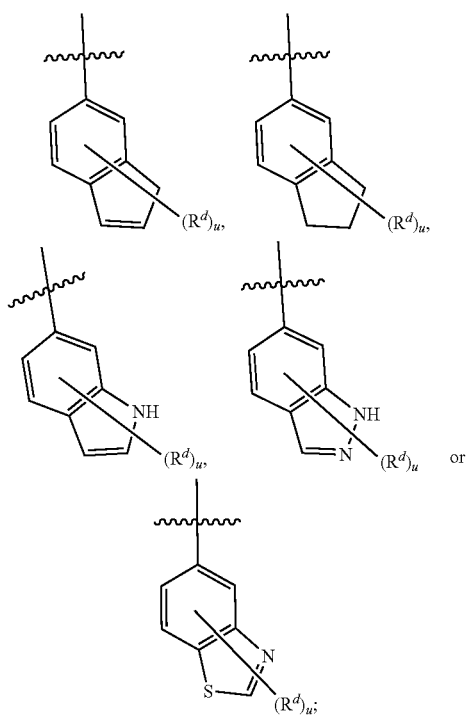

$R^c$(s) may each independently be any one selected from hydrogen, an amino group, a $C_1$-$C_3$ alkyl group, a halo $C_1$-$C_6$ alkyl group, a $C_1$-$C_3$ alkylamino group, a $C_1$-$C_3$ dialkylamino group, a $C_1$-$C_3$ alkylhydroxy group, a $C_3$-$C_9$ cycloalkylamino group, and a $C_3$-$C_6$ cycloalkyl($C_1$-$C_3$ alkyl) amino group;

$R^d$(s) may each independently be hydrogen, a $C_1$-$C_3$ alkyl group, or a halo $C_1$-$C_6$ alkyl group;

s may be an integer from 0 to 2;

t may be an integer from 1 to 2, and u may be an integer from 0 to 6.

In one embodiment of the present disclosure, the examples of the compound represented by Formula 1 are as follows, and the scope of the present disclosure includes an isomer, including a tautomer and a stereoisomer, thereof, a solvate thereof, and a pharmaceutically acceptable salt thereof.

1) 4-(7-(3-aminopiperidine-1-yl)-3-(p-tolyl)-3H-imidazo[4,5-b]pyridine-2-yl)benzonitrile
2) 4-(7-(3-aminopyrrolidine-1-yl)-3-(4-cyclopropylphenyl)-3H-imidazo[4,5-b]pyridine-2-yl)benzonitrile
3) 4-(7-(4-aminopiperidine-1-yl)-3-(4-cyclopropylphenyl)-3H-imidazo[4,5-b]pyridine-2-yl)benzonitrile
4) 4-(3-(4-cyclopropylphenyl)-7-(3-(methylamino)piperidine-1-yl)-3H-imidazo[4,5-b]pyridine-2-yl)benzonitrile
5) 4-(7-(3-aminopiperidine-1-yl)-3-(4-cyclopropylphenyl)-3H-imidazo[4,5-b]pyridine-2-yl)benzonitrile
6) 4-(7-(3-aminopiperidine-1-yl)-3-(4-fluoro-phenyl)-3H-imidazo[4,5-b]pyridine-2-yl)-2-fluorobenzonitrile
7) 4-(7-(3-aminopiperidine-1-yl)-3-(2-fluoro-4-methylphenyl)-3H-imidazo[4,5-b]pyridine-2-yl)-2-fluorobenzonitrile
8) 4-(7-(3-aminoazepane-1-yl)-3-(4-cyclopropylphenyl)-3H-imidazo[4,5-b]pyridine-2-yl)-2-fluorobenzonitrile
9) 4-(7-(3-aminopiperidine-1-yl)-3-(4-(piperidine-1-yl)phenyl)-3H-imidazo[4,5-b]pyridine-2-yl)-2-fluorobenzonitrile
10) 4-(7-(3-aminopiperidine-1-yl)-3-(2-fluoro-4-(piperidine-1-yl)phenyl)-3H-imidazo[4,5-b]pyridine-2-yl)-2-fluorobenzonitrile
11) 4-(7-(3-aminopiperidine-1-yl)-3-(4-cyclopropyl-2-fluorophenyl)-3H-imidazo[4,5-b]pyridine-2-yl)-2-fluorobenzonitrile
12) 2-fluoro-4-(7-(3-(methylamino)piperidine-1-yl)-3-(4-(pyrrolidine-1-yl)phenyl)-3H-imidazo[4,5-b]pyridine-2-yl)benzonitrile
13) 4-(7-(3-aminopiperidine-1-yl)-3-(4-(pyrrolidine-1-yl)phenyl)-3H-imidazo[4,5-b]pyridine-2-yl)-2-fluorobenzonitrile
14) 4-(7-(3-aminopiperidine-1-yl)-3-(4-(dimethylamino)phenyl)-3H-imidazo[4,5-b]pyridine-2-yl)-2-fluorobenzonitrile
15) 4-(7-(3-amino-8-azabicyclo[3.2.1]octane-8-yl)-3-(p-tolyl)-3H-imidazo[4,5-b]pyridine-2-yl)-2-fluorobenzonitrile
16) 4-(7-(3-aminopiperidine-1-yl)-3-(o-tolyl)-3H-imidazo[4,5-b]pyridine-2-yl)-2-fluorobenzonitrile
17) 4-(7-(3-aminopiperidine-1-yl)-3-(m-tolyl)-3H-imidazo[4,5-b]pyridine-2-yl)-2-fluorobenzonitrile
18) 4-(7-(3-aminopiperidine-1-yl)-3-(4-cyclopropyl-2,6-difluorophenyl)-3H-imidazo[4,5-b]pyridine-2-yl)-2-fluorobenzonitrile
19) 4-(7-(3-aminopiperidine-1-yl)-3-(2,6-difluoro-4-(pyrrolidine-1-yl)phenyl)-3H-imidazo[4,5-b]pyridine-2-yl)-2-fluorobenzonitrile
20) 4-(7-(3-aminopiperidine-1-yl)-3-(3-fluoro-4-methoxyphenyl)-3H-imidazo[4,5-b]pyridine-2-yl)-2-fluorobenzonitrile
21) 4-(7-(3-aminopiperidine-1-yl)-3-(4-(diethylamino)phenyl)-3H-imidazo[4,5-b]pyridine-2-yl)-2-fluorobenzonitrile
22) 4-(7-(3-aminopiperidine-1-yl)-3-(4-(cyclopropyl(methyl)amino)phenyl)-3H-imidazo[4,5-b]pyridine-2-yl)-2-fluorobenzonitrile
23) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
24) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
25) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
26) 4-(7-(3-aminopiperidine-1-yl)-3-(4-(3,3-difluoropyrrolidine-1-yl)-2-fluorophenyl)-3H-imidazo[4,5-b]pyridine-2-yl)-2-fluorobenzonitrile
27) 4-(7-(3-aminopiperidine-1-yl)-3-(2-fluoro-4-(pyrrolidine-1-yl)phenyl)-3H-imidazo[4,5-b]pyridine-2-yl)-2-fluorobenzonitrile
28) 4-(7-(3-aminopiperidine-1-yl)-3-(p-tolyl)-3H-imidazo[4,5-b]pyridine-2-yl)-2-fluorobenzonitrile
29) 4-(7-(3-aminopiperidine-1-yl)-3-phenyl-3H-imidazo[4,5-b]pyridine-2-yl)-2-fluorobenzonitrile
30) 4-(7-(3-aminopiperidine-1-yl)-3-(4-cyclopentyloxy)-2-fluorophenyl)-3H-imidazo[4,5-b]pyridine-2-yl)-2-fluorobenzonitrile
31) 4-(7-(3-aminopiperidine-1-yl)-3-(2-fluoro-4-(3-methoxyazetidine-1-yl)phenyl)-3H-imidazo[4,5-b]pyridine-2-yl)-2-fluorobenzonitrile
32) 1-(4-(7-(3-aminopiperidine-1-yl)-2-(4-cyano-3-fluorophenyl)-3H-imidazo[4,5-b]pyridine-3-yl)-3-fluorophenyl)pyrrolidine-3-yl acetate 33) 4-(7-(3-aminopiperidine-1-yl)-3-(2-fluoro-4-morpholinophenyl)-3H-imidazo[4,5-b]pyridine-2-yl)-2-fluorobenzonitrile
34) 4-(7-(3-aminopiperidine-1-yl)-3-(2-fluoro-4-methylpiperazine-1-yl)phenyl)-3H-imidazo[4,5-b]pyridine-2-yl)-2-fluorobenzonitrile
35) 4-(7-(3-aminopiperidine-1-yl)-3-(2-fluoro-4-(3-hydroxypyrrolidine-1-yl)phenyl)-3H-imidazo[4,5-b]pyridine-2-yl)-2-fluorobenzonitrile
36) 4-(7-(3-aminopiperidine-1-yl)-3-(4-(3-chloropyrrolidine-1-yl)-2-fluorophenyl)-3H-imidazo[4,5-b]pyridine-2-yl)-2-fluorobenzonitrile
37) 4-(7-(3-aminopiperidine-1-yl)-3-(4-(morpholino-4-carbonyl)phenyl)-3H-imidazo[4,5-b]pyridine-2-yl)-2-fluorobenzonitrile
38) 4-(7-(3-aminopiperidine-1-yl)-3-(4-(morpholino-4-carbonyl)phenyl)-3H-imidazo[4,5-b]pyridine-2-yl)-2-fluorobenzonitrile
39) 4-(7-(3-aminopiperidine-1-yl)-3-(4-3-ethoxypyrrolidine-1-yl)-2-fluorophenyl)-3H-imidazo[4,5-b]pyridine-2-yl)-2-fluorobenzonitrile
40) 4-(7-(3-aminopiperidine-1-yl)-3-(4-hydroxyphenyl)-3H-imidazo[4,5-b]pyridine-2-yl)-2-fluorobenzonitrile
41) 4-(7-(3-aminopiperidine-1-yl)-3-(4-cyanophenyl)-3H-imidazo[4,5-b]pyridine-2-yl)-2-fluorobenzonitrile
42) 4-(7-(3-aminopiperidine-1-yl)-3-(2,3-dihydro-1H-indene-5-yl)-3H-imidazo[4,5-b]pyridine-2-yl)-2-fluorobenzonitrile
43) 4-(7-(3-aminopiperidine-1-yl)-3-(4-isopropylphenyl)-3H-imidazo[4,5-b]pyridine-2-yl)-2-fluorobenzonitrile
44) 4-(7-(3-aminopiperidine-1-yl)-3-(1-methyl-1H-indole-5-yl)-3H-imidazo(4,5-b)pyridine-2-yl)-2fluorobenzonitrile
45) 4-(7-(3-aminopiperidine-1-yl)-3-(5-methylpyridine-2-yl)-3H-imidazo[4,5-b]pyridine-2-yl)-2-fluorobenzonitrile
46) 4-(7-(3-aminopiperidine-1-yl)-3-(4-cyclohexylphenyl)-3H-imidazo[4,5-b]pyridine-2-yl)-2-fluorobenzonitrile
47) 4-(7-(3-aminopiperidine-1-yl)-3-(3-vinylphenyl)-3H-imidazo[4,5-b]pyridine-2-yl)-2-fluorobenzonitrile
48) 4-(7-(3-aminopiperidine-1-yl)-3-(4-((3-methoxypropyl)(methyl)amino)phenyl)-3H-imidazo[4,5-b]pyridine-2-yl)-2-fluorobenzonitrile
49) 4-(7-(3-aminopiperidine-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile
50) 4-(7-(3-aminopiperidine-1-yl)-3-cyclohexyl-3H-imidazo[4,5-b]pyridine-2-yl)-2-fluorobenzonitrile
51) 4-(7-(3-aminopiperidine-1-yl)-3-(4-hexylphenyl)-3H-imidazo[4,5-b]pyridine-2-yl)-2-fluorobenzonitrile
52) 4-(7-(3-aminopiperidine-1-yl)-3-(2-fluoro-4-(3-methoxypyrrolidine-1-yl)phenyl)-3H-imidazo[4,5-b]pyridine-2-yl)-3-fluorobenzonitrile
53) 4-(7-(3-aminopiperidine-1-yl)-3-(2-fluoro-4-(3-methoxypyrrolidine-1-yl)phenyl)-3H-imidazo[4,5-b]pyridine-2-yl)-3-methoxybenzonitrile
54) 4-(7-(3-aminopiperidine-1-yl)-3-(1-methyl-1H-pyrrolo[2,3-b]pyridine-5-yl)-3H-imidazo[4,5-b]pyridine-2-yl)-2-fluorobenzonitrile
55) 4-(7-(3-aminopiperidine-1-yl)-3-(1-methyl-1H-indazole-5-yl)-3H-imidazo[4,5-b]pyridine-2-yl)-2-fluorobenzonitrile
56) 4-(7-(3-aminopiperidine-1-yl)-3-(2-fluoro-4-3-methoxypiperidine-1-yl)phenyl)-3H-imidazo[4,5-b]pyridine-2-yl)-2-fluorobenzonitrile
57) 4-(7-(3-aminopiperidine-1-yl)-3-(4-(3-(dimethylamino)pyrrolidine-1-yl)-2-fluorophenyl)-3H-imidazo[4,5-b]pyridine-2-yl)-2-fluorobenzonitrile
58) 4-(7-(3-aminopiperidine-1-yl)-3-(benzo[d]thiazole-5-yl)-3H-imidazo[4,5-b]pyridine-2-yl)-2-fluorobenzonitrile
59) 4-(7-3-aminopiperidine-1-yl)-3-(2-fluoro-4-(3-(methoxymethyl)pyrrolidine-1-yl)phenyl)-3H-imidazo[4,5-b]pyridine-2-yl)-2-fluorobenzonitrile
60) 2-fluoro-4-(3-(2-fluoro-4-(3-methoxypyrrolidine-1-yl)phenyl)-7-(2,8-diazaspiro[4.5]decane-8-yl)-3H-imidazo[4,5-b]pyridine-2-yl)benzonitrile
61) 2-fluoro-4-(3-(2-fluoro-4-(3-methoxypyrrolidine-1-yl)phenyl)-7-(octahydro-6H-pyrrolo[2,3-c]pyridine-6-yl)-3H-imidazo[4,5-b]pyridine-2-yl)benzonitrile
62) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
63) 4-(7-(3-amino-8-azabicyclo[3.2.1]octane-8-yl)-3-(2-fluoro-4-(3-methoxypyrrolidine-1-yl)phenyl)-3H-imidazo[4,5-b]pyridine-2-yl)-2-fluorobenzonitrile
64) 4-(7-(3-aminopyrrolidine-1-yl)-3-(2-fluoro-4-(3-methoxypyrrolidine-1-yl)phenyl)-3H-imidazo[4,5-b]pyridine-2-yl)-2-fluorobenzonitrile
65) 2-fluoro-4-(3-(2-fluoro-4-(3-methoxypyrrolidine-1-yl)phenyl)-7-(2,7-diazaspiro[4.4]nonane-2-yl)-3H-imidazo[4,5-b]pyridine-2-yl)benzonitrile
66) 2-fluoro-4-(3-(2-fluoro-4-(3-methoxypyrrolidine-1-yl)phenyl)-7-(2,7-diazaspiro[3.5]nonane-7-yl)-3H-imidazo[4,5-b]pyridine-2-yl)benzonitrile
67) 4-(7-(3-aminoazepane-1-yl)-3-(2-fluoro-4-(3-methoxypyrrolidine-1-yl)phenyl)-3H-imidazo[4,5-b]pyridine-2-yl)-2-fluorobenzonitrile
68) 2-fluoro-4-(3-(2-fluoro-4-(3-methoxypyrrolidine-1-yl)phenyl)-7-(tetrahydro-1H-furo[3,4-c]pyrrole-5(3H)-yl)-3H-imidazo[4,5-b]pyridine-2-yl)benzonitrile
69) 2-fluoro-4-(3-(2-fluoro-4-(3-methoxypyrrolidine-1-yl)phenyl)-7-(2,6-diazaspiro[3.3]heptane-2-yl)-3H-imidazo[4,5-b]pyridine-2-yl) benzonitrile
70) 2-fluoro-4-(3-(2-fluoro-4-(3-methoxypyrrolidine-1-yl)phenyl)-7-(3,9-diazaspiro[5.5]undecan-3-yl)-3H-imidazo[4,5-b]pyridine-2-yl) benzonitrile
71) 4-(7-(3,7-diazabicyclo[3.3.1]nonane-3-yl)-3-(2-fluoro-4-(3-methoxypyrrolidine-1-yl)phenyl)-3H-imidazo[4,5-b]pyridine-2-yl)-2-fluorobenzonitrile
72) 2-fluoro-4-(3-(2-fluoro-4-(3-methoxypyrrolidine-1-yl)phenyl)-7-(4-methylpiperazine-1-yl)-3H-imidazo[4,5-b]pyridine-2-yl)benzonitrile
73) 4-(7-(3-aminoazepane-1-yl)-3-(2-fluoro-4-(tetrahydro-1H-floro[3,4-c]pyrrole-5(3H)-yl)phenyl)-3H-imidazo[4,5-b]pyridine-2-yl)-2-fluorobenzonitrile
74) 4-(7-(aminoazepane-1-yl)-3-(2-fluoro-4-(3-methoxymethyl)pyrrolidine-1-yl)phenyl)-3H-imidazo[4,5-b]pyridine-2-yl)-2-fluorobenzonitrile
75) 4-(7-(3-(aminomethyl)piperidine-1-yl)-3-(2-fluoro-4-(3-methoxypyrrolidine-1-yl)phenyl)-3H-imidazo[4,5-b]pyridine-2-yl)-2-fluorobenzonitrile
76) 1-(2-(4-cyano-3-fluorophenyl)-3-(2-fluoro-4-(3-methoxypyrrolidine-1-yl)phenyl)-3H-imidazo[4,5-b]pyridine-7-yl)piperidine-2-carbonitrile.

Another aspect of the present disclosure provides a pharmaceutical composition for the prevention or treatment of diseases resulting from abnormal activation of LSD1, the pharmaceutical composition including: as an active ingredient, a compound of Formula 1 or 2, or a tautomer, stereoisomer, such as a geometric isomer and an optical isomer, or solvate, or pharmaceutically acceptable salt thereof; and a pharmaceutically acceptable carrier.

The term "derivative" includes compounds or molecules made from the parent compound by at least one chemical reaction, such as oxidation, hydrogenation, alkylation, esterification, halogenation, and the like. The term "isomer" refers to compounds that have the same molecular formula but differ in the arrangement and coordination of atoms, and includes a structural isomer and a stereoisomer.

The term "structural isomer" as used herein refers to a compound having the same molecular formula and having a different sequence of atoms. The term "tautomer" is one of the structural isomers, and is also known as "tauto-isomers" or "tautomers", in which protons transfer from one atom of a compound to another atom thereof, reciprocating between both isomers and changing their structure.

The term "stereoisomer" used herein refers to any of the various stereoisomer configurations that may exist for a given compound of the present disclosure, and includes geometric and optical isomers.

The term "diastereomer" as used herein refers to a stereoisomer having two or more asymmetric atoms which are not mirror images with respect to each other, however.

The term "geoisomers" as used herein refers to isomers that differ in the spatial position of the atoms or functional groups connected to the carbon atoms of the double bond in a planar structure having a double bond between the carbon atoms. The term "optical isomer" refers to any of the various stereoisomer configurations that may exist for a compound of the present disclosure and includes geometric isomers. The compounds of Formulae 1 and 2 according to the present disclosure may have an asymmetric carbon center (absent carbon) and therefore exist as enantiomers (R or S isomers), racemates, diastereomers, or any mixture thereof. All of these isomers and mixtures fall within the scope of the present disclosure.

The term "enantiomer" or enantiomer refers to a pair of stereoisomers that are mirror images that do not overlap one another. A 1:1 mixture of a pair of enantiomers is referred to as a "racemic" mixture.

The term "solvate" as used herein refers to the compound according to present disclosure and one or more pharmaceutically acceptable solvent molecules, and examples thereof include molecular complexes including ethanol or water.

The term "pharmaceutically acceptable salts" used herein refers to salts that retain the biological effectiveness and properties of the compounds according to present disclosure and are not undesirable salts in the biological or otherwise aspects. For example, such salts include, but are not limited to, nontoxic inorganic and organic base or acid addition salts.

The compounds disclosed herein may exist in the form of structural isomers including tautomers, or stereoisomers including geometric or optical isomers, or solvates, or pharmaceutically acceptable salts thereof. All such mixtures are intended to be within the scope of the disclosed invention.

In an example embodiment, for preventing or treating a disease caused by abnormal activation of LSD1, the pharmaceutical composition may be used in combination with a pharmaceutically acceptable additional drug. In an example embodiment, the pharmaceutical composition may be formulated in a pharmaceutically acceptable form, for example, a tablet, a pill, powder, a capsule, syrup, emulsion, and microemulsion.

In the present specification, LSD1, which may be involved in histone modification that is important, is an enzyme that plays a key role from a viewpoint of epigenetics regarding transcription regulation mechanism. LSD1 includes an N-terminal SWIRM domain (Swi3p, Rsc8p, and Moira), two types of transcription variants of LSD1 may be present result from selective splicing, and LSD1 have the structural similarity and amino acids uniformity/homogeneity with polyamine oxidases and monoamine oxidase (MAO). Also, LSD1 demethylates H3K4, suppress transcription, and demethylates H3K9 for activation of gene expression of a nuclear hormone receptor complex (for example, androgen receptor) at the same time. This suggests that LSD1 may regulate alternative gene expression in a situation-dependent manner, as the substrate specificity of LSD1 is determined by related factors.

Also, as cancer cells rapidly divide and grow, blood vessels constrict inside a solid tumor, thus causing a low oxygen environment. Expression of hypoxia induced factor-1 (HIF-1) protein, which is known as promoting cancer occurrence metastasis in such a low oxygen environment, may be regulated depending on methylation by LSD1. LSD1 may also be involved in activation of some proteins such as E2F, STAT3, Tat, and myosin phosphatase target subset 1 (MYPT1), which are not histones, such as p53 and DNMT1, which play an important role in cancer. This suggests a tumorigenesis mechanism due to LSD1 problem in regulating chromatin remodeling. In addition, LSD1 may increase activity of another epigenetic regulator, for example, DNA methyltransferase 1 (DNMT1) and histone deacetylase (HDAC) complexes. LSD1 may also contribute to various biological processes, including cell proliferation, epithelial mesenchymal transition (EMT), and stem cell biology (embryonic stem and cancer stem cell) or self-renewal and somatic cell transformation.

Also, since LSD1 contributes to tumorigenesis by altering epigenetic markers on histone and non-histone proteins, abnormal activation of LSD1 may cause various cancers.

According to the result of Experimental Example 1 described herein, the compounds represented by Formula 1 or 2 were found to have significant enzyme activity suppressing effects on LSD1.

Also, as described above, since LSD1 contributes to tumorigenesis by altering epigenetic markers on histone and non-histone proteins, LSD1 suppressing activity may normalize gene expression, thereby inducing differentiation program to become a mature cell type, reducing cell proliferation, and promoting apoptosis of cancer cells. Thus, the compounds represented by Formula 1 or 2 may be used in preventing or treating various diseases caused by abnormal activation of LSD1.

In an example embodiment, the pharmaceutical composition may include a pharmaceutically acceptable excipient, carrier, or additive. The pharmaceutical composition of the present disclosure may be formulated according to a conventional method and may be formulated into various oral dosage forms such as a tablet, a pill, powder, a capsule, syrup, emulsion, and microemulsion; or parenteral dosage forms such as intramuscular, intravenous or subcutaneous administration.

When the pharmaceutical composition of the present disclosure is prepared in a form of an oral formulation, examples of an additive or a carrier to be used include cellulose, calcium silicate, maize starch, lactose, sucrose, dextrose, calcium phosphate, stearic acid, magnesium stearate, gelatin, talc, a surfactant, a suspension, an emulsifier, and a diluent. When the pharmaceutical composition of the present disclosure is prepared in a form of an injection, examples of an additive or a carrier are water, a saline solution, an aqueous glucose solution, a pseudosaccharide solution, alcohol, glycol, ether (for example, polyethylene glycol 400), oil, fatty acid, fatty acid ester, glyceride, a surfactant, a suspension, and an emulsifier.

The dose of the pharmaceutical composition as an active ingredient is an effective amount for treating or preventing a subject or a patient. The compound may be administered orally or parenterally, as desired. When the compound is administered orally, the active ingredient may be administered in an amount in a range of 0.01 milligrams (mg) to 1,000 mg, more particularly, 0.1 mg to 300 mg, per kilogram (kg) of body weight per day. When the compound is administered parenterally, the active ingredient may be administered from one to several times in an amount in a range of 0.01 mg to 100 mg, more particularly, 0.1 mg to 50 mg, per kg of body weight per day. The dose for a particular subject or patient should be determined in light of the patient's weight, age, sex, health condition, diet, time of administration, method of administration, severity of disease, etc. It is to be understood that the dose may be appropriately adjusted by a practitioner. The dose is not intended to limit the scope of the present disclosure in any way.

Still another aspect of the present disclosure provides a method of treating a disease caused by abnormal activation of LSD1, the method including administering to a subject a therapeutically effective amount of the compounds represented by Formula 1 or 2, an optical isomer, a solvate, or a tautomer, or a pharmaceutically acceptable salt thereof.

Details of the method of preventing or treating may be the same as described above with reference to the pharmaceutical composition according to an aspect of the present disclosure. Also, the dose used in the method of preventing or treating is an amount effective in treatment or prevention of a subject or a patient. The dose of the pharmaceutical composition may be applied without any change.

The term "treating" or "treatment" as used herein refers to inhibiting a disease, for example, inhibiting a disease, condition, or disorder in a subject that has experienced or exhibited pathology or a symptom of the disease, condition, or disorder. In other words, the term "treating" or "treatment" refers to preventing additional occurrence of pathology and/or symptom or improving a disease, for example, improving a disease, condition, or disorder in a subject that has experienced or exhibited pathology or a symptom of the disease, condition, or disorder. In other words, the term "treating" or "treatment" refers to reversing pathology and/or symptom, for example reducing disease severity.

The term "preventing" or "prevention" as used herein refers to prevention of a disease, for example, prevention of a disease, condition, or disorder in a subject that may be predisposed to the disease, condition, or disorder but has not yet experienced or exhibited pathology or a symptom of the disease.

The term "subject" or "patient" as used herein refers to any animal, including mammals, for example, mice, rats, other rodents, rabbits, dogs, cats, pigs, cows, sheep, horses, or primates and humans.

In the present specification, the numerical range indicated by using the term "to" refers to a range including the numerical values described before and after the term as the lower limit and the upper limit, respectively.

Hereinafter, a method of preparing the compounds of the present disclosure will be described in detail.

The abbreviations used in the following Preparation Examples, preparation methods, and Examples each indicate:

Protecting group (PG): protecting group
Boc-: tert-butoxycarbonyl group
POCl$_3$: phosphoryl chloride
NaCO$_3$: sodium carbonate
Ce$_2$CO$_3$: cesium carbonate
Na$_2$SO$_4$: sodium sulfate
MPLC: medium pressure liquid chromatography
NEt$_3$ (TEA): triethyl amine
TLC: thin layer chromatography
Pd$_2$(dba)$_3$: tris(dibenzylidene acetone)dipalladium(0)
Xantphos: 4,5-bis(diphenylphosphino)-9,9-dimethyl xanthene
FeCl$_3$: iron chloride (III)
Celite: Celite
CF$_3$CO$_2$H: trifluoroacetate
N,N-Dimethyl formamide: dimethyl formamide
MeOH: methanol
EtOH: ethanol
n-Hexane: hexane
Ethyl acetate (EA): ethyl acetate
CH$_2$Cl$_2$: dichloromethane
Toluene: toluene
THF: tetrahydrofuran
DMSO: dimethyl sulfoxide Synthesis of an imidazopyridine derivative according to the present disclosure may be performed using an intermediate prepared in Reaction Scheme 1 or an intermediate commercially available in the market. Mass analysis of the obtained imidazopyridine derivative was performed by using MicroMass ZQ™ available from Waters. Structure analysis of hydrogen was performed by using 300 MHz of nuclear magnetic resonance (NMR) available from Bruker.

A pharmaceutical composition including as active ingredient the compounds represented by Formula 1 or 2 synthesized according to the preparation method, a tautomer, a stereoisomer, a solvate, and a pharmaceutically acceptable salt thereof may be used in prevention and treatment of a disease that may be treated by regulation of LSD1.

A method of preparing the compounds represented by Formula 1 or 2 may be shown as Reaction Scheme 1.

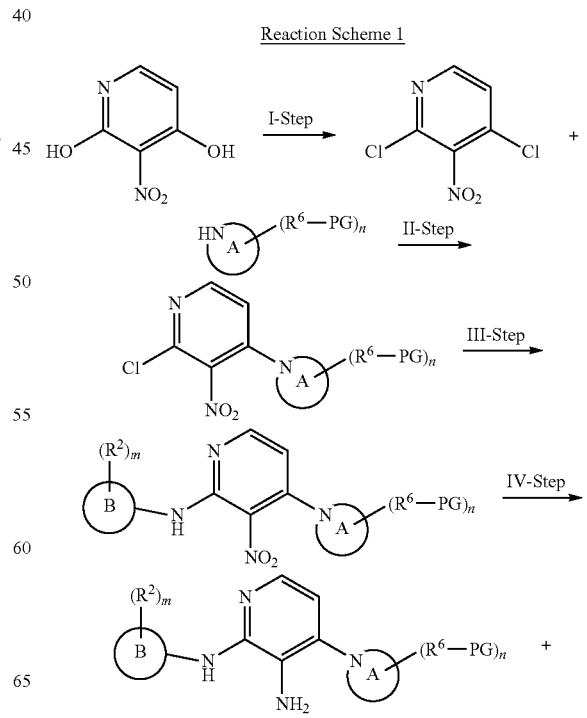

Reaction Scheme 1

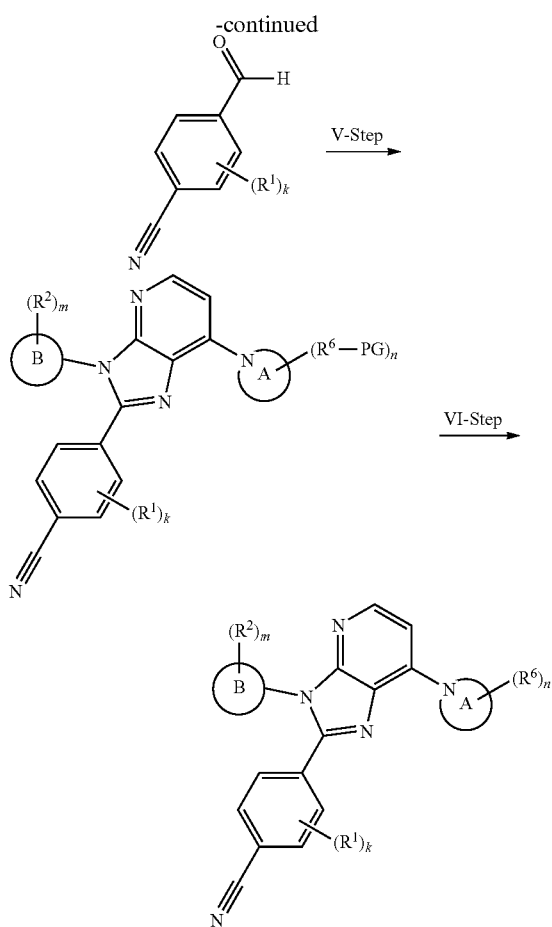

wherein, in Reaction Scheme 1, A, B, $R^1$, $R^2$, $R^6$, k, m and n may respectively be understood by referring to the descriptions of A, B, $R^1$, $R^2$, $R^6$, k, m and n in Formula 1.

In Reaction Scheme 2, an amine-protecting group (PG) may be butoxycarbonyl (Boc), benzyloxycarbonyl (Cbz), 9-fluorenylmethoxycarbonyl (Fmoc), acetyl, benzoyl, or tosyl, but embodiments are not limited thereto.

The steps of the method according to an example embodiment will be described in detail.

(Step I)

3-nitropyridine-2,4-diol (1 eq., standard equivalent) was dissolved in 2.0±0.02 v/v of phosphoryl chloride, and the internal temperature was raised to 130±10° C. After stirring the mixture at 130±10° C. for (2.0±0.5) hours, completion of the reaction was identified through TLC monitoring. Then, the temperature was lowered to room temperature. Under a temperature of 0±5° C., a saturated sodium carbonate aqueous solution was added dropwise to a reaction mixture solution using a dropping funnel for neutralization. Then, ethyl acetate and water (2:1=v/v) was added thereto 3±1 times to separate an organic layer. The separated organic layer was washed twice with 50 v/v of soft water. Then, the organic layer was dried using anhydrous sodium sulfate and filtered, and the filtered organic layer was concentrated under reduced pressure. The obtained residue was purified using MPLC (ethyl acetate:hexane=30:70 (v/v)) to thereby obtain the desired compound.

(Step II)

2,4-dichloro-3-nitropyridine (1 eq., standard equivalent) obtained in Step I and tert-butyl (R)-piperidine-3-ylcarbamate (1.0±0.1 eq.), and triethylamine (1.5±0.2 eq.) were dissolved in 16±2 v/v of ethanol, followed by stirring at room temperature for 3.0±0.5 hours, and completion of the reaction was identified through TLC monitoring. The reaction mixture solution was concentrate under reduced pressure without any filtration process. The obtained residue was solidified using ethyl acetate and hexane (1:25, v/v). Then, the solid was filtrated, and the filtrate was concentrated under reduced pressure and purified through MPLC (ethyl acetate:hexane) to thereby obtain the desired compound.

(Step III)

Tert-butyl (R)-(1-(2-chloro-3-nitropyridine-4-yl)piperidine-3-yl)carbamate (1 eq., standard equivalent) obtained in Step II, p-toluidine (1.5±0.2 eq.), tris(dibenzylideneacetone)dipalladium (0) ($Pd_2(dba)_3$, 0.1±0.02 eq.), 4,5-bis(diphenylphosphino)-9,9-dimethylxanthene (Xantphos, 0.1±0.02 eq.), and cesium carbonate (3.0±0.5 eq.) were dissolved in (10 v/v) toluene. Then, the gas in the mixture solution was removed for 2 minutes at room temperature using an ultrasonicator. After stirring the mixture at a temperature of 100±10° C. for 2.0±0.5 hours, completion of the reaction was identified through TLC monitoring. Then, the temperature was cooled to room temperature. The reaction mixture solution was filtered using celite, and the celite layer was washed three times using ethyl acetate (200 v/v). The filtered filtrate was washed twice with soft water (300 vol), and the organic layer was dried using anhydrous sodium sulfate, filtered, and concentrated under reduced pressure. Without purification of the residue, the following reaction was proceeded.

(Step IV)

Tert-butyl (R)-(1-(3-nitro-2-(p-tolylamino)pyridine-4-yl)piperidine-3-yl)carbamate(1 eq., standard equivalent) obtained in Step III and iron (3.2±0.2 eq.) were dissolved in 10±1 v/v acetate.

After stirring the mixture at a temperature of 40±5° C. for 1.5±0.25 hours, completion of the reaction was identified through TLC monitoring. Then, the temperature was cooled to room temperature. The reaction mixture solution was neutralized using a saturated sodium hydrogen carbonate aqueous solution and filtered using celite, and the celite layer was washed twice using ethyl acetate (100 v/v). The filtered filtrate was washed twice using soft water (100 v/v), and an organic layer was dried using anhydrous sodium sulfate. After filtration, the organic layer was concentrated under reduced pressure, and the obtained residue was purified through MPLC (dichloromethane:methanol) to thereby obtain the desired compound.

(Step V)

Tert-butyl (R)-(1-(3-nitro-2-(p-tolylamino)pyridine-4-yl)piperidine-3-yl)carbamate (1 eq., standard equivalent) obtained in Step IV, 4-formyl benzonitrile (1.0±0.1 eq.), and iron chloride (III)(0.03±0.002 eq.) were dissolved in dimethyl formamide (10 v/v). After stirring the mixture at a temperature of 120±10° C. for 1.5±0.25 hours, completion of the reaction was identified through TLC monitoring. Then, the temperature was cooled to room temperature. Ethyl acetate and water (200 vol, 1:1=v/v) were added to the reaction mixture solution, and an organic layer was separated therefrom. The separated organic layer was washed four times with 50 v/v of soft water. Then, the organic layer was dried using anhydrous sodium sulfate and filtered, and the filtered organic layer was concentrated under reduced pressure. The obtained residue was purified using MPLC (dichloromethane:methanol) to thereby obtain the desired compound.

(Step VI)

Tert-butyl (R)-(1-(2-(4-cyanophenyl)-3-(p-tolyl)-3H-imidazo[4,5-b]pyridine-7-yl)piperidine-3-yl)carbamate (1 eq., standard equivalent) obtained in Step V and trifluoroacetate (2.0±0.2 v/v) were dissolved in dichloromethane (6.0±0.5 v/v). After stirring the mixture at room temperature for 1 hour, completion of the reaction was identified through TLC monitoring. The reaction mixture solution was neutralized using a saturated sodium hydrogen carbonate aqueous solution. Then, dichloromethane (100 v/v) and water (100 v/v) were added to the reaction mixture solution, and an organic layer was separated therefrom. The separated organic layer was washed twice with soft water (100 v/v). Then, the organic layer was dried using anhydrous sodium sulfate and filtered, and the organic layer was concentrated under reduced pressure. The obtained residue was purified using MPLC (dichloromethane:methanol) to thereby obtain the desired compound.

Compound 1 was prepared according to Preparation Example 1.

Preparation Example 1: Preparation of 4-cyclopropylaniline

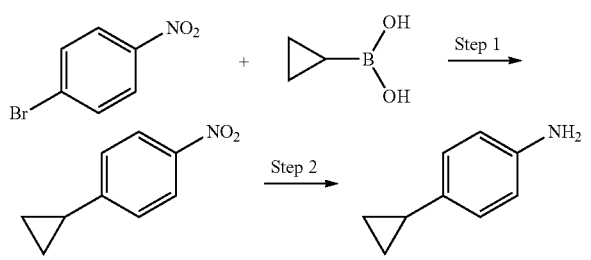

Step 1) Preparation of 1-cyclopropyl-4-nitrobenzene

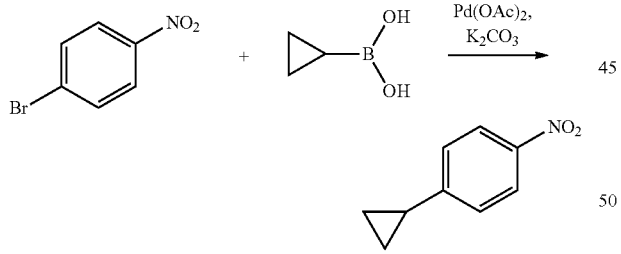

3.0 g (14.9 mmol) of 4-bromonitrobenzene and 1.7 g (19.4 mmol) of cyclopropyl boronic acid were each dissolved in 40 mL of toluene and 4 mL of water, respectively. 133 mg (0.6 mmol) of palladium acetate (Pd(OAc)$_2$), 418 mg (1.49 mmol) of tricyclohexyl phosphine (P(C$_6$H$_{11}$)$_3$), and 6.8 g (49.2 mmol) of potassium carbonate (K$_2$CO$_3$) were added thereto. Purging with argon gas was performed for 30 minutes, and heating to a temperature in a range of 100° C. to 110° C., followed by reacting for three hours. Completion of the reaction was identified through TLC monitoring, and celite filtration was performed under reduced pressure. Then, the filtered organic layer was concentrated under reduced pressure. The residue obtained through concentration was purified through column chromatography (ethyl acetate:hexane=1:9 (v/v)), thereby obtaining 2.1 g of the desired compound (yield: 86%).

$^1$H-NMR (300 MHz, CDCl$_3$): δ 8.09 (d, 2H), 7.17 (d, 2H), 1.96 (m, 1H), 1.12 (m, 2H), 0.82 (m, 2H)

Step 2) Preparation of 4-cyclopropylaniline

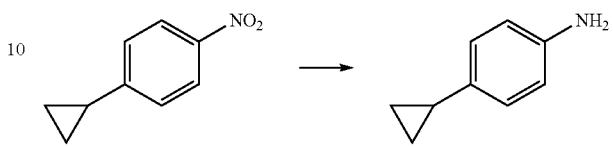

2.1 g (12.8 mmol) of 1-cyclopropyl-4-nitrobenzene was dissolved in 20 mL of tetrahydrofuran and ethanol at a mixing ratio of 1:1. 200 mg of platinum catalyst (PtO$_2$) was added thereto, followed by stirring overnight at a room temperature under hydrogen atmosphere. Completion of the reaction was identified through TLC monitoring, followed by celite filtration under reduced pressure. The filtered organic layer was concentrated under reduced pressure, thereby obtaining 1.3 g of the desired compound (yield: 76%).

$^1$H-NMR (300 MHz, CDCl$_3$): δ 6.97 (d, 2H), 6.57 (d, 2H), 3.52 (br, 2H), 1.82 (m, 1H), 0.84 (m, 2H), 0.58 (m, 2H)

Preparation Example 2: Preparation of 2,6-difluoro-4-(pyrrolidine-1-yl)aniline

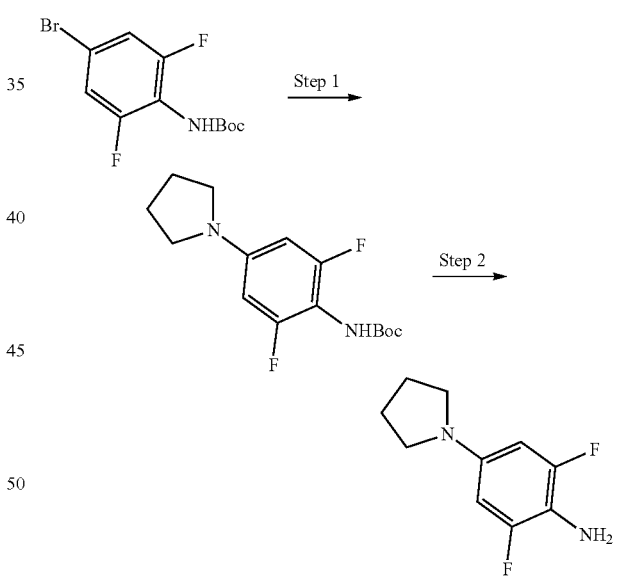

Step 1) Preparation of tert-butyl (2,6-difluoro-4-(pyrrolidine-1-yl)phenyl)carbamate

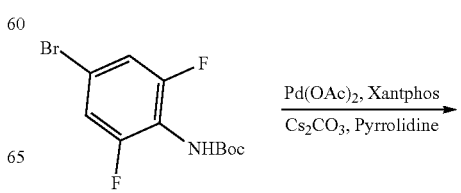

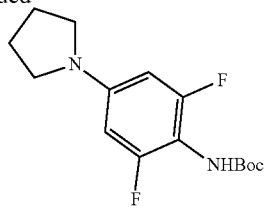

7.70 g (24.99 mmol) of tert-butyl(4-bromo-2,6-difluorophenyl)carbamate, 8.3 mL (99.96 mmol) of pyrrolidine, 561 mg (2.50 mmol) of palladium acetate, 2.89 g (5.00 mmol) of 4,5-bis(diphenylphosphino)-9,9-dimethylxanthene, and 15.29 g (49.98 mmol) of cesium carbonate were dissolved in 77 mL of toluene at room temperature. Then, purging with argon gas was performed for 5 minutes and heating to a temperature of 90° C., followed by reacting for 12 hours. Completion of the reaction was identified through TLC monitoring, and celite filtration was performed under reduced pressure. Then, the filtered organic layer was concentrated under reduced pressure. The residue obtained through concentration was purified through column chromatography, thereby obtaining 4.56 g of the desired compound (yield: 61%).

$^1$H-NMR (300 MHz, CDCl$_3$): δ 6.05 (d, 2H), 5.63 (br, 1H), 3.21 (m, 4H), 2.00 (m, 4H), 1.48 (s, 9H)

Step 2) Preparation of 2,6-difluoro-4-(pyrrolidine-1-yl)aniline

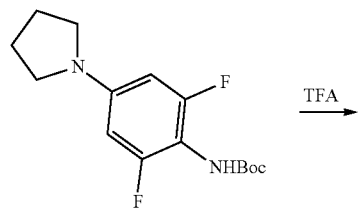

4.56 g (15.29 mmol) of tert-butyl (2,6-difluoro-4-(pyrrolidine-1-yl)phenyl)carbamate was dissolved in dichloromethane. 3 mL of trifluoroacetate was added thereto, followed by stirring at room temperature for three hours. Completion of the reaction was identified through TLC monitoring under reduced pressure. The concentrated residue was dissolved in dichloromethane, and neutralization was performed using a saturated sodium hydrogen carbonate aqueous solution. Then, the organic layer was dried using anhydrous sodium sulfate. Anhydrous sodium sulfate was filtered from the organic layer, and the filtered solution was concentrated under reduced pressure and recrystallized using hexane, thereby obtaining 2.47 g of the desired compound (yield: 82%).

$^1$H-NMR (300 MHz, CDCl$_3$): δ 6.08 (d, 2H), 3.16 (m, 6H), 1.98 (m, 4H)

Preparation Example 3: Preparation of N-cyclopropyl-N-methylbenzene-1,4-diamine

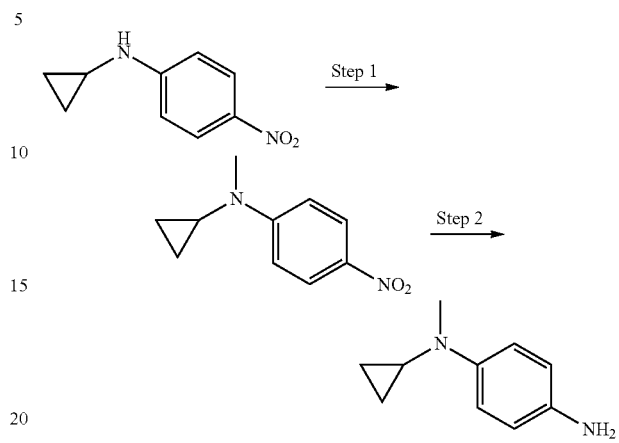

Step 1) Preparation of N-cyclopropyl-N-methyl-4-nitroaniline

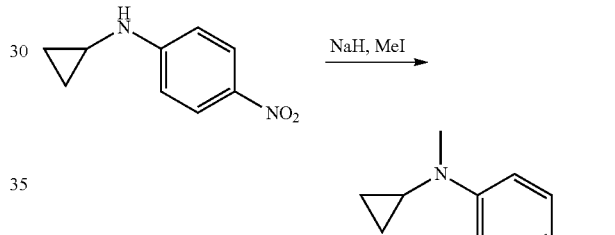

1.50 g (8.417 mmol) of N-cyclopropyl-4-nitroaniline was dissolved in 50 mL of dimethyl formamide at a temperature of 0° C. Then 0.4 g (9.258 mmol) of sodium hydride (60%). 0.58 mL (9.258 mmol) of methyl iodide was added thereto, followed by reacting at room temperature for 7 hours. Completion of the reaction was identified through TLC monitoring under reduced pressure. The concentrated residue was dissolved in ethyl acetate, and neutralization was performed using a saturated sodium hydrogen carbonate aqueous solution. Then, the organic layer was dried using anhydrous sodium sulfate. Anhydrous sodium sulfate was filtered from the organic layer, and the filtered solution was separated through silica column, thereby obtaining 1.61 g of the desired compound (yield: 99%).

$^1$H-NMR (300 MHz, CDCl$_3$): δ 8.14 (d, 2H), 6.89 (d, 2H), 3.09 (s, 3H), 2.66 (m, 1H), 0.99-0.93 (m, 2H), 0.73 (m, 2H)

Step 2) Preparation of N-cyclopropyl-N-methylbenzene-1,4-diamine

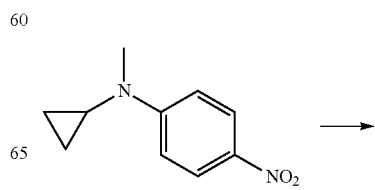

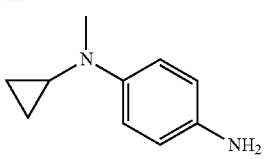

2.33 g (41.879 mmol) of iron and 0.12 g (3.350 mmol) of thick hydrochloric acid were dissolved in 50% of ethanol/water, followed by stirring and heating at a temperature of 110° C. for 1 hour. 1.61 g (8.375 mmol) of N-cyclopropyl-N-methyl-4-nitroaniline was added thereto, followed by stirring and heating at a temperature of 110° C. for 1.5 hours. Completion of the reaction was identified through TLC monitoring, and celite filtration was performed. The concentrated residue was dissolved in ethyl acetate, and neutralization was performed using a saturated sodium hydrogen carbonate aqueous solution. Then, the organic layer was dried using anhydrous sodium sulfate. Anhydrous sodium sulfate was filtered from the organic layer, and the filtered solution was separated through silica column, thereby obtaining 1.26 g of the desired compound (yield: 93%).

$^1$H-NMR (300 MHz, CDCl$_3$): δ 6.99 (m, 2H), 6.70 (m, 2H), 2.97 (m, 3H), 2.26-2.22 (m, 1H), 0.82 (m, 2H), 0.64 (m, 2H)

Example 1: Preparation of (R)-4-(7-(3-aminopiperidine-1-yl)-3-(p-tolyl)-3H-imidazo[4,5-b]pyridine-2-yl)benzonitrile

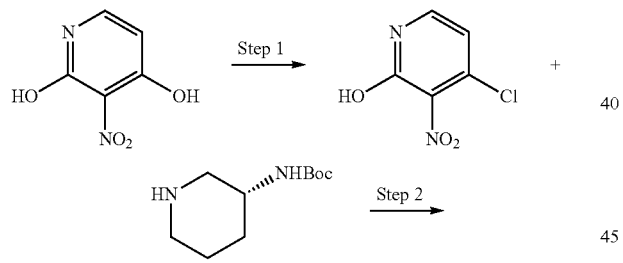

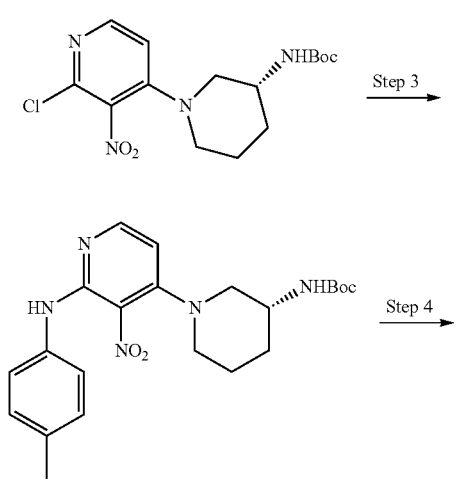

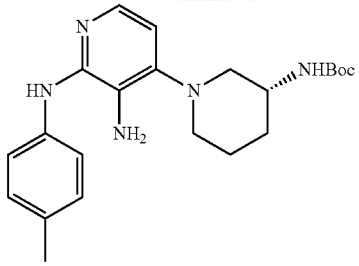

Step 1) Preparation of 2,4-dichloro-3-nitropyridine 10 g (64.10 mmol) of 3-nitropyridine-2,4-diol was dissolved in 20 mL of phosphoryl chloride at room temperature, and the temperature was raised to 130° C. The mixture was stirred for three hours at a temperature of 130° C. Completion of the reaction was identified through TLC monitoring, and the temperature was lowered to room temperature. 200 mL of sodium carbonate aqueous solution was added to the reaction mixture solution, followed by addition of 2 L of ethyl acetate and 1 L of water to separate an organic layer. The separated organic layer was washed twice with 500 mL of soft water. Then, the organic layer was dried using anhydrous sodium sulfate. Anhydrous sodium sulfate was filtered from the organic layer, and the filtered solution was concentrated under reduced pressure. The residue was purified through MPLC (ethyl acetate:hexane=30:70 (v/v)), thereby obtaining 3.4 g of the desired compound (yield: 27%).

$^1$H-NMR (300 MHz, DMSO-d$_6$): δ 8.58 (d, 1H), 8.03 (d, 1H).

MS (ESI$^+$): [M+H]$^+$ m/z=193

Step 2) Preparation of tert-butyl (R)-(1-(2-chloro-3-nitropyridine-4-yl)piperidine-3-yl)carbamate 1.02 g (5.29 mmol) of 2,4-dichloro-3-nitropyridine, 1.06 g (5.29 mmol) of tert-butyl (R)-piperidine-3-ylcarbamate, and 1.1 mL (7.94 mmol) of triethylamine were dissolved in 16 mL of ethanol at room temperature. Then, the mixture was stirred at room temperature for two hours. Completion of the reaction was identified through TLC monitoring, and the reaction mixture solution was concentrated under reduced pressure. The residue was solidified using 20 mL of ethyl acetate and 500 mL of hexane, followed by filtration. The filtered filtrate was concentrated under reduced pressure and purified through MPLC (ethyl acetate:hexane=25:75(v/v)), thereby obtaining 1.3 g of the desired compound (yield: 69%).

$^1$H-NMR (300 MHz, DMSO-d$_6$): δ 8.22 (d, 1H), 7.16 (d, 1H), 6.97 (m, 1H), 3.37 (m, 2H), 2.97 (m, 1H), 2.83 (m, 1H), 1.77 (m, 2H), 1.43 (m, 11H).

MS (ESI$^+$): [M+H]$^+$ m/z=357

Step 3) Preparation of tert-butyl (R)-(1-(3-nitro-2-(p-tolylamino)pyridine-4-yl)piperidine-3-yl)carbamate 150 mg (0.42 mmol) of tert-butyl (R)-(1-(2-chloro-3-nitropyridine-4-yl)piperidine-3-yl)carbamate, 68 mg (0.63 mmol) of p-toluidine, 38 mg (0.04 mmol) of tris(dibenzylideneacetone)dipalladium (0), 24 mg (0.04 mmol) of 4,5-bis(diphenylphosphino)-9,9-dimethylxanthene, and 410 mg (1.26 mmol) of cesium carbonate were dissolved in 1.5 mL of toluene at room temperature. The gas in the mixture solution was removed at room temperature using an ultrasonicator for two minutes. Then, the mixture was stirred for two hours at a temperature of 100° C. Completion of the reaction was identified through TLC monitoring, and the temperature was lowered to room temperature. The reaction mixture solution was filtered using celite, and the celite layer was washed three times using 200 mL of ethyl acetate. The filtered filtrate was washed twice with 300 mL of soft water. Then, the organic layer was dried using anhydrous sodium sulfate. Anhydrous sodium sulfate was filtered from the organic layer, and the filtered solution was concentrated under reduced pressure. Without purification of the residue, the following reaction was proceeded.

MS (ESI$^+$): [M+H]$^+$ m/z=428

Step 4) Preparation of tert-butyl (R)-(1-(3-amino-2-(p-tolylamino)pyridine-4-yl)piperidine-3-yl)carbamate 224 mg (0.52 mmol) of tert-butyl (R)-(1-(3-nitro-2-(p-tolylamino)pyridine-4-yl)piperidine-3-yl)carbamate and 100 mg (1.68 mmol) of iron were dissolved in 2.5 mL of acetate at room temperature. After stirring the mixture at a temperature of 40° C. for 1.5 hours, completion of the reaction was identified through TLC monitoring, and the temperature was lowered to room temperature. The reaction mixture solution was neutralized using a saturated sodium hydrogen carbonate aqueous solution and filtered using celite, and the celite layer was washed twice using 300 mL of ethyl acetate. The filtered filtrate was washed twice with 200 mL of soft water. Then, the organic layer was dried using anhydrous sodium sulfate. Anhydrous sodium sulfate was filtered from the organic layer, and the filtered solution was concentrated under reduced pressure. The residue was purified through MPLC dichloromethane:methanol=95:5 (v/v)), thereby obtaining 113 mg of the desired compound (yield: 54%).

$^1$H-NMR (300 MHz, DMSO-d$_6$): δ 7.59 (s, 1H), 7.44 (m, 3H), 7.02 (m, 3H), 6.47 (m, 1H), 4.56 (s, 2H), 3.62 (m, 1H), 3.04 (m, 1H), 2.82 (m, 1H), 2.40 (m, 2H), 2.21 (s, 3H), 1.98 (m, 2H), 1.79 (m, 1H), 1.32 (m, 11H).

MS (ESI$^+$): [M+H]$^+$ m/z=398

Step 5) Preparation of tert-butyl (R)-(1-(2-(4-cyanophenyl)-3-(p-tolyl)-3H-imidazo[4,5-b]pyridine-7-yl)piperidine-3-yl)carbamate 113 mg (0.28 mmol) of tert-butyl (R)-(1-(3-amino-2-(p-tolylamino)pyridine-4-yl)piperidine-3-yl)carbamate, 37 mg (0.28 mmol) of 4-formylbenzonitrile, and 2 mg (0.01 mmol) of iron chloride (III) were dissolved in 1.5 mL of dimethyl formamide at room temperature. After stirring the mixture at a temperature of 120° C. for 1.5 hours, completion of the reaction was identified through TLC monitoring, and the temperature was lowered to room temperature. 150 mL of ethyl acetate and 50 mL of water were added to the reaction mixture solution to separate an organic layer. After washing the mixture four times with 50 mL of soft water, the organic layer was dried using anhydrous sodium sulfate. Anhydrous sodium sulfate was filtered from the organic layer, and the filtered solution was concentrated under reduced pressure. The residue was purified through MPLC (dichloromethane:methanol=97:3 (v/v)), thereby obtaining 61 mg of the desired compound (yield: 43%).

$^1$H-NMR (300 MHz, DMSO-d$_6$): δ 7.91 (d, 1H), 7.81 (d, 2H), 7.67 (d, 2H), 7.30 (m, 4H), 6.97 (m, 1H), 6.63 (d, 1H), 4.75 (m, 2H), 3.48 (m, 1H), 3.23 (m, 1H), 3.09 (m, 1H), 2.38 (s, 3H), 1.89 (m, 2H), 1.54 (m, 2H), 1.38 (m, 11H).

MS (ESI$^+$): [M+H]$^+$ m/z=509

Step 6) Preparation of (R)-4-(7-(3-aminopiperidine-1-yl)-3-(p-tolyl)-3H-imidazo[4,5-b]pyridine-2-yl)benzonitrile 60 mg (0.12 mmol) of tert-butyl (R)-(1-(2-(4-cyanophenyl)-3-(p-tolyl)-3H-imidazo[4,5-b]pyridine-7-yl)piperidine-3-yl)carbamate and 0.3 mL of trifluoroacetate were dissolved in 1 mL of dichloromethane at room temperature. After stirring the mixture for 1 hour at room temperature, completion of the reaction was identified through TLC monitoring. The reaction mixture solution was neutralized using a saturated sodium hydrogen carbonate aqueous solution. Then, 200 mL of dichloromethane and 100 mL of water were added to the reaction mixture solution, and an organic layer was separated therefrom. After washing the mixture two times with 100 mL of soft water, the organic layer was dried using anhydrous sodium sulfate. Anhydrous sodium sulfate was filtered from the organic layer, and the filtered solution was concentrated under reduced pressure. The residue was purified through MPLC dichloromethane:methanol=95:5 (v/v)), thereby obtaining 43 mg of the desired compound (yield: 88%).

$^1$H-NMR (300 MHz, DMSO-d$_6$): δ 7.89 (d, 1H), 7.84 (d, 2H), 7.66 (d, 2H), 7.32 (m, 2H), 7.26 (m, 2H), 4.86 (m, 1H), 4.60 (m, 1H), 3.16 (m, 1H), 2.80 (m, 2H), 2.37 (s, 3H), 1.95 (m, 2H), 1.91 (m, 1H), 1.73 (m, 1H), 1.26 (m, 2H).

MS (ESI$^+$): [M+H]$^+$ m/z=409

Example 2: Preparation of (R)-4-(7-(3-aminopyrrolidine-1-yl)-3-(4-cyclopropylphenyl)-3H-imidazo[4,5-b]pyridine-2-yl)benzonitrile The desired compound was obtained in substantially the same manner as in Example 1, except that tert-butyl (R)- pyrrolidine-3-ylcarbamate was used instead of tert-butyl (R)-piperidine-3-ylcarbamate in Step 2) of Example 1, and 4-cyclopropylaniline was used instead of p-toluidine in Step 3) of Example 1.

dine-3-ylcarbamate in Step 2) of Example 1, and 4-cyclopropylaniline was used instead of p-toluidine in Step 3) of Example 1.

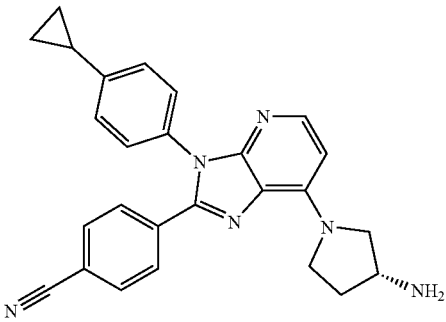 [SMILES: N#Cc1ccc(-c2nc3c(N4CC[C@@H](N)C4)ccnc3n2-c2ccc(C3CC3)cc2)cc1]

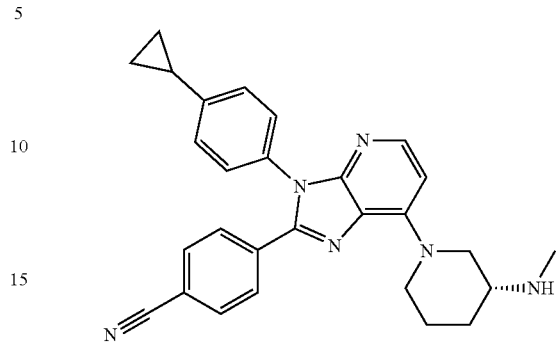

¹H-NMR (300 MHz, DMSO-d₆): δ 0.89 (m, 3H), 7.70 (m, 2H), 7.26 (m, 4H), 6.30 (m, 1H), 4.00 (m, 2H), 3.25 (m, 2H), 2.42 (m, 2H), 2.05 (m, 2H), 1.85 (m, 1H), 1.05 (m, 2H), 0.79 (m, 2H)

MS (ESI⁺): [M+H]⁺ m/z=421

¹H-NMR (300 MHz, DMSO-d₆): δ 7.89 (m, 3H), 7.65 (d, 2H), 7.26 (m, 4H), 6.61 (d, 1H), 4.86 (m, 1H), 4.62 (m, 1H), 3.25 (m, 2H), 2.99 (m, 1H), 2.49 (m, 2H), 2.36 (s, 3H), 1.98 (m, 2H), 1.95 (m, 1H), 1.45 (m, 1H), 1.22 (m, 1H), 1.00 (m, 2H), 0.75 (m, 2H)

MS (ESI⁺): [M+H]⁺ m/z=449

Example 3: Preparation of 4-(7-(4-aminopiperidine-1-yl)-3-(4-cyclopropylphenyl)-3H-imidazo[4,5-b]pyridine-2-yl)benzonitrile The desired compound was obtained in substantially the same manner as in Example 1, except that tert-butyl (R)-piperidine-4-ylcarbamate was used instead of tert-butyl (R)-piperidine-3-ylcarbamate in Step 2) of Example 1, and 4-cyclopropylaniline was used instead of p-toluidine in Step 3) of Example 1.

Example 5: Preparation of (R)-4-(7-(3-aminopiperidine-1-yl)-3-(4-cyclopropylphenyl)-3H-imidazo[4,5-b]pyridine-2-yl)benzonitrile The desired compound was obtained in substantially the same manner as in Example 1, except that -cyclopropylaniline was used instead of p-toluidine in Step 3) of Example 1.

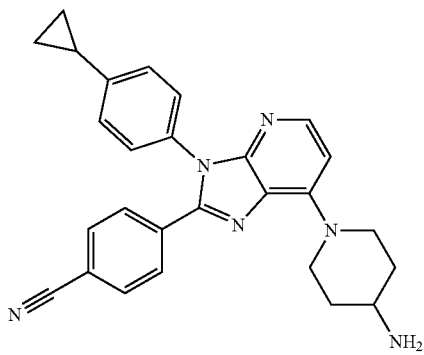 [SMILES: N#Cc1ccc(-c2nc3c(N4CCC(N)CC4)ccnc3n2-c2ccc(C3CC3)cc2)cc1]

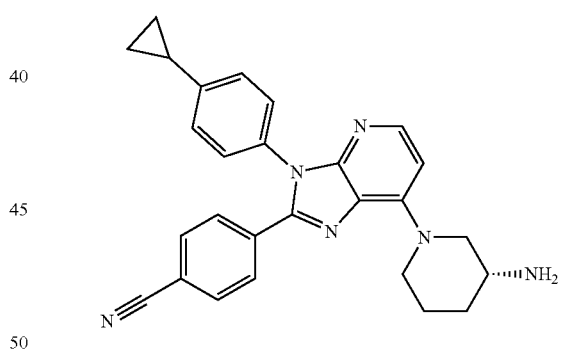

¹H-NMR (300 MHz, DMSO-d₆): δ 7.90 (m, 3H), 7.66 (d, 2H), 7.26 (m, 4H), 6.63 (d, 1H), 4.78 (m, 2H), 2.88 (m, 2H), 2.49 (m, 2H), 2.00 (m, 1H), 1.85 (m, 2H), 1.31 (m, 2H), 1.02 (m, 2H), 0.76 (m, 2H)

MS (ESI⁺): [M+H]⁺ m/z=435

Example 4: Preparation of (R)-4-(3-(4-cyclopropylphenyl)-7-(3-(methylamino)piperidine-1-yl)-3H-imidazo[4,5-b]pyridine-2-yl)benzonitrile The desired compound was obtained in substantially the same manner as in Example 1, except that tert-butyl a piperidine-4-ylcarbamate tert-butyl (R)-methyl(piperidine-3-yl)ylcarbamate was used instead of tert-butyl (R)-piperi- ¹H-NMR (300 MHz, DMSO-d₆): δ 7.90 (m, 3H), 7.66 (d, 2H), 7.21 (m, 4H), 6.61 (d, 1H), 4.86 (m, 1H), 4.62 (m, 1H), 2.99 (m, 2H), 1.88 (m, 3H), 1.75 (m, 1H), 1.50 (m, 1H), 1.21 (m, 1H), 1.02 (m, 2H), 0.99 (m, 2H), 0.73 (m, 2H)

MS (ESI⁺): [M+H]⁺ m/z=435

Example 6: Preparation of (R)-4-(7-(3-piperidine-1-yl)-3-(4-fluoro-phenyl)-3H-imidazo[4,5-b]pyridine-2-yl)-2-fluorobenzonitrile The desired compound was obtained in substantially the same manner as in Example 1, except that 4-fluoroaniline was used instead of p-toluidine in Step 3) of Example 1, and 2-fluoro-4-formylbenzonitrile was used instead of 4-formylbenzonitrile in Step 5) of Example 1.

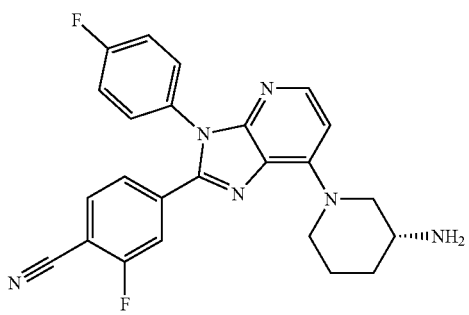 [SMILES: N#Cc1ccc(-c2nc3c(N4CCC[C@@H](N)C4)ccnc3n2-c2ccc(F)cc2)cc1F]

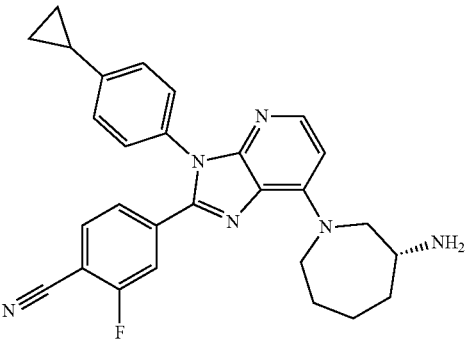

1H-NMR (300 MHz, CDCl3): δ 8.05 (d, 1H), 7.49 (m, 2H), 7.36 (m, 3H), 7.24 (d, 2H) 6.50 (d, 1H), 4.63 (m, 1H), 4.52 (m, 1H), 3.30 (m, 2H), 3.01 (m 1H), 1.92 (m, 4H)

MS (ESI+): [M+H]+ m/z=431

Example 7: Preparation of (R)-4-(7-(3-aminopiperidine-1-yl)-3-(2-fluoro-4-methylphenyl)-3H-imidazo[4,5-b]pyridine-2-yl)-2-fluorobenzonitrile The desired compound was obtained in substantially the same manner as in Example 1, except that 2-fluoro-4-methylaniline was used instead of p-toluidine in Step 3) of Example 1, and 2-fluoro-4-formylbenzonitrile was used instead of 4-formylbenzonitrile in Step 5) of Example 1.

¹H-NMR (300 MHz, CDCl₃): δ 8.03 (d, 1H), 7.48 (m, 3H), 7.22 (s, 4H), 6.37 (d, 1H), 4.74 (d, 1H), 4.12 (m, 2H), 3.57 (m, 2H), 3.12 (m, 1H), 1.97 (m, 2H), 1.50 (s, 2H), 1.27 (m, 2H), 1.05 (m, 2H), 0.77 (m, 2H)

MS (ESI+): [M+H]+ m/z=467.2

Example 9: Preparation of (R)-4-(7-(3-aminopiperidin-1-yl)-3-(4-(piperidine-1-yl)phenyl)-3H-imidazo[4,5-b]pyridine-2-yl)-2-fluorobenzonitrile The desired compound was obtained in substantially the same manner as in Example 1, except that 4-(piperidine-1-yl)aniline was used instead of p-toluidine in Step 3) of Example 1, and 2-fluoro-4-formylbenzonitrile was used instead of 4-formylbenzonitrile in Step 5) of Example 1.

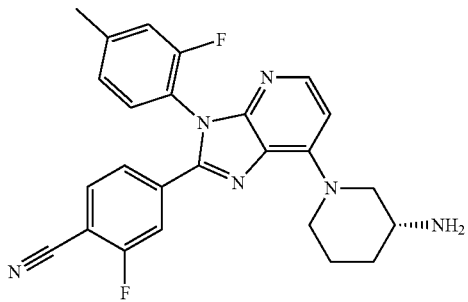 [SMILES: Cc1ccc(-n2c(-c3ccc(C#N)c(F)c3)nc3c(N4CCC[C@@H](N)C4)ccnc32)c(F)c1]

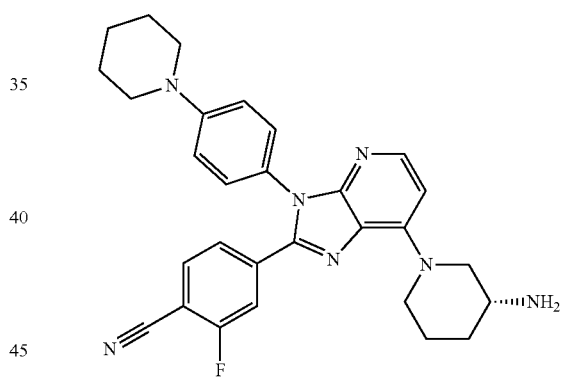

¹H-NMR (300 MHz, CDCl₃): δ 8.06 (d, 1H), 7.62 (d, 1H), 7.52 (m, 2H), 7.43 (m, 1H), 7.17 (d, 1H), 7.05 (m, 1H), 6.55 (d, 1H), 4.61 (m, 1H), 4.21 (m, 1H), 3.65 (m, 1H), 3.37 (m, 2H), 2.42 (s, 3H), 1.92 (m, 4H)

MS (ESI+): [M+H]+ m/z=445.2

Example 8: Preparation of (R)-4-(7-(3-aminoazepane-1-yl)-3-(4-cyclopropylphenyl)-3H-imidazo[4,5-b]pyridine-2-yl)-2-fluorobenzonitrile The desired compound was obtained in substantially the same manner as in Example 1, except that tert-butyl (R)-azepane-3-ylcarbamate was used instead of tert-butyl (R)-piperidine-3-ylcarbamate in Step 2) of Example 1, 4-cyclopropylaniline was used instead of p-toluidine in Step 3) of Example 1, and 2-fluoro-4-formylbenzonitrile was used instead of 4-formylbenzonitrile in Step 5) of Example 1.

¹H-NMR (300 MHz, CDCl₃): δ 8.09 (d, 1H), 7.58 (d, 1H), 7.50 (m, 2H), 7.14 (dd, 2H), 7.02 (dd, 2H), 6.50 (d, 1H), 4.69 (d, 1H), 4.43 (d, 1H), 3.48 (m, 2H), 3.24 (m, 4H), 2.14 (m, 4H), 1.74 (m, 4H), 1.45 (m, 3H)

MS (ESI+): [M+H]+ m/z=496.3

Example 10: Preparation of (R)-4-(7-(3-aminopiperidine-1-yl)-3-(2-fluoro-4-(piperidine-1-yl)phenyl)-3H-imidazo[4,5-b]pyridine-2-yl)-2-fluorobenzonitrile The desired compound was obtained in substantially the same manner as in Example 1, except that 2-fluoro-4-(piperidine-1-yl)aniline was used instead of p-toluidine in Step 3) of Example 1, synthesized using tert-butyl (2-fluoro-4-iodophenyl)carbamate was used instead of tert-butyl (4-bromo-2,6-difluorophenyl)carbamate and piperidine instead of pyrrolidine was used in Preparation Example 2), and 2-fluoro-4-formylbenzonitrile was used instead of 4-formylbenzonitrile in Step 5) of Example 1.

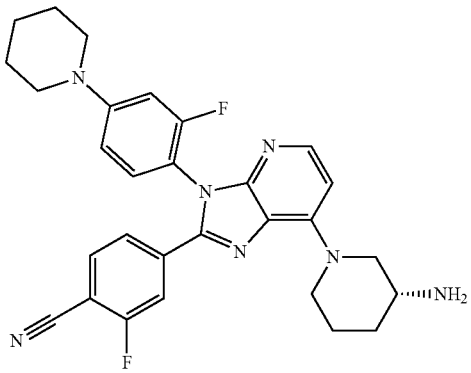

¹H-NMR (300 MHz, CDCl₃): δ 8.09 (d, 1H), 7.54 (m, 3H), 7.24 (s, 1H), 6.79 (d, 1H), 6.68 (dd, 1H), 6.50 (d, 1H), 4.52 (m, 1H), 3.48 (m, 2H), 3.24 (m, 4H), 2.14 (m, 4H), 1.74 (m, 4H), 1.45 (m, 3H)
MS (ESI⁺): [M+H]⁺ m/z=514.3

Example 11: Preparation of (R)-4-(7-(3-aminopiperidine-1-yl)-3-(4-cyclopropyl-2-fluorophenyl)-3H-imidazo[4,5-b]pyridine-2-yl)-2-fluorobenzonitrile The desired compound was obtained in substantially the same manner as in Example 1, except that 4-cyclopropyl-2-fluoro-1-nitrobenzene in Step 1) of Preparation Example 1 was used instead of p-toluidine in Step 3) of Example 1, and 2-fluoro-4-formylbenzonitrile was used instead of 4-formylbenzonitrile in Step 5) of Example 1.

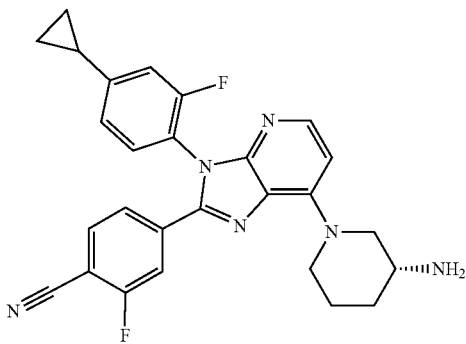 [SMILES: N#Cc1ccc(-c2nc3c(N4CCC[C@@H](N)C4)ccnc3n2-c2ccc(C3CC3)cc2F)cc1F]

¹H-NMR (300 MHz, CDCl₃): δ 8.15 (d, 1H), 7.53 (m, 2H), 7.42 (q, 1H), 7.29 (t, 1H), 7.05 (d, 1H), 6.91 (dd, 1H), 6.51 (d, 1H), 4.63 (m, 1H), 4.51 (bs, 1H), 3.27 (m, 2H), 3.11 (m, 1H), 1.94 (m, 1H), 1.75 (m, 3H), 1.42 (m, 1H), 1.08 (m, 2H), 0.77 (m, 2H)
MS (ESI⁺): [M+H]⁺ m/z=471.2

Example 12: Preparation of (R)-2-fluoro-4-(7-(3-(methylamino)piperidine-1-yl)-3-(4-(pyrrolidine-1-yl)phenyl)-3H-imidazo[4,5-b]pyridine-2-yl)benzonitrile The desired compound was obtained in substantially the same manner as in Example 1, except that tert-butyl (R)-methyl-(piperidine-3-yl)carbamate was used instead of tert-butyl (R)-piperidine-3-ylcarbamate in Step 2) of Example 1, 4-(pyrrolidine-1-yl)aniline was used instead of p-toluidine in Step 3) of Example 1, and 2-fluoro-4-formylbenzonitrile was used instead of 4-formylbenzonitrile in Step 5) of Example 1.

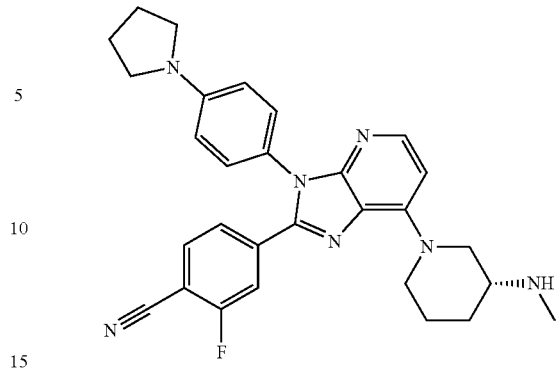

¹H-NMR (300 MHz, CDCl₃): δ 8.07 (d, 1H), 7.62 (d, 1H), 7.51 (m, 2H), 7.12 (d, 2H), 6.63 (d, 2H), 6.48 (d, 1H), 4.89 (d, 1H), 4.45 (d, 1H), 3.29 (m, 6H), 2.80 (m, 1H), 2.61 (s, 3H), 2.06 (m, 4H), 1.54 (m, 4H)
MS (ESI⁺): [M+H]⁺ m/z=496

Example 13: Preparation of (R)-4-(7-(3-aminopiperidine-1-yl)-3-(4-(pyrrolidine-1-yl)phenyl)-3H-imidazo[4,5-b]pyridine-2-yl)-2-fluorobenzonitrile The desired compound was obtained in substantially the same manner as in Example 1, except that 4-(pyrrolidine-1-yl)aniline was used instead of p-toluidine in Step 3) of Example 1, and 2-fluoro-4-formylbenzonitrile was used instead of 4-formylbenzonitrile in Step 5) of Example 1.

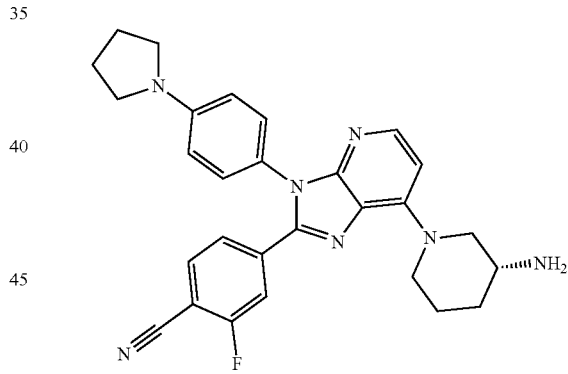

¹H-NMR (300 MHz, CDCl₃): δ 8.07 (d, 1H), 7.62 (d, 1H), 7.52 (m, 2H), 7.12 (d, 2H), 6.64 (d, 2H), 6.48 (d, 1H), 4.62 (d, 1H), 4.54 (d, 1H), 3.28 (m, 4H), 3.18 (m, 3H), 2.07 (m, 4H), 1.83 (m, 2H), 1.46 (m, 2H)
MS (ESI⁺): [M+H]⁺ m/z=482

Example 14: Preparation of (R)-4-(7-(3-aminopiperidine-1-yl)-3-(4-(dimethylamino)phenyl)-3H-imidazo[4,5-b]pyridine-2-yl)-2-fluorobenzonitrile The desired compound was obtained in substantially the same manner as in Example 1, except that N,N-dimethylbenzene-1,4-diamine was used instead of p-toluidine in Step 3) of Example 1, and 2-fluoro-4-formylbenzonitrile was used instead of 4-formylbenzonitrile in Step 5) of Example 1.

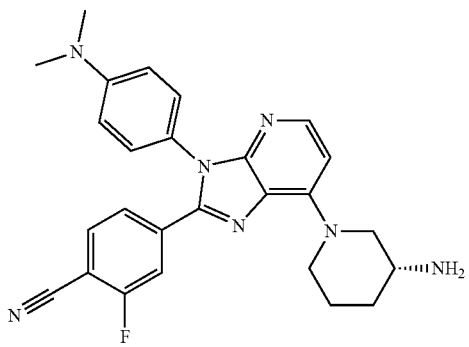 [SMILES: CN(C)c1ccc(-n2c(-c3ccc(C#N)c(F)c3)nc3c(N4CCC[C@@H](N)C4)ccnc32)cc1]

¹H-NMR (300 MHz, CDCl₃): δ 8.02 (d, 1H), 7.53 (m, 3H), 7.12 (d, 2H), 6.78 (d, 2H), 6.49 (d, 1H), 4.63 (d, 1H), 4.42 (d, 1H), 3.30 (m, 2H), 3.09 (m, 1H), 3.02 (s, 3H), 1.96 (m, 2H), 1.63 (m, 2H)

MS (ESI⁺): [M+H]⁺ m/z=456

Example 15: Preparation of 4-(7-(3-amino-8-azabicyclo[3.2.1]octane-8-yl)-3-(p-tolyl)-3H-imidazo[4,5-b]pyridine-2-yl)-2-fluorobenzonitrile The desired compound was obtained in substantially the same manner as in Example 1, except that tert-butyl(8-azabicyclo[3.2.1]octane-3-yl)carbamate was used instead of tert-butyl (R)-piperidine-3-ylcarbamate in Step 2) of Example 1, and 2-fluoro-4-formylbenzonitrile was used instead of 4-formylbenzonitrile in Step 5) of Example 1.

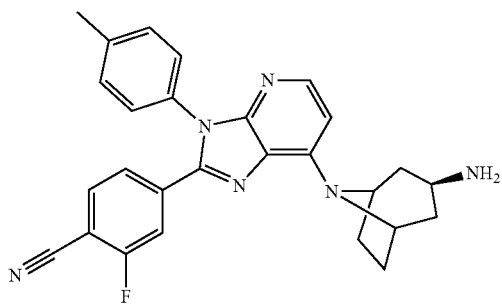

¹H-NMR (300 MHz, CDCl₃): δ 8.03 (d, 1H), 7.51 (m, 2H), 7.37 (m, 3H), 7.24 (m, 2H), 6.40 (d, 1H), 3.48 (q, 1H), 3.30 (m, 1H), 2.34 (m, 2H), 2.21 (m, 2H), 1.60 (m 2H), 1.23 (m, 3H), 0.87 (m, 1H)

MS (ESI⁺): [M+H]⁺ m/z=453.2

Example 16: Preparation of (R)-4-(7-(3-aminopiperidine-1-yl)-3-(o-tolyl)-3H-imidazo[4,5-b]pyridine-2-yl)-2-fluorobenzonitrile The desired compound was obtained in substantially the same manner as in Example 1, except that o-toluidine was used instead of p-toluidine in Step 3) of Example 1, and 2-fluoro-4-formylbenzonitrile was used instead of 4-formylbenzonitrile in Step 5) of Example 1.

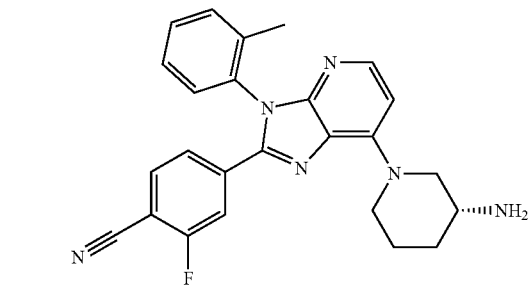

¹H-NMR (300 MHz, CDCl₃): δ 8.05 (d, 1H), 7.46 (m, 4H), 7.38 (m, 2H), 7.24 (m, 1H), 6.50 (d, 1H), 4.59 (m, 2H), 3.22 (m, 3H), 2.03 (m, 2H), 1.97 (s, 3H), 1.78 (m, 5H), 1.44 (m, 1H)

MS (ESI⁺): [M+H]⁺ m/z=427.2

Example 17: Preparation of (R)-4-(7-(3-aminopiperidine-1-yl)-3-(m-tolyl)-3H-imidazo[4,5-b]pyridine-2-yl)-2-fluorobenzonitrile The desired compound was obtained in substantially the same manner as in Example 1, except that m-toluidine was used instead of p-toluidine in Step 3) of Example 1, and 2-fluoro-4-formylbenzonitrile was used instead of 4-formylbenzonitrile in Step 5) of Example 1.

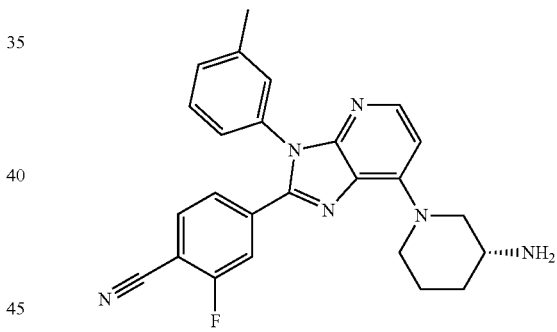

¹H-NMR (300 MHz, CDCl₃): δ 8.06 (d, 1H), 7.48 (m, 2H), 7.41 (m, 3H), 7.16 (s, 1H), 7.10 (d, 1H), 6.50 (d, 1H), 4.64 (d, 1H), 4.53 (d, 1H), 3.26 (m, 2H), 3.00 (m, 1H), 2.41 (s, 3H), 1.91 (m, 5H), 1.25 (m, 1H)

MS (ESI⁺): [M+H]⁺ m/z=427.2

Example 18: Preparation of (R)-4-(7-(3-aminopiperidine-1-yl)-3-(4-cyclopropyl-2,6-difluorophenyl)-3H-imidazo[4,5-b]pyridine-2-yl)-2-fluorobenzonitrile The desired compound was obtained in substantially the same manner as in Example 1, except that 4-cyclopropyl-2-fluoro-1-nitrobenzene in Step 1) of Preparation Example 1 was used instead of p-toluidine in Step 3) of Example 1, and 2-fluoro-4-formylbenzonitrile was used instead of 4-formylbenzonitrile in Step 5) of Example 1.

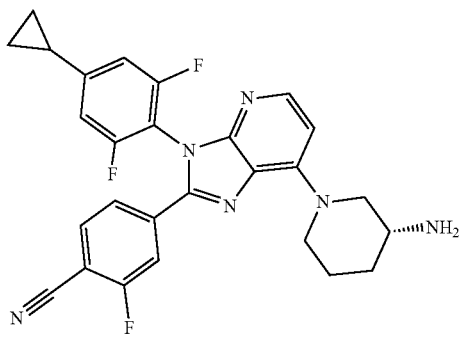 [SMILES: N#Cc1ccc(-c2nc3c(N4CCC[C@@H](N)C4)ccnc3n2-c2c(F)cc(C3CC3)cc2F)cc1F]

¹H-NMR (300 MHz, CDCl₃): δ 8.07 (d, 1H), 7.58 (m, 2H), 7.44 (d, 1H), 6.79 (m, 2H), 6.53 (s, 1H), 4.63 (d, 1H), 4.52 (d, 1H), 3.49 (m 1H), 3.27 (m 2H), 3.11 (m, 1H), 1.94 (m, 1H), 1.75 (m, 3H), 1.42 (m, 1H), 1.08 (m, 2H), 0.77 (m, 2H)

MS (ESI⁺): [M+H]⁺ m/z=489.2

Example 19: Preparation of (R)-4-(7-(3-aminopiperidine-1-yl)-3-(2,6-difluoro-4-(pyrrolidine-1-yl)phenyl)-3H-imidazo[4,5-b]pyridine-2-yl)-2-fluorobenzonitrile The desired compound was obtained in substantially the same manner as in Example 1, except that 2-fluoro-4-(pyrrolidine-1-yl)aniline synthesized in Preparation Example 3) was used instead of p-toluidine in Step 3) of Example 1, and 2-fluoro-4-formylbenzonitrile was used instead of 4-formylbenzonitrile in Step 5) of Example 1.

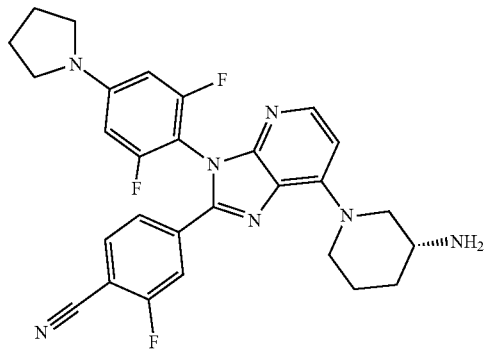 [SMILES: N#Cc1ccc(-c2nc3c(N4CCC[C@@H](N)C4)ccnc3n2-c2c(F)cc(N3CCCC3)cc2F)cc1F]

¹H-NMR (300 MHz, CDCl₃): δ 8.08 (d, 1H), 7.62 (m, 3H), 6.50 (d, 1H), 6.19 (d, 2H), 4.64 (d, 1H), 4.52 (d, 1H), 3.30 (m, 4H), 3.17 (m, 2H), 2.18 (m, 2H), 2.06 (m, 4H), 1.88 (m, 2H), 1.48 (m, 1H)

MS (ESI⁺): [M+H]⁺ m/z=518

Example 20: Preparation of (R)-4-(7-(3-aminopiperidine-1-yl)-3-(3-fluoro-4-methoxyphenyl)-3H-imidazo[4,5-b]pyridine-2-yl)-2-fluorobenzonitrile The desired compound was obtained in substantially the same manner as in Example 1, except that 3-fluoro-4-methoxyaniline was used instead of p-toluidine in Step 3) of Example 1, and 2-fluoro-4-formylbenzonitrile was used instead of 4-formylbenzonitrile in Step 5) of Example 1.

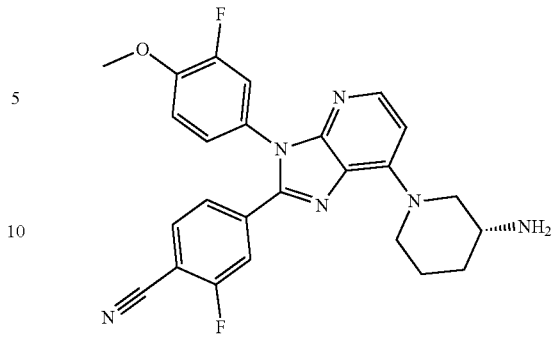

¹H-NMR (300 MHz, CDCl₃): δ 8.08 (d, 1H), 7.50 (m, 2H), 7.41 (d, 1H), 7.11 (m, 3H), 6.52 (d, 1H), 4.67 (d, 1H), 4.43 (d, 1H), 3.98 (s, 3H), 3.23 (m, 2H), 3.17 (m, 1H), 2.44 (m, 2H), 2.11 (m, 1H), 2.08 (m, 1H), 1.96 (m, 1H), 1.61 (m, 1H),

MS (ESI⁺): [M+H]⁺ m/z=461.2

Example 21: Preparation of (R)-4-(7-(3-aminopiperidine-1-yl)-3-(4-(diethylamino)phenyl)-3H-imidazo[4,5-b]pyridine-2-yl)-2-fluorobenzonitrile The desired compound was obtained in substantially the same manner as in Example 1, except that N,N-diethylbenzene-1,4-diamine was used instead of p-toluidine in Step 3) of Example 1, and 2-fluoro-4-formylbenzonitrile was used instead of 4-formylbenzonitrile in Step 5) of Example 1.

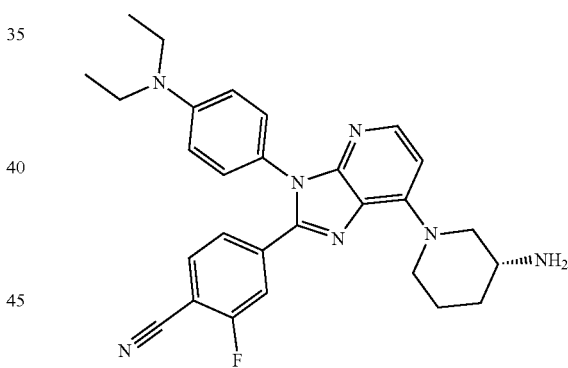

¹H-NMR (300 MHz, CDCl₃): δ 8.08 (d, 1H), 7.51 (m, 3H), 7.08 (d, 2H), 6.71 (d, 2H), 6.47 (d, 1H), 4.63 (d, 1H), 4.53 (d, 1H), 3.41 (m, 5H), 3.22 (m, 2H), 3.08 (m, 1H), 2.03 (m, 1H), 1.89 (m, 1H), 1.77 (m, 1H), 1.46 (m, 1H), 1.21 (m, 6H)

MS (ESI⁺): [M+H]⁺ m/z=483.3

Example 22: Preparation of (R)-4-(7-(3-aminopiperidine-1-yl)-3-(4-(cyclopropyl(methyl)amino))phenyl)-3H-imidazo[4,5-b]pyridine-2-yl)-2-fluorobenzonitrile The desired compound was obtained in substantially the same manner as in Example 1, except that N-cyclopropyl-N-methylbenzene-1,4-diamine synthesized in Preparation Example 3) was used instead of p-toluidine in Step 3) of Example 1, and 2-fluoro-4-formylbenzonitrile was used instead of 4-formylbenzonitrile in Step 5) of Example 1.

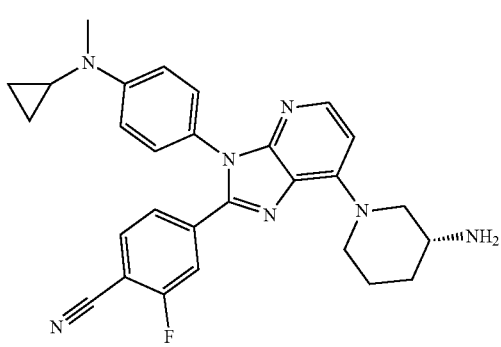 [SMILES: CN(c1ccc(-n2c(-c3ccc(C#N)c(F)c3)nc3c(N4CCC[C@@H](N)C4)ccnc32)cc1)C1CC1]

¹H-NMR (300 MHz, CDCl₃): δ 8.09 (d, 1H), 7.59 (m, 3H), 7.15 (d, 2H), 7.06 (d, 2H), 6.50 (d, 1H), 4.69 (d, 1H), 4.43 (d, 1H), 3.43 (m, 4H), 3.03 (s, 3H), 2.51 (m, 1H), 2.08 (m, 4H), 1.28 (m, 1H), 0.88 (m, 2H), 0.71 (m, 2H)

MS (ESI⁺): [M+H]⁺ m/z=482.2

Example 23: Preparation of 4-(7-((R)-3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile 2-fluoro-4-(3-methoxypyrrolidine-1-yl)aniline was prepared by using tert-butyl (4-bromo-2-fluorophenyl)carbamate instead of tert-butyl (4-bromo-2,6-difluorophenyl)carbamate in Step 1) of Preparation Example 2) and 3-methoxypyrrolidine instead of pyrrolidine. The desired compound was obtained in substantially the same manner as in Example 1, except that 2-fluoro-4-(methoxypyrrolidine-1-yl)aniline described above was used instead of p-toluidine in Step 3) of Example 1, and 2-fluoro-4-formylbenzonitrile was used instead of 4-formylbenzonitrile in Step 5) of Example 1.

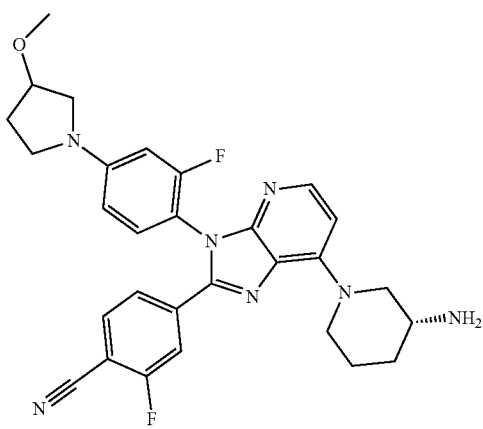 [SMILES: COC1CCN(c2ccc(-n3c(-c4ccc(C#N)c(F)c4)nc4c(N5CCC[C@@H](N)C5)ccnc43)c(F)c2)C1]

¹H-NMR (300 MHz, CDCl₃): δ 8.06 (d, 1H), 7.65 (d, 1H), 7.54 (m, 2H), 7.21 (t, 1H), 6.48 (m, 2H), 6.35 (d, 1H), 4.58 (m, 2H), 4.13 (m, 1H), 3.31 (m, 10H), 2.07 (m, 6H), 1.36 (m, 2H)

MS (ESI⁺): [M+H]⁺ m/z=530

Example 24: Preparation of 4-(7-((R)-3-aminopiperidine-1-yl)-3-(2-fluoro-4-((R)-3-methoxypyrrolidine-1-yl)phenyl)-3H-imidazo[4,5-b]pyridine-2-yl)-2-fluorobenzonitrile 2-fluoro-4-((R)-3-methoxypyrrolidine-1-yl)aniline was obtained in substantially the same manner as in Preparation Example 2), except that tert-butyl (4-bromo-2-fluorophenyl)carbamate was used instead of tert-butyl (4-bromo-2,6-difluorophenyl)carbamate, and (R)-3-methoxypyrrolidine was used instead of pyrrolidine in Step 1) of Preparation Example 2). The desired compound was obtained in substantially the same manner as in Example 1, except that 2-fluoro-4-((R)-3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

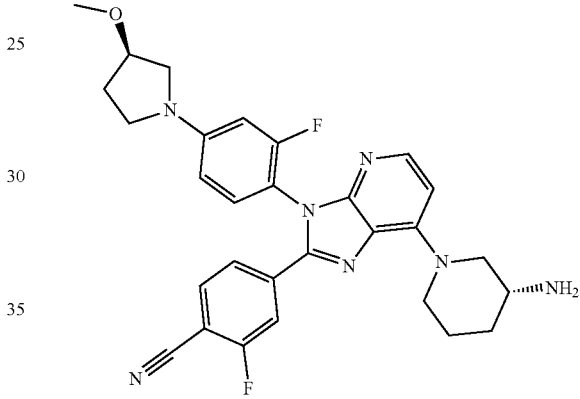

¹H-NMR (300 MHz, CDCl₃): δ 8.07 (d, 1H), 7.67 (d, 1H), 7.55 (m, 2H), 7.22 (m, 1H), 6.50 (m, 2H), 6.38 (m, 1H), 4.65 (m, 2H), 4.12 (s, 1H), 3.51 (m, 2H), 3.38 (s, 6H), 3.21 (m, 2H), 2.22 (m, 4H), 1.91 (m, 2H), 1.54 (m, 2H)

MS (ESI⁺): [M+H]⁺ m/z=530.2

Example 25: Preparation of 4-(7-((R)-3-aminopiperidine-1-yl)-3-(2-fluoro-4-((S)-3-methoxypyrrolidine-1-yl)phenyl)-3H-imidazo[4,5-b]pyridine-2-yl)-2-fluorobenzonitrile 2-fluoro-4-((S)-3-methoxypyrrolidine-1-yl)aniline was obtained in substantially the same manner as in Preparation Example 2), except that tert-butyl (4-bromo-2-fluorophenyl)carbamate was used instead of tert-butyl (4-bromo-2,6-difluorophenyl)carbamate, and (S)-3-methoxypyrrolidine was used instead of pyrrolidine in Step 1) of Preparation Example 2). The desired compound was obtained in substantially the same manner as in Example 1, except that 2-fluoro-4-((S)methoxypyrrolidine-1-yl)aniline described above was used instead of p-toluidine in Step 3) of Example 1, and 2-fluoro-4-formylbenzonitrile was used instead of 4-formylbenzonitrile in Step 5) of Example 1.

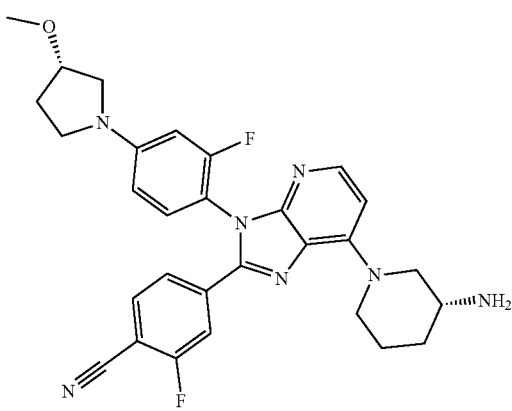 [SMILES: CO[C@H]1CCN(c2ccc(-n3c(-c4ccc(C#N)c(F)c4)nc4c(N5CCC[C@@H](N)C5)ccnc43)c(F)c2)C1]

¹H-NMR (300 MHz, DMSO-d₆): δ 8.06 (d, 1H), 7.64 (d, 1H), 7.54 (m, 2H), 7.20 (t, 1H), 6.49 (d, 2H), 6.45 (d, 1H), 6.35 (d, 1H), 4.60 (m, 2H), 4.12 (m, 1H), 3.30 (m, 10H), 2.05 (m, 6H), 1.44 (m, 2H)

MS (ESI⁺): [M+H]⁺ m/z=530

Example 26: Preparation of (R)-4-(7-(3-aminopiperidine-1-yl)-3-(4-(3,3-difluoropyrrolidine-1-yl)-2-fluorophenyl)-3H-imidazo[4,5-b]pyridine-2-yl)-2-fluorobenzonitrile The desired compound was obtained in substantially the same manner as in Example 1, except that 4-(3,3-difluoropyrrolidine-1-yl)-fluoroaniline was used instead of p-toluidine in Step 3) of Example 1, and 2-fluoro-4-formylbenzonitrile was used instead of 4-formylbenzonitrile in Step 5) of Example 1.

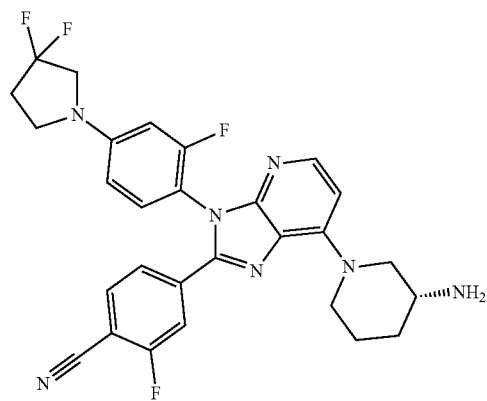 [SMILES: N#Cc1ccc(-c2nc3c(N4CCC[C@@H](N)C4)ccnc3n2-c2ccc(N3CCC(F)(F)C3)cc2F)cc1F]

¹H-NMR (300 MHz, CDCl₃): δ 8.07 (d, 1H), 7.62 (m, 3H), 7.24 (m, 1H), 6.49 (m, 1H), 6.43 (m, 1H), 6.38 (m, 1H), 4.66 (m, 1H), 4.51 (m, 1H), 3.71 (t, 2H), 3.56 (t, 2H), 3.28 (m, 2H), 3.11 (m, 1H), 2.59 (m, 2H), 1.92 (m, 1H), 1.89 (m, 2H), 1.25 (t, 1H)

MS (ESI⁺): [M+H]⁺ m/z=536.2

Example 27: Preparation of (R)-4-(7-(3-aminopiperidine-1-yl)-3-(2-fluoro-4-(pyrrolidine-1-yl)phenyl)-3H-imidazo[4,5-b]pyridine-2-yl)-2-fluorobenzonitrile The desired compound was obtained in substantially the same manner as in Example 1, except that 2-fluoro-4-(pyrrolidine-1-yl)aniline was used instead of p-toluidine in Step 3) of Example 1, and 2-fluoro-4-formylbenzonitrile was used instead of 4-formylbenzonitrile in Step 5) of Example 1.

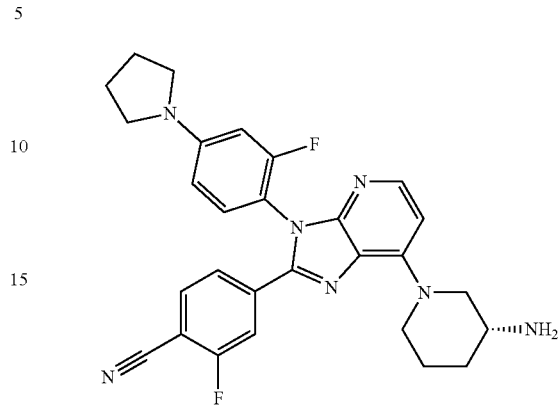

¹H-NMR (300 MHz, CDCl₃): δ 8.07 (d, 1H), 7.59 (m, 3H), 7.19 (t, 1H), 6.46 (m, 2H), 6.34 (d, 1H), 4.63 (d, 1H), 4.52 (m, 1H), 3.35 (m, 4H), 1.95 (m, 2H), 1.34 (m, 2H)

MS (ESI⁺): [M+H]⁺ m/z=500

Example 28: Preparation of (R)-4-(7-(3-aminopiperidine-1-yl)-3-(p-tolyl)-3H-imidazo[4,5-b]pyridine-2-yl)-2-fluorobenzonitrile The desired compound was obtained in substantially the same manner as in Example 1, except that 2-fluoro-4-formylbenzonitrile was used instead of 4-formylbenzonitrile in Step 5) of Example 1.

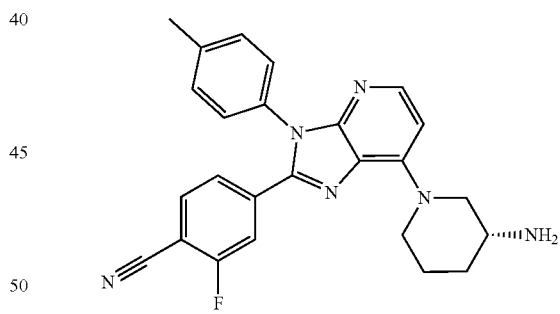

¹H-NMR (300 MHz, CDCl₃): δ 8.05 (d, 1H), 7.36 (m, 5H), 7.15 (m, 2H), 6.50 (d, 1H), 4.61 (m, 1H), 4.21 (m, 1H), 3.65 (m, 1H), 3.37 (m, 2H), 2.42 (s, 3H), 1.92 (m, 4H)

Example 29: Preparation of (R)-4-(7-(3-aminopiperidine-1-yl)-3-phenyl-3H-imidazo[4,5-b]pyridine-2-yl)-2-fluorobenzonitrile The desired compound was obtained in substantially the same manner as in Example 1, except that 2-fluoro-4-formylbenzonitrile was used instead of 4-formylbenzonitrile in Step 5) of Example 1.

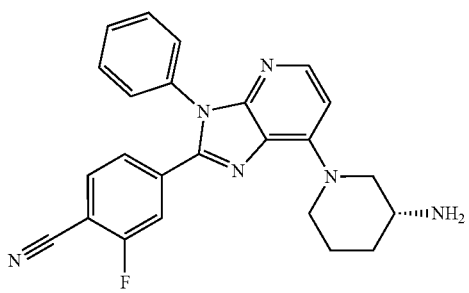 [SMILES: N#Cc1ccc(-c2nc3c(N4CCC[C@@H](N)C4)ccnc3n2-c2ccccc2)cc1F]

¹H-NMR (300 MHz, CDCl₃): δ 8.05 (d, 1H), 7.36 (m, 5H), 7.15 (m, 2H), 6.50 (d, 1H), 4.61 (m, 1H), 4.21 (m, 1H), 3.65 (m, 1H), 3.37 (m, 2H), 2.42 (s, 3H), 1.92 (m, 4H)

MS (ESI⁺): [M+H]⁺ m/z=427

Example 30: Preparation of (R)-4-(7-(3-aminopiperidine-1-yl)-3-(4-cyclopentyloxy)-2-fluorophenyl)-3H-imidazo[4,5-b]pyridine-2-yl)-2-fluorobenzonitrile The desired compound was obtained in substantially the same manner as in Example 1, except that 4-(cyclopentyloxy)-2-fluoroaniline was used instead of p-toluidine in Step 4) of Example 1, and 2-fluoro-4-formylbenzonitrile was used instead of 4-formylbenzonitrile in Step 5) of Example 1.

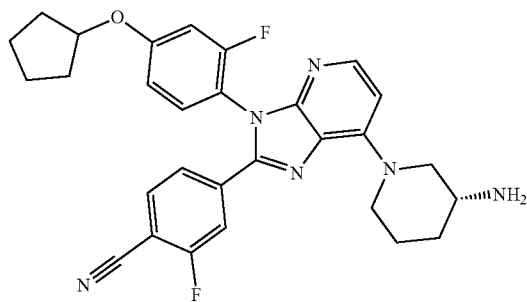 [SMILES: N#Cc1ccc(-c2nc3c(N4CCC[C@@H](N)C4)ccnc3n2-c2ccc(OC3CCCC3)cc2F)cc1F]

¹H-NMR (300 MHz, DMSO-d₆): δ 7.99-7.92 (m, 2H), 7.63 (d, 1H), 7.58-7.48 (m, 2H), 7.07 (d, 1H), 7.02 (d, 1H), 6.65 (d, 1H), 4.95 (m, 1H), 4.80 (m, 1H), 4.65 (m, 1H), 3.13 (m, 2H), 2.94-2.80 (m, 2H), 1.99 (m, 4H), 1.94-1.64 (m, 5H).

MS (ESI⁺): [M+H]⁺ m/z=515.2

Example 31: Preparation of (R)-4-(7-(3-aminopiperidine-1-yl)-3-(2-fluoro-4-(3-methoxyazetidine-1-yl)phenyl)-3H-imidazo[4,5-b]pyridine-2-yl)-2-fluorobenzonitrile The desired compound was obtained in substantially the same manner as in Example 1, except that 2-fluoro-4-(3-methoxyazetidine-1-yl)aniline was used instead of p-toluidine in Step 3) of Example 1, and 2-fluoro-4-formylbenzonitrile was used instead of 4-formylbenzonitrile in Step 5) of Example 1.

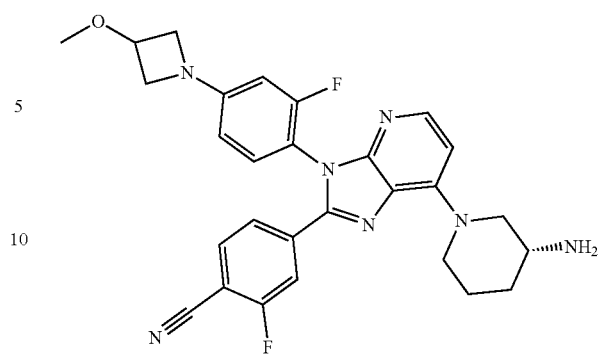

¹H-NMR (300 MHz, DMSO-d₆): δ 7.98-7.90 (m, 2H), 7.67 (d, 1H), 7.51 (d, 1H), 7.35 (t, 1H), 6.61 (d, 1H), 6.41 (m, 2H), 4.65 (m, 1H), 4.60 (m, 1H), 4.37 (m, 1H), 4.15 (m, 2H), 3.71 (m, 2H), 3.38 (m, 3H), 3.12 (m, 2H), 2.93 (m, 2H), 2.26-1.29 (m, 4H).

MS (ESI⁺): [M+H]⁺ m/z=516.2

Example 32: Preparation of (S)-1-(4-(7-((R)-3-aminopiperidine-1-yl)-2-(4-cyano-3-fluorophenyl)-3H-imidazo[4,5-b]pyridine-3-yl)-3-fluorophenyl)pyrrolidine-3-yl acetate The desired compound was obtained in substantially the same manner as in Example 1, except that (S)-1-(4-amino-3-fluorophenyl)pyrrolidine-3-yl acetate was used instead of p-toluidine in Step 3) of Example 1, and 2-fluoro-4-formylbenzonitrile was used instead of 4-formylbenzonitrile in Step 5) of Example 1.

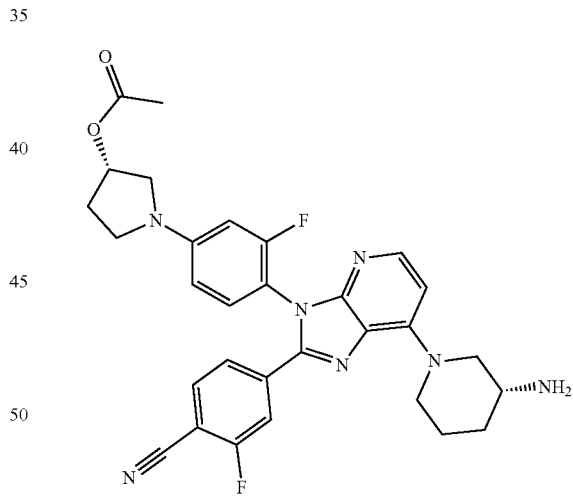

¹H-NMR (300 MHz, DMSO-d₆): δ 7.99 (t, 1H), 7.90 (d, 1H), 7.71 (d, 1H), 7.54 (d, 1H), 7.37 (t, 1H), 6.61 (d, 1H), 6.62-6.51 (m, 3H), 5.38 (m, 1H), 4.64 (m, 1H), 4.60 (m, 1H), 3.61-2.79 (m, 6H), 2.30-2.24 (m, 3H), 1.93 (s, 3H), 1.89-1.08 (m, 4H).

MS (ESI⁺): [M+H]⁺ m/z=558.2

Example 33: (R)-4-(7-(3-aminopiperidine-1-yl)-3-(2-fluoro-4-morpholinophenyl)-3H-imidazo[4,5-b]pyridine-2-yl)-2-fluorobenzonitrile The desired compound was obtained in substantially the same manner as in Example 1, except that 2-fluoro-4- morpholinoaniline was used instead of p-toluidine in Step 3) of Example 1, and 2-fluoro-4-formylbenzonitrile was used instead of 4-formylbenzonitrile in Step 5) of Example 1.

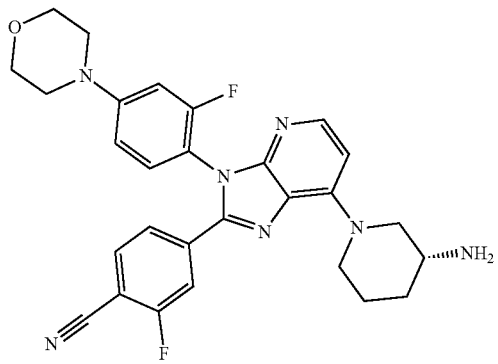 [SMILES: N#Cc1ccc(-c2nc3c(N4CCC[C@@H](N)C4)ccnc3n2-c2ccc(N3CCOCC3)cc2F)cc1F]

$^1$H-NMR (300 MHz, DMSO-d$_6$): δ 7.99 (t, 1H), 7.94 (d, 1H), 7.68 (d, 1H), 7.51-7.47 (m, 2H), 6.91 (m, 2H), 6.63 (d, 1H), 5.38 (m, 1H), 4.64 (m, 1H), 3.26 (m, 4H), 3.23 (m, 2H), 2.92-2.77 (m, 2H), 1.92-1.22 (m, 5H).
MS (ESI$^+$): [M+H]$^+$ m/z=516.2

Example 34: (R)-4-(7-(3-aminopiperidine-1-yl)-3-(2-fluoro-4-methylpiperazine-1-yl)phenyl)-3H-imidazo[4,5-b]pyridine-2-yl)-2-fluorobenzonitrile The desired compound was obtained in substantially the same manner as in Example 1, except that 2-fluoro-4-(4-methylpiperazine-1-yl)aniline was used instead of p-toluidine in Step 3) of Example 1, and 2-fluoro-4-formylbenzonitrile was used instead of 4-formylbenzonitrile in Step 5) of Example 1.

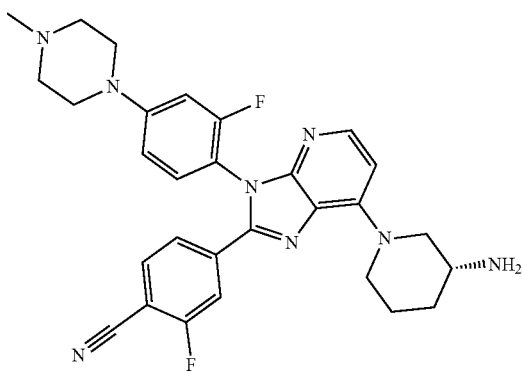 [SMILES: CN1CCN(c2ccc(-n3c(-c4ccc(C#N)c(F)c4)nc4c(N5CCC[C@@H](N)C5)ccnc43)c(F)c2)CC1]

$^1$H-NMR (300 MHz, DMSO-d$_6$): δ 7.99-7.91 (m, 2H), 7.69 (d, 1H), 7.52 (d, 1H), 7.41 (m, 1H), 6.97 (m, 2H), 6.64 (d, 1H), 4.74 (m, 2H), 3.29 (m, 4H), 3.04 (s, 3H), 3.01-2.89 (m, 2H), 2.46 (m, 4H), 1.95-1.77 (m, 4H).
MS (ESI$^+$): [M+H]$^+$ m/z=529.2

Example 35: Preparation of 4-(7-((S)-3-aminopiperidine-1-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl (S)-piperidine-3-ylcarbamate was used instead of tert-butyl (R)-piperidine-3-ylcarbamate in Step 1) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

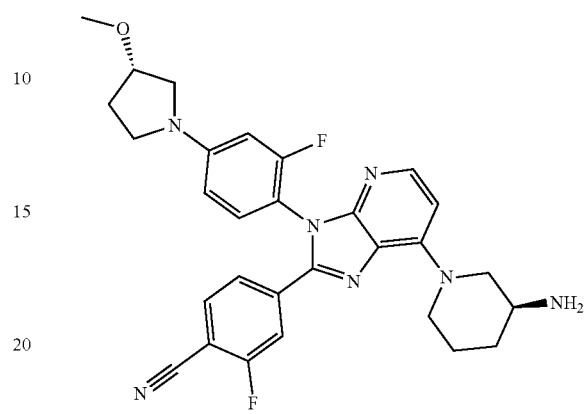

$^1$H-NMR (300 MHz, DMSO): δ 8.04-7.97 (m, 2H), 7.86-7.82 (d, 1H), 7.53-7.50 (dd, 1H), 7.38-7.32 (t, 1H), 6.71-6.69 (d, 1H), 6.54-6.50 (m, 2H), 4.44-4.37 (m, 1H), 4.12 (s, 1H), 3.45-3.29 (m, 8H), 3.29 (s, 3H), 2.14-2.10 (m, 3H), 1.91-1.88 (m, 1H), 1.88-1.68 (s, 2H)
MS (ESI$^+$): [M+H]$^+$ m/z=530.2

Example 36: Preparation of 4-(7-((R)-3-aminopiperidine-1-yl)-3-(4-((S)-3-chloropyrrolidine-1-yl)-2-fluorophenyl)-3H-imidazo[4,5-b]pyridine-2-yl)-2-fluorobenzonitrile The desired compound was obtained in substantially the same manner as in Example 1, except that (S)-4-(3-chloropyrrolidine-1-yl)-2-fluoroaniline was used instead of p-toluidine in Step 3) of Example 1, and 2-fluoro-4-formylbenzonitrile was used instead of 4-formylbenzonitrile in Step 5) of Example 1.

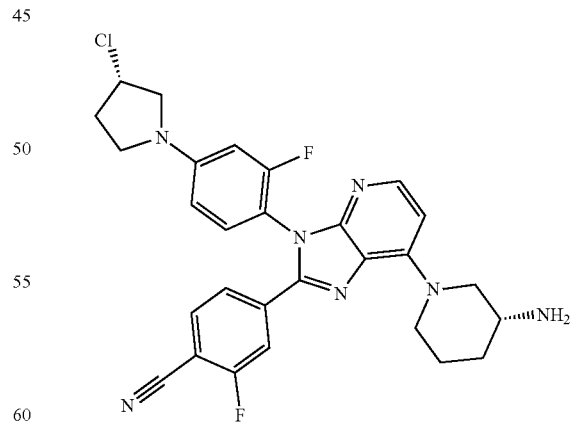

$^1$H-NMR (300 MHz, DMSO-d$_6$): δ 7.99-7.88 (m, 2H), 7.71 (d, 1H), 7.53 (d, 1H), 7.38 (m, 1H), 6.62-6.51 (m, 3H), 4.92 (m, 1H), 4.62 (m, 2H), 3.53 (m, 1H), 3.40-3.38 (m, 3H), 2.92-2.85 (m, 2H), 2.26 (m, 1H), 1.93-1.22 (m, 4H).
MS (ESI$^+$): [M+H]$^+$ m/z=534.2

Example 37: Preparation of (R)-4-(7-(3-aminopiperidine-1-yl)-3-(3-(2-morpholinoethoxy)phenyl)-3H-imidazo[4,5-b]pyridine-2-yl)-2-fluorobenzonitrile The desired compound was obtained in substantially the same manner as in Example 1, except that 3-(2-morpholinoethoxy)aniline was used instead of p-toluidine in Step 3) of Example 1, and 2-fluoro-4-formylbenzonitrile was used instead of 4-formylbenzonitrile in Step 5) of Example 1.

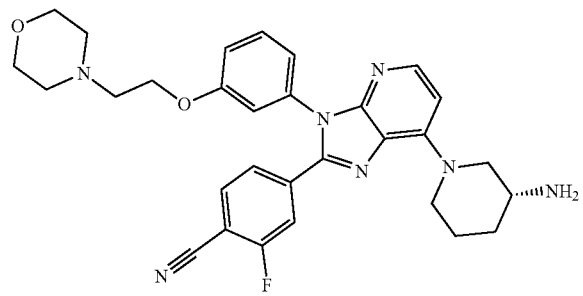 [SMILES: N#Cc1ccc(-c2nc3c(N4CCC[C@@H](N)C4)ccnc3n2-c2cccc(OCCN3CCOCC3)c2)cc1F]

¹H-NMR (300 MHz, DMSO-d₆): δ 7.95-7.90 (m, 2H), 7.61 (d, 1H), 7.47 (m, 2H), 7.12 (d, 1H), 7.09 (s, 1H), 6.95 (d, 1H), 6.65 (d, 1H), 4.63 (m, 2H), 4.06 (t, 2H), 3.52 (m, 4H), 3.00 (m, 2H), 2.64 (m, 2H), 2.50 (m, 4H), 1.89-1.22 (m, 4H).

MS (ESI⁺): [M+H]⁺ m/z=542.2

Example 38: Preparation of (R)-4-(7-(3-aminopiperidine-1-yl)-3-(4-(morpholino-4-carbonyl)phenyl)-3H-imidazo[4,5-b]pyridine-2-yl)-2-fluorobenzonitrile The desired compound was obtained in substantially the same manner as in Example 1, except that (4-aminophenyl(morpholino)methanone was used instead of p-toluidine in Step 3) of Example 1, and 2-fluoro-4-formylbenzonitrile was used instead of 4-formylbenzonitrile in Step 5) of Example 1.

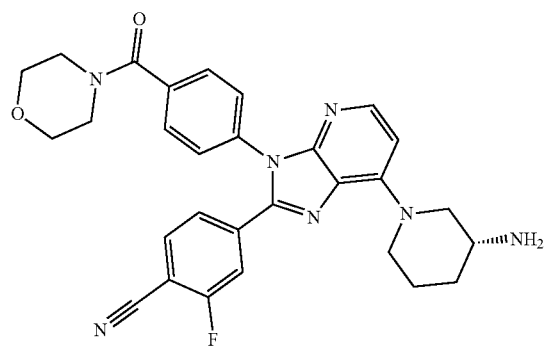 [SMILES: N#Cc1ccc(-c2nc3c(N4CCC[C@@H](N)C4)ccnc3n2-c2ccc(C(=O)N3CCOCC3)cc2)cc1F]

¹H-NMR (300 MHz, DMSO-d₆): δ 7.95-7.90 (m, 2H), 7.60-7.50 (m, 5H), 7.48 (d, 2H), 6.66 (d, 1H), 4.80-4.62 (m, 2H), 3.49 (m, 4H), 3.12 (m, 2H), 2.96-2.84 (m, 3H), 1.89-1.22 (m, 4H).

MS (ESI⁺): [M+H]⁺ m/z=526.2

Example 39: Preparation of 4-(7-((R)-3-aminopiperidine-1-yl)-3-(4-(S)-3-ethoxypyrrolidine-1-yl)-2-fluorophenyl)-3H-imidazo[4,5-b]pyridine-2-yl)-2-fluorobenzonitrile The desired compound was obtained in substantially the same manner as in Example 1, except that (S)-4-(3-ethoxyrrolidine-1-yl)-2-fluoroaniline was used instead of p-toluidine in Step 3) of Example 1, and 2-fluoro-4-formylbenzonitrile was used instead of 4-formylbenzonitrile in Step 5) of Example 1.

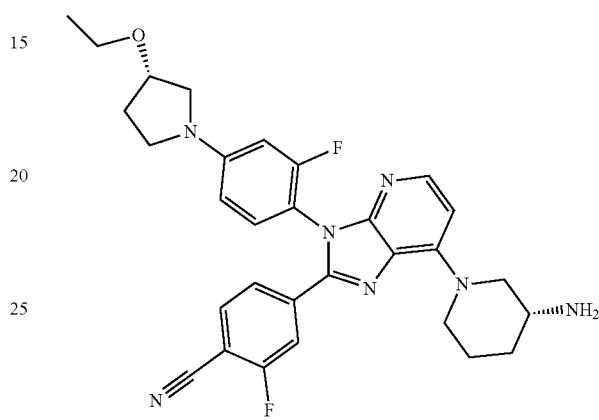

¹H-NMR (300 MHz, DMSO): δ 8.00-7.91 (m, 2H), 7.75-7.71 (dd, 1H), 7.54-7.51 (d, 1H), 7.39-7.33 (m, 1H), 6.64-6.62 (d, 1H), 6.53-6.49 (m, 2H), 4.71-4.63 (m, 2H), 4.22 (s, 1H), 3.54-3.45 (m, 8H), 3.09-2.91 (m, 2H), 2.11-2.07 (m, 2H), 1.97-1.62 (m, 2H), 1.57-1.33 (m, 2H), 1.15-1.11 (t, 3H)

MS (ESI⁺): [M+H]⁺ m/z=544.2

Example 40: Preparation of (R)-4-(7-(3-aminopiperidine-1-yl)-3-(4-hydroxyphenyl)-3H-imidazo[4,5-b]pyridine-2-yl)-2-fluorobenzonitrile The desired compound was obtained in substantially the same manner as in Example 1, except that 4-hydroxyaniline was used instead of p-toluidine in Step 3) of Example 1, and 2-fluoro-4-formylbenzonitrile was used instead of 4-formylbenzonitrile in Step 5) of Example 1.

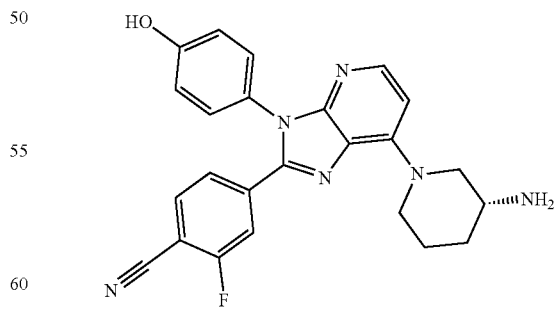

¹H-NMR (300 MHz, CDCl₃): δ 8.04 (d, 1H), 7.53 (d, 1H), 7.43 (m, 2H), 6.96 (d, 2H), 6.68 (d, 2H), 6.54 (d, 1H), 4.71 (m, 1H), 4.57 (m, 1H), 3.76 (m, 1H), 3.61 (m, 1H), 3.39 (m, 2H), 2.18 (m, 2H), 1.96 (m, 2H).

MS (ESI⁺): [M+H]⁺ m/z=429.2

Example 41: Preparation of (R)-4-(7-(3-aminopiperidine-1-yl)-3-(4-cyanophenyl)-3H-imidazo[4,5-b]pyridine-2-yl)-2-fluorobenzonitrile The desired compound was obtained in substantially the same manner as in Example 1, except that 4-cyanoaniline was used instead of p-toluidine in Step 3) of Example 1, and 2-fluoro-4-formylbenzonitrile was used instead of 4-formylbenzonitrile in Step 5) of Example 1.

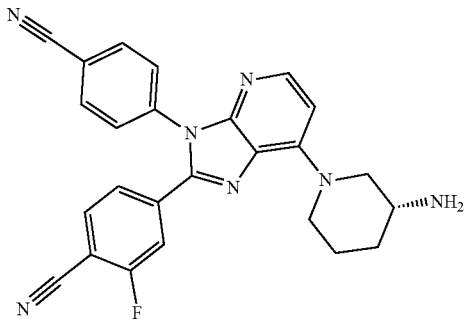 [SMILES: N#Cc1ccc(-n2c(-c3ccc(C#N)c(F)c3)nc3c(N4CCC[C@@H](N)C4)ccnc32)cc1]

$^1$H-NMR (300 MHz, CDCl$_3$): δ 8.07 (d, 1H), 7.84 (d, 2H), 7.52 (m, 4H), 7.30 (d, 1H), 6.56 (d, 1H), 4.68 (d, 1H), 4.34 (d, 1H), 3.52 (m, 1H), 3.36 (m, 2H), 3.08 (br, 2H), 2.11 (m, 1H), 1.96 (m, 1H), 1.74 (m, 2H).
MS (ESI$^+$): [M+H]$^+$ m/z=438.3

Example 42: Preparation of (R)-4-(7-(3-aminopiperidine-1-yl)-3-(2,3-dihydro-1H-indene-5-yl)-3H-imidazo[4,5-b]pyridine-2-yl)-2-fluorobenzonitrile The desired compound was obtained in substantially the same manner as in Example 1, except that 2,3-dihydro-1H-indene-5-amine was used instead of p-toluidine in Step 3) of Example 1, and 2-fluoro-4-formylbenzonitrile was used instead of 4-formylbenzonitrile in Step 5) of Example 1.

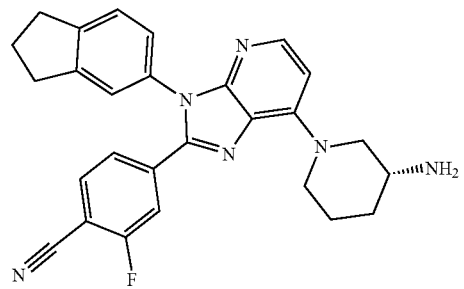 [SMILES: N#Cc1ccc(-c2nc3c(N4CCC[C@@H](N)C4)ccnc3n2-c2ccc3c(c2)CCC3)cc1F]

$^1$H-NMR (300 MHz, CDCl$_3$): δ 8.08 (d, 1H), 7.57 (d, 1H), 7.54 (d, 1H), 7.52 (d, 1H), 7.47 (d, 1H), 7.20 (s, 1H), 7.05 (d, 1H), 6.51 (d, 1H), 4.64 (d, 1H), 4.61 (d, 1H), 3.48 (m, 1H), 3.22 (m, 1H), 3.11 (m, 1H), 2.99 (m, 4H), 2.18 (m, 2H), 2.13 (m, 1H), 2.08 (m, 1H), 2.05 (m, 1H), 1.85 (m, 1H), 1.27 (m, 1H), 1.23 (m, 1H).
MS (ESI$^+$): [M+H]$^+$ m/z=453.2

Example 43: Preparation of (R)-4-(7-(3-aminopiperidine-1-yl)-3-(4-isopropylphenyl)-3H-imidazo[4,5-b]pyridine-2-yl)-2-fluorobenzonitrile The desired compound was obtained in substantially the same manner as in Example 1, except that 4-isopropylaniline was used instead of p-toluidine in Step 3) of Example 1, and 2-fluoro-4-formylbenzonitrile was used instead of 4-formylbenzonitrile in Step 5) of Example 1.

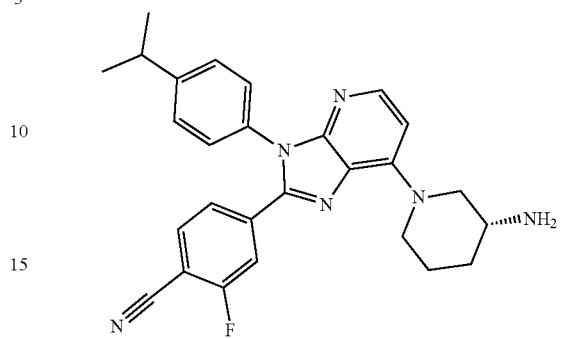

$^1$H-NMR (300 MHz, DMSO-d$_6$): δ 7.91 (m, 2H), 7.51 (s, 1H), 7.49 (d, 1H), 7.35 (d, 2H), 7.31 (d, 2H), 6.61 (d, 1H), 4.81 (d, 1H), 4.60 (d, 1H), 3.18 (m, 2H), 3.00 (m, 4H), 1.90 (m, 2H), 1.76 (m, 1H), 1.24 (m, 6H), 1.22 (m, 1H).
MS (ESI$^+$): [M+H]$^+$ m/z=455.2

Example 44: Preparation of (R)-4-(7-(3-aminopiperidine-1-yl)-3-(1-methyl-1H-indole-5-yl)-3H-imidazo(4,5-b)pyridine-2-yl)-2fluorobenzonitrile The desired compound was obtained in substantially the same manner as in Example 1, except that 1-methyl-1H-indole-5amine was used instead of p-toluidine in Step 3) of Example 1, and 2-fluoro-4-formylbenzonitrile was used instead of 4-formylbenzonitrile in Step 5) of Example 1.

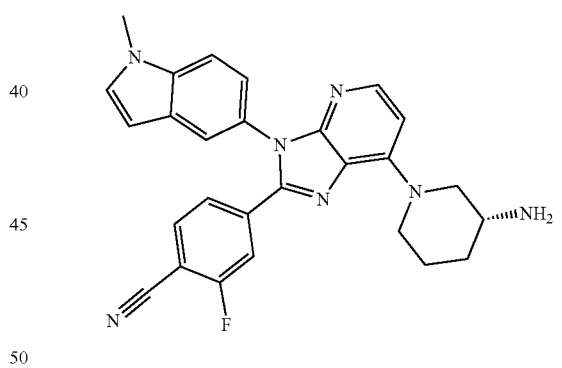

$^1$H-NMR (300 MHz, CDCl3) δ 8.40 (d, 1H), 8.06 (t, 2H), 7.62 (d, 1H), 7.45 (m, 5H), 6.50 (d, 1H), 4.64 (d, 1H), 4.61 (d, 1H), 4.00 (s, 3H) 3.48 (m, 1H), 3.22 (m, 1H), 3.11 (m, 1H), 2.99 (m, 4H), 2.18 (m, 2H), 2.13 (m, 1H), 2.08 (m, 1H), 2.05 (m, 1H), 1.85 (m, 1H), 1.27 (m, 1H), 1.23 (m, 1H).
MS (ESI$^+$): [M+H]$^+$ m/z=466.2

Example 45: Preparation of (R)-4-(7-(3-aminopiperidine-1-yl)-3-(5-methylpyridine-2-yl)-3H-imidazo[4,5-b]pyridine-2-yl)-2-fluorobenzonitrile The desired compound was obtained in substantially the same manner as in Example 1, except that 5-methylpyridine-2-amine was used instead of p-toluidine in Step 3) of Example 1, and 2-fluoro-4-formylbenzonitrile was used instead of 4-formylbenzonitrile in Step 5) of Example 1.

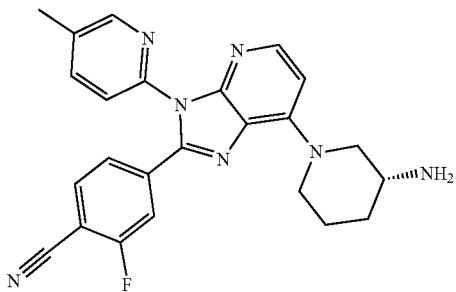 [SMILES: Cc1ccc(-n2c(-c3ccc(C#N)c(F)c3)nc3c(N4CCC[C@@H](N)C4)ccnc32)nc1]

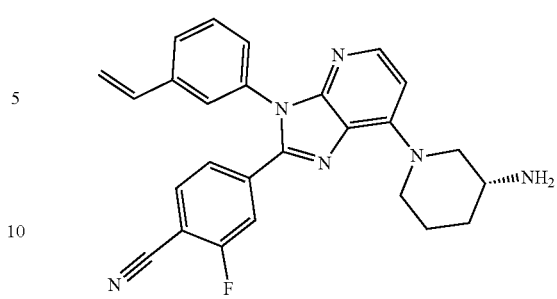

¹H-NMR (300 MHz, CDCl₃): δ8.38 (s, 1H), 8.38 (d, 1H), 7.77 (m, 1H), 7.52 (m, 3H), 7.35 (dd, 1H), 6.57 (d, 1H), 5.03 (d, 1H), 4.34 (t, 1H), 4.20 (m, 2H), 3.78 (m 1H), 3.71 (m, 2H), 2.44 (s, 3H), 1.90 (m, 2H), 1.88 (m 2H).

MS (ESI⁺): [M+H]⁺ m/z=428.21

Example 46: Preparation of (R)-4-(7-(3-aminopiperidine-1-yl)-3-(4-cyclohexylphenyl)-3H-imidazo[4,5-b]pyridine-2-yl)-2-fluorobenzonitrile The desired compound was obtained in substantially the same manner as in Example 1, except that 4-cyclohexylaniline was used instead of p-toluidine in Step 3) of Example 1, and 2-fluoro-4-formylbenzonitrile was used instead of 4-formylbenzonitrile in Step 5) of Example 1.

¹H-NMR (300 MHz, CDCl₃): δ 7.97 (d, 1H), 7.59 (d, 1H), 7.49 (m, 3H), 7.36 (m, 2H), 7.17 (d, 1H), 6.68 (m, 2H), 5.75 (d, 1H), 5.33 (d, 1H), 4.60 (d, 1H), 4.42 (d, 1H), 3.80 (m, 2H), 3.48 (m, 1H), 2.09 (m, 2H), 1.84 (m, 2H).

MS (ESI⁺): [M+H]⁺ m/z=439.2

Example 48: Preparation of (R)-4-(7-(3-aminopiperidine-1-yl)-3-(4-((3-methoxypropyl)(methyl)amino)phenyl)-3H-imidazo[4,5-b]pyridine-2-yl)-2-fluorobenzonitrile The desired compound was obtained in substantially the same manner as in Example 1, except that N¹-(3-methoxypropyl)-N¹-methylbenzene-1,4-diamine was used instead of p-toluidine in Step 3) of Example 1, and 2-fluoro-4-formylbenzonitrile was used instead of 4-formylbenzonitrile in Step 5) of Example 1.

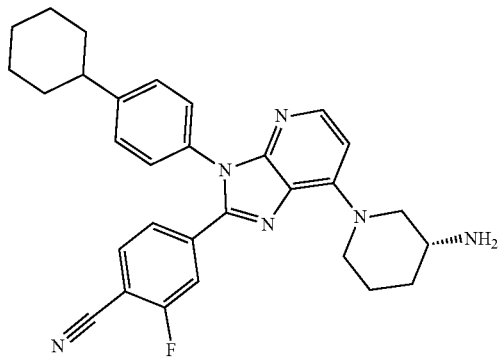 [SMILES: N#Cc1ccc(-c2nc3c(N4CCC[C@@H](N)C4)ccnc3n2-c2ccc(C3CCCCC3)cc2)cc1F]

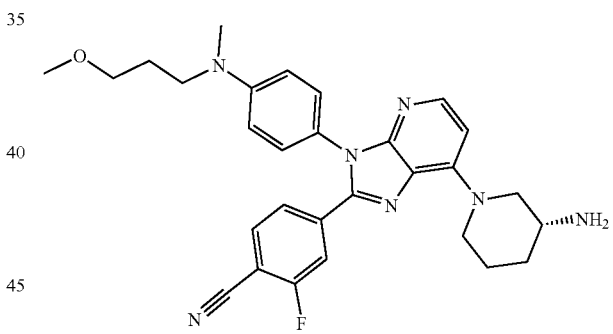

¹H-NMR (300 MHz, DMSO-d₆): δ 7.89 (m, 2H), 7.49 (d, 2H), 7.46 (d, 2H), 7.31 (d, 2H), 6.61 (d, 1H), 4.82 (d, 1H), 4.60 (d, 1H), 3.15 (m, 3H), 1.81 (m, 8H), 1.42 (m, 4H), 1.22 (s, 2H).

MS (ESI⁺): [M+H]⁺ m/z=495.3

Example 47: Preparation of (R)-4-(7-(3-aminopiperidine-1-yl)-3-(3-vinylphenyl)-3H-imidazo[4,5-b]pyridine-2-yl)-2-fluorobenzonitrile The desired compound was obtained in substantially the same manner as in Example 3, except that 3-vinylaniline was used instead of p-toluidine in Step 3) of Example 1, and 2-fluoro-4-formylbenzonitrile was used instead of 4-formylbenzonitrile in Step 5) of Example 1.

¹H-NMR (300 MHz, CDCl₃): δ 8.00 (d, 1H), 7.47 (m, 3H), 7.04 (d, 2H), 6.72 (d, 2H), 6.52 (d, 1H), 4.58 (d, 1H), 4.13 (d, 1H), 3.61 (m, 2H), 3.28 (m, 3H), 3.24 (s, 3H), 2.94 (s, 3H), 2.03 (m, 2H), 1.80 (m, 4H).

MS (ESI⁺): [M+H]⁺ m/z=514.3

Example 49: Preparation of 4-(7-((R)-3-aminopiperidine-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile The desired compound was obtained in substantially the same manner as in Example 1, except that 2-fluoro-4-(tetrahydro-1H-furo[3,4-c]pyrrole-5(3H)-yl)aniline was used instead of p-toluidine in Step 3) of Example 1, and 2-fluoro-4-formylbenzonitrile was used instead of 4-formylbenzonitrile in Step 5) of Example 1.

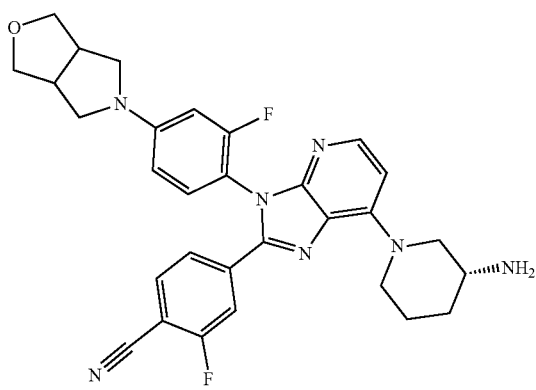 [SMILES: N#Cc1ccc(-c2nc3c(N4CCC[C@@H](N)C4)ccnc3n2-c2ccc(N3CC4COCC4C3)cc2F)cc1F]

¹H-NMR (300 MHz, DMSO-d₆): δ 7.98-7.89 (m, 2H), 7.71 (d, 1H), 7.52 (d, 1H), 7.33 (m, 1H), 6.63-6.54 (m, 3H), 4.69-4.60 (m, 2H), 3.83 (m, 2H), 3.57 (m, 2H), 3.47 (m, 3H), 3.25 (m, 1H), 3.18 (m, 3H), 2.87 (m, 1H), 2.25-1.32 (m, 4H).

MS (ESI⁺): [M+H]⁺ m/z=542.2

Example 50: Preparation of (R)-4-(7-(3-aminopiperidine-1-yl)-3-cyclohexyl-3H-imidazo[4,5-b]pyridine-2-yl)-2-fluorobenzonitrile The desired compound was obtained in substantially the same manner as in Example 3, except that cyclohexylamine was used instead of p-toluidine in Step 3) of Example 1, and 2-fluoro-4-formylbenzonitrile was used instead of 4-formylbenzonitrile in Step 5) of Example 1.

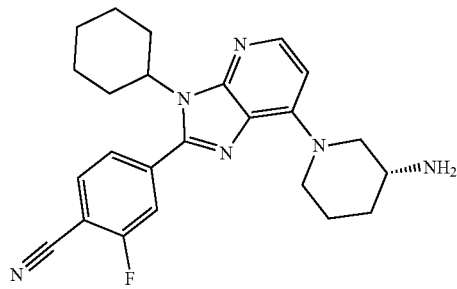 [SMILES: N#Cc1ccc(-c2nc3c(N4CCC[C@@H](N)C4)ccnc3n2C2CCCCC2)cc1F]

¹H-NMR (300 MHz, CDCl₃): δ 8.09 (d, 1H), 7.78 (m, 1H), 7.58 (m, 2H), 6.46 (d, 1H), 4.52 (d, 1H), 4.41 (m, 1H), 4.23 (m, 1H), 3.13 (m, 3H), 2.79 (m, 2H), 2.18 (m, 1H), 2.03 (m, 4H), 1.74 (m, 2H), 1.41 (m, 4H), 1.30 (s, 2H), 0.89 (m, 1H).

MS (ESI⁺): [M+H]⁺ m/z=419.2

Example 51: Preparation of (R)-4-(7-(3-aminopiperidine-1-yl)-3-(4-hexylphenyl)-3H-imidazo[4,5-b]pyridine-2-yl)-2-fluorobenzonitrile The desired compound was obtained in substantially the same manner as in Example 3, except that 4-hexylaniline was used instead of p-toluidine in Step 3) of Example 1, and 2-fluoro-4-formylbenzonitrile was used instead of 4-formylbenzonitrile in Step 5) of Example 1.

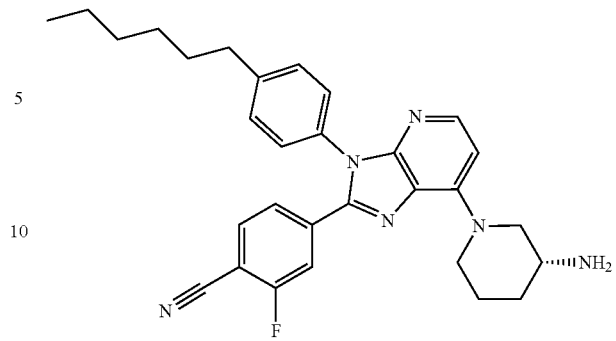

¹H-NMR (300 MHz, CDCl₃): δ 8.06 (d, 1H), 7.46 (m, 3H), 7.40 (m, 2H), 7.23 (m, 2H), 6.49 (d, 1H), 4.63 (d, 1H), 4.50 (d, 1H), 3.30 (m, 2H), 3.12 (m, 1H), 2.68 (m, 2H), 2.09 (m, 1H), 2.04 (m, 1H), 1.38 (m, 2H), 1.26 (s, 8H), 1.24 (s, 2H), 0.89 (m, 3H).

MS (ESI⁺): [M+H]⁺ m/z=497.3

Example 52: Preparation of 4-(7-((R)-3-aminopiperidine-1-yl)-3-(2-fluoro-4-((S)-3-methoxypyrrolidine-1-yl)phenyl)-3H-imidazo[4,5-b]pyridine-2-yl)-3-fluorobenzonitrile The desired compound was obtained in substantially the same manner as in Example 1, except that (S)-2-fluoro-4-(3-methoxypyrrolidine-1-yl)aniline was used instead of p-toluidine in Step 3) of Example 1, and 3-fluoro-4-formylbenzonitrile was used instead of 4-formylbenzonitrile in Step 5) of Example 1.

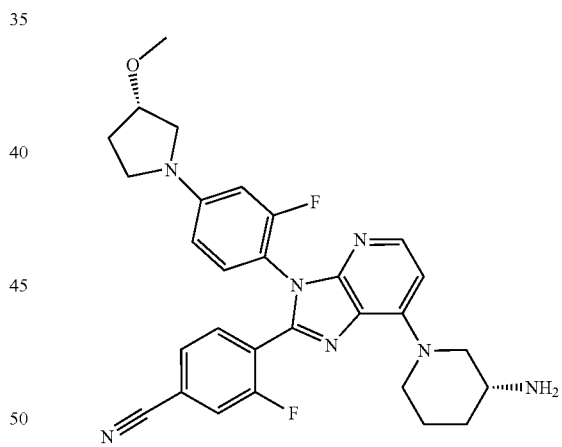

¹H-NMR (300 MHz, CDCl₃): δ 8.09 (d, 1H), 7.73 (t, 1H), 7.48 (d, 1H), 7.33 (d, 1H), 7.13 (m, 1H), 6.51 (d, 1H), 6.33 (d, 1H), 6.22 (d, 1H), 4.53 (d, 1H), 4.37 (d, 1H), 4.09 (m, 1H), 3.39 (m, 2H), 3.38 (m, 3H), 3.36 (s, 3H), 3.14 (m, 1H), 2.15 (m, 2H), 2.06 (m, 1H), 1.89 (m, 1H), 1.47 (m, 2H), 1.25 (s, 3H).

MS (ESI⁺): [M+H]⁺ m/z=530.3

Example 53: Preparation of 4-(7-((R)-3-aminopiperidine-1-yl)-3-(2-fluoro-4-((S)-3-methoxypyrrolidine-1-yl)phenyl)-3H-imidazo[4,5-b]pyridine-2-yl)-3-methoxybenzonitrile The desired compound was obtained in substantially the same manner as in Example 1, except that (S)-2-fluoro-4-

(3-methoxypyrrolidine-1-yl)aniline was used instead of p-toluidine in Step 3) of Example 1, and 4-formyl-3-methoxybenzonitrile was used instead of 4-formylbenzonitrile in Step 5) of Example 1.

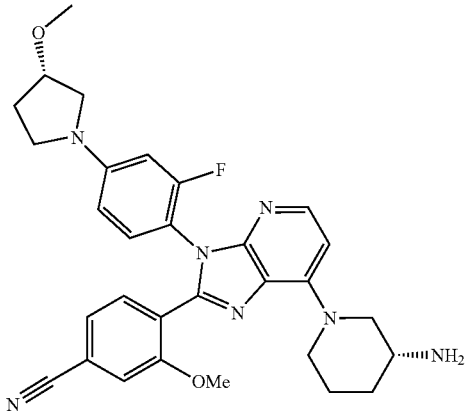 [SMILES: COc1cc(C#N)ccc1-c1nc2c(N3CCC[C@@H](N)C3)ccnc2n1-c1ccc(N2CC[C@H](OC)C2)cc1F]

¹H-NMR (300 MHz, CDCl₃): δ 8.06 (d, 1H), 7.71 (d, 1H), 7.32 (d, 1H), 6.99 (s, 2H), 6.48 (d, 1H), 6.27 (s, 1H), 4.51 (d, 1H), 4.40 (m, 1H), 4.07 (m, 1H), 3.58 (s, 3H), 3.48 (m, 2H), 3.35 (s, 3H), 3.25 (m, 4H), 3.09 (m, 1H), 2.21 (m, 3H), 1.87 (m, 1H), 1.76 (m, 1H), 1.45 (m, 1H), 1.25 (s, 2H).
MS (ESI⁺): [M+H]⁺ m/z=542.3

Example 54: Preparation of (R)-4-(7-(3-aminopiperidine-1-yl)-3-(1-methyl-1H-pyrrolo[2,3-b]pyridine-5-yl)-3H-imidazo[4,5-b]pyridine-2-yl)-2-fluorobenzonitrile The desired compound was obtained in substantially the same manner as in Example 1, except that 1-methyl-1H-pyrrolo [2,3-b]pyridine-5-amine was used instead of p-toluidine in Step 3) of Example 1, and 2-fluoro-4-formylbenzonitrile was used instead of 4-formylbenzonitrile in Step 5) of Example 1.

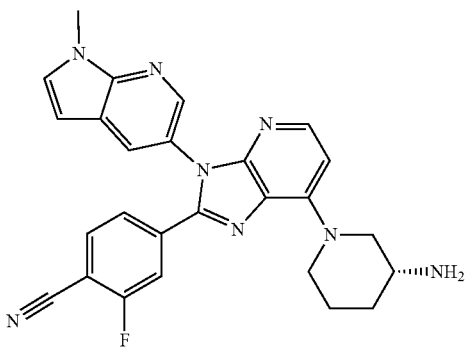 [SMILES: Cn1ccc2cc(-n3c(-c4ccc(C#N)c(F)c4)nc4c(N5CCC[C@@H](N)C5)ccnc43)cnc21]

¹H-NMR (300 MHz, CDCl₃): δ 8.20 (s, 1H), 8.12 (d, 1H), 8.04 (s, 1H), 7.58 (d, 1H), 7.48 (d, 1H), 7.33 (d, 2H), 6.53 (m, 2H), 4.61 (m, 2H), 3.93 (s, 3H), 3.24 (m, 2H), 3.10 (m, 1H), 2.05 (m, 1H), 1.92 (m, 1H), 1.80 (m, 1H), 1.25 (s, 3H).
MS (ESI⁺): [M+H]⁺ m/z=467.2

Example 55: Preparation of (R)-4-(7-(3-aminopiperidine-1-yl)-3-(1-methyl-1H-indazole-5-yl)-3H-imidazo[4,5-b]pyridine-2-yl)-2-fluorobenzonitrile The desired compound was obtained in substantially the same manner as in Example 1, except that 1-methyl-1H-indazole-5-amine was used instead of p-toluidine in Step 3) of Example 1, and 2-fluoro-4-formylbenzonitrile was used instead of 4-formylbenzonitrile in Step 5) of Example 1.

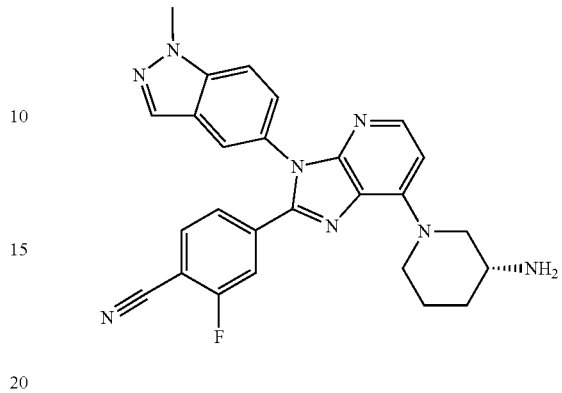

¹H-NMR (300 MHz, CDCl₃): δ 8.07 (d, 2H), 8.06 (s, 1H), 7.74 (d, 2H), 7.54 (t, 1H), 7.32 (m, 1H), 7.28 (m, 1H), 6.53 (d, 1H), 4.69 (d, 1H), 4.62 (d, 1H), 4.17 (s, 3H), 3.38 (m, 1H), 3.27 (m, 1H), 3.12 (m, 1H), 2.08 (m, 1H), 1.99 (m, 1H), 1.81 (m, 2H), 1.50 (m, 1H).
MS (ESI⁺): [M+H]⁺ m/z=467.2

Example 56: Preparation of 4-(7-((R)-3-aminopiperidine-1-yl)-3-(2-fluoro-4-(S)-3-methoxypiperidine-1-yl)phenyl)-3H-imidazo[4,5-b]pyridine-2-yl)-2-fluorobenzonitrile The desired compound was obtained in substantially the same manner as in Example 1, except that (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

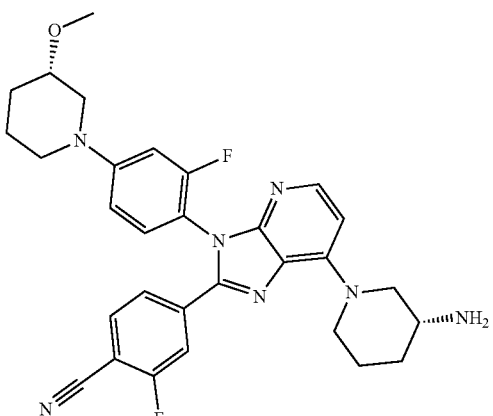

¹H-NMR (300 MHz, DMSO): δ 8.02-7.97 (m, 2H), 7.81-7.78 (d, 1H), 7.54-7.50 (dd, 1H), 7.40-7.34 (t, 1H), 6.99-6.91 (m, 2H), 6.71-6.69 (d, 1H), 4.45-4.38 (m, 1H), 3.74-3.71 (m, 1H), 3.59-3.32 (m, 11H), 3.32-3.05 (m, 2H), 2.07 (s, 1H), 1.98-1.88 (m, 2H), 1.77-1.67 (m, 1H), 1.67-1.54 (m, 2H), 1.50-1.45 (m, 2H)

MS (ESI⁺): [M+H]⁺ m/z=544.2

Example 57: Preparation of 4-(7-((R)-3-aminopiperidine-1-yl)-3-(4-(3-(dimethylamino)pyrrolidine-1-yl)-2-fluorophenyl)-3H-imidazo[4,5-b]pyridine-2-yl)-2-fluorobenzonitrile The desired compound was obtained in substantially the same manner as in Example 1, except that 1-(4-amino-3-fluorophenyl)-N,N-dimethylpyrrolidine-3-amine was used instead of p-toluidine in Step 3) of Example 1, and 2-fluoro-4-formylbenzonitrile was used instead of 4-formylbenzonitrile in Step 5) of Example 1.

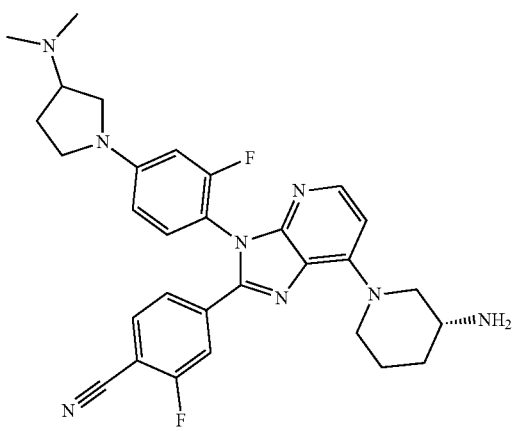 [SMILES: CN(C)C1CCN(c2ccc(-n3c(-c4ccc(C#N)c(F)c4)nc4c(N5CCC[C@@H](N)C5)ccnc43)c(F)c2)C1]

¹H-NMR (300 MHz, CDCl₃): δ 8.05 (d, 1H), 7.53 (m, 3H), 7.15 (m, 1H), 6.38 (m, 3H), 4.50 (d, 1H), 4.25 (m, 1H), 3.33 (m, 8H), 3.01 (m, 1H), 2.39 (s, 6H), 2.27 (m, 1H), 1.95 (m, 3H), 1.69 (m, 3H).

MS (ESI⁺): [M+H]⁺ m/z=543.3

Example 58: Preparation of (R)-4-(7-(3-aminopiperidine-1-yl)-3-(benzo[d]thiazole-5-yl)-3H-imidazo[4,5-b]pyridine-2-yl)-2-fluorobenzonitrile The desired compound was obtained in substantially the same manner as in Example 1, except that benzo[d]thiazole-5-amine was used instead of p-toluidine in Step 3) of Example 1, and 2-fluoro-4-formylbenzonitrile was used instead of 4-formylbenzonitrile in Step 5) of Example 1.

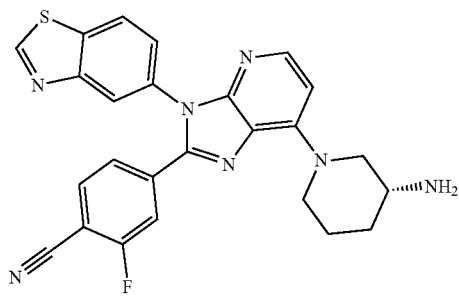 [SMILES: N#Cc1ccc(-c2nc3c(N4CCC[C@@H](N)C4)ccnc3n2-c2ccc3scnc3c2)cc1F]

¹H-NMR (300 MHz, CDCl₃): δ 9.15 (s, 1H), 8.16 (d, 1H), 7.58 (d, 1H), 7.53 (m, 2H), 7.41 (d, 1H), 6.55 (d, 1H), 4.69 (d, 1H), 4.55 (d, 1H), 3.33 (m, 2H), 3.16 (m, 1H), 2.12 (m, 1H), 1.99 (m, 1H), 1.52 (m, 1H), 1.27 (s, 2H), 0.90 (m, 1H).

MS (ESI⁺): [M+H]⁺ m/z=470.2

Example 59: Preparation of 4-(7-(R)-3-aminopiperidine-1-yl)-3-(2-fluoro-4-((S)-3-(methoxymethyl)pyrrolidine-1-yl)phenyl)-3H-imidazo[4,5-b]pyridine-2-yl)-2-fluorobenzonitrile The desired compound was obtained in substantially the same manner as in Example 1, except that (S)-2-fluoro-4-(3-(methoxymethyl)pyrrolidine-1-yl)aniline was used instead of p-toluidine in Step 3) of Example 1, and 2-fluoro-4-formylbenzonitrile was used instead of 4-formylbenzonitrile in Step 5) of Example 1.

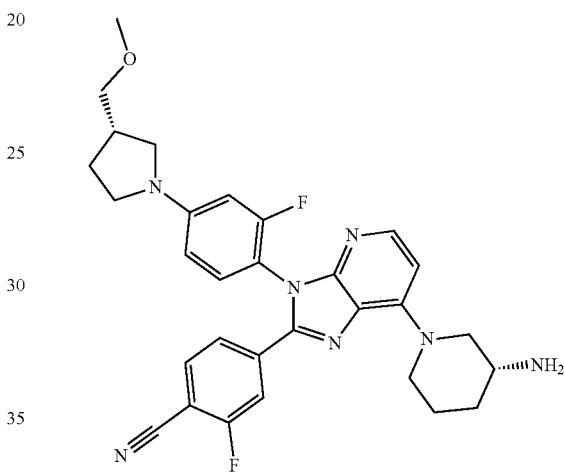

¹H-NMR (300 MHz, CDCl₃): δ 8.08 (d, 1H), 7.64 (d, 1H), 7.57 (m, 2H), 7.22 (m, 1H), 6.51 (d, 1H), 6.46 (dd, 1H), 6.36 (dd, 1H), 4.65 (d, 1H), 4.55 (m, 1H), 3.33 (m, 12H), 2.69 (m, 1H), 2.18 (m, 1H), 1.84 (m, 4H), 1.48 (m, 1H).

MS (ESI⁺): [M+H]⁺ m/z=544.3

Example 60: Preparation of (S)-2-fluoro-4-(3-(2-fluoro-4-(3-methoxypyrrolidine-1-yl)phenyl)-7-(2,8-diazaspiro[4.5]decane-8-yl)-3H-imidazo[4,5-b]pyridine-2-yl)benzonitrile The desired compound was obtained in substantially the same manner as in Example 1, except that tert-butyl 2,8-diazaspiro[4,5]decane-2-carboxylate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

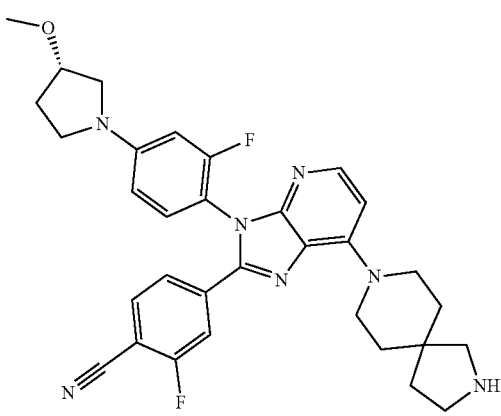 [SMILES: CO[C@H]1CCN(c2ccc(-n3c(-c4ccc(C#N)c(F)c4)nc4c(N5CCC6(CCNC6)CC5)ccnc43)c(F)c2)C1]

¹H-NMR (300 MHz, DMSO-d₆): δ 8.00 (t, 1H), 7.95 (d, 1H), 7.68 (d, 1H), 7.49 (d, 1H), 7.34 (t, 1H), 6.64 (d, 1H), 6.53 (m, 2H), 4.11-3.90 (m, 5H), 3.48 (m, 1H), 3.32 (m, 3H), 3.16 (t, 2H), 2.86 (s, 2H), 2.11 (m, 2H), 1.83 (m, 6H).

MS (ESI⁺): [M+H]⁺ m/z=570.2

Example 61: Preparation of 2-fluoro-4-(3-(2-fluoro-4-((S)-3-methoxypyrrolidine-1-yl)phenyl)-7-(octahydro-6H-pyrrolo[2,3-c]pyridine-6-yl)-3H-imidazo[4,5-b]pyridine-2-yl)benzonitrile The desired compound was obtained in substantially the same manner as in Example 1, except that tert-butyl octahydro-1H-pyrrolo[2,3-c]pyridine-1-carboxylate was used instead of tert-butyl (R)-piperidine-3-ylcarbamate in Step 2) of Example 1, (S)-2-fluoro-4-(3-methoxypyrrolidine-1-yl) aniline was used instead of p-toluidine in Step 3) of Example 1, and 2-fluoro-4-formylbenzonitrile was used instead of 4-formylbenzonitrile in Step 5) of Example 1.

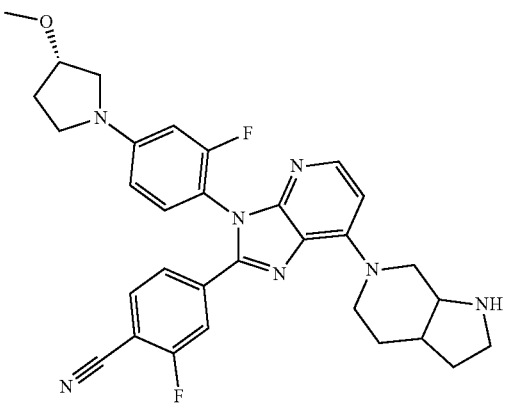 [SMILES: CO[C@H]1CCN(c2ccc(-n3c(-c4ccc(C#N)c(F)c4)nc4c(N5CCC6CCNC6C5)ccnc43)c(F)c2)C1]

¹H-NMR (300 MHz, DMSO-d₆): δ 8.00 (t, 1H), 7.97 (d, 1H), 7.68 (d, 1H), 7.50 (d, 1H), 7.37 (t, 1H), 6.64 (d, 1H), 6.54 (m, 3H), 4.40 (m, 1H), 4.06 (m, 2H), 3.69 (m, 2H), 3.46 (m, 1H), 3.32 (m, 3H), 3.18 (m, 2H), 2.95 (m, 1H), 2.76 (m, 1H), 2.73 (m, 1H), 2.26 (m, 2H), 2.11-2.09 (m, 3H), 1.87 (m, 1H).

MS (ESI⁺): [M+H]⁺ m/z=556.2

Example 62: Preparation of 4-(7-((S)-3-aminopiperidine-1-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl (S)-piperidine-3-ylcarbamate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

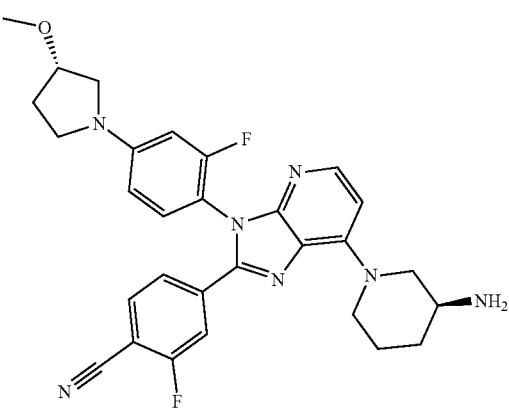 [SMILES: CO[C@H]1CCN(c2ccc(-n3c(-c4ccc(C#N)c(F)c4)nc4c(N5CCC[C@H](N)C5)ccnc43)c(F)c2)C1]

¹H-NMR (300 MHz, DMSO): δ 8.04-7.97 (m, 2H), 7.86-7.82 (d, 1H), 7.53-7.50 (dd, 1H), 7.38-7.32 (t, 1H), 6.71-6.69 (d, 1H), 6.54-6.50 (m, 2H), 4.44-4.37 (m, 1H), 4.12 (s, 1H), 3.45-3.29 (m, 8H), 3.29 (s, 3H), 2.14-2.10 (m, 3H), 1.91-1.88 (m, 1H), 1.88-1.68 (s, 2H)

MS (ESI⁺): [M+H]⁺ m/z=530.2

Example 63: Preparation of 4-(7-(3-amino-8-azabicyclo[3.2.1]octane-8-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl (8-azabicyclo[3.2.1]octane-3-yl)carbamate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

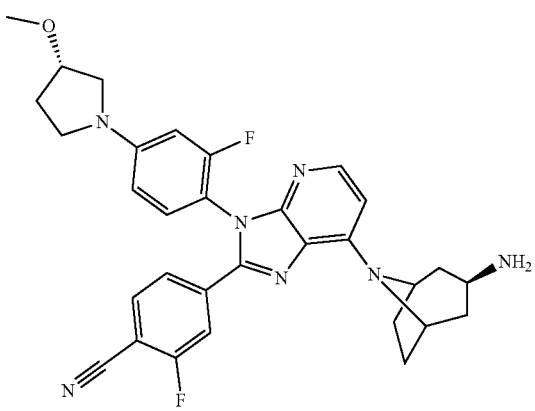

¹H-NMR (300 MHz, DMSO): δ 8.00-7.85 (m, 2H), 7.70-7.63 (m, 1H), 7.54-7.51 (dd, 1H), 7.37-7.34 (m, 1H), 6.56-6.49 (m, 3H), 4.12 (s, 1H), 3.49-3.17 (m, 11H), 2.42-2.32 (m, 2H), 2.11-1.97 (m, 6H), 1.54-1.49 (m, 2H)

MS (ESI⁺): [M+H]⁺ m/z=556.2

Example 64: Preparation of 4-(7-(3-aminopyrrolidine-1-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl pyrrolidine-3-ylcarbamate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

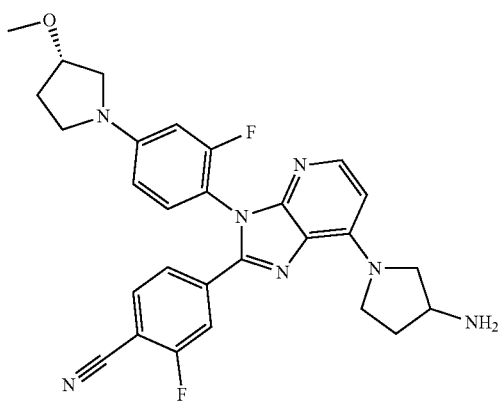 [SMILES: CO[C@H]1CCN(c2ccc(-n3c(-c4ccc(C#N)c(F)c4)nc4c(N5CCC(N)C5)ccnc43)c(F)c2)C1]

¹H-NMR (300 MHz, CDCl₃): δ 8.03-8.01 (m, 1H), 7.68-7.64 (d, 1H), 7.53-7.50 (m, 2H), 7.23-7.18 (m, 1H), 6.46-6.43 (d, 1H), 6.37-6.32 (d, 1H), 6.22-6.19 (m, 1H), 4.27-4.23 (m, 1H), 4.13-4.12 (m, 2H), 3.82-3.79 (s, 1H), 3.52-3.37 (m, 7H), 2.29-2.07 (m, 6H)

MS (ESI⁺): [M+H]⁺ m/z=516.2

Example 65: Preparation of 2-fluoro-4-(3-(2-fluoro-4-((S)-3-methoxypyrrolidine-1-yl)phenyl)-7-(2,7-diazaspiro[4.4]nonane-2-yl)-3H-imidazo[4,5-b]pyridine-2-yl)benzonitrile The desired compound was obtained in substantially the same manner as in Example 1, except that tert-butyl 2,7-diazaspiro[4,4]nonane-2-carboxylate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

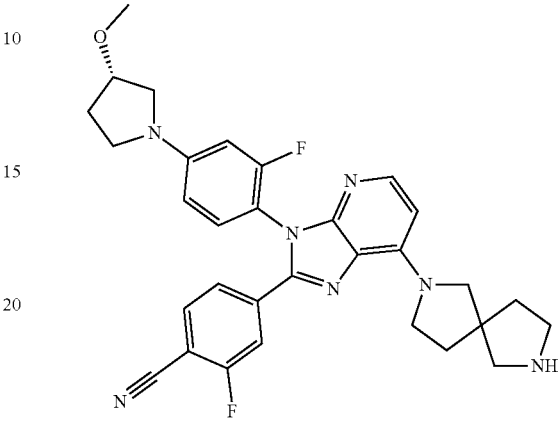

¹H-NMR (300 MHz, DMSO-d₆): δ 7.97 (t, 1H), 7.83 (d, 1H), 7.66 (d, 1H), 7.51 (d, 1H), 7.34 (t, 1H), 6.48 (m, 2H), 6.25 (d, 1H), 4.11 (m, 1H), 3.46 (m, 2H), 3.42 (m, 5H), 2.92 (s, 3H), 2.87 (m, 2H), 2.78 (m, 2H), 2.08 (m, 2H), 1.98 (m, 2H), 1.77 (m, 2H).

MS (ESI⁺): [M+H]⁺ m/z=556.2

Example 66: Preparation of (S)-2-fluoro-4-(3-(2-fluoro-4-(3-methoxypyrrolidine-1-yl)phenyl)-7-(2,7-diazaspiro[3.5]nonane-7-yl)-3H-imidazo[4,5-b]pyridine-2-yl)benzonitrile The desired compound was obtained in substantially the same manner as in Example 1, except that tert-butyl 2,7-diazaspiro[3,5]nonane-2-carboxylate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

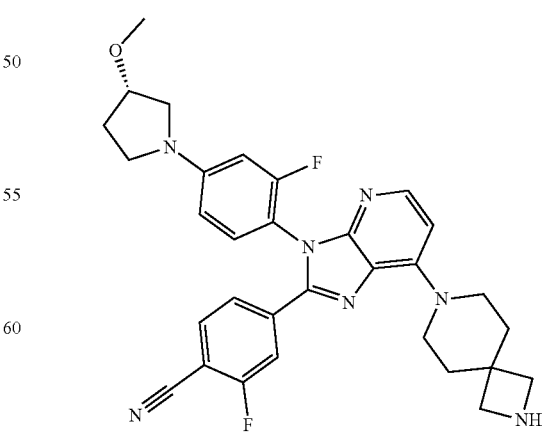

¹H-NMR (300 MHz, DMSO-d₆): δ 8.93 (m, 1H), 8.00-7.90 (m, 2H), 7.70 (d, 1H), 7.51 (d, 1H), 7.35 (t, 1H), 6.67

(d, 2H), 6.52-6.47 (m, 2H), 4.08 (m, 2H), 3.96 (m, 4H), 3.45-3.42 (m, 3H), 3.24 (m, 4H), 3.16 (m, 3H), 2.26 (m, 2H), 2.08 (m, 4H).

MS (ESI+): [M+H]+ m/z=556.2

Example 67: Preparation of 4-(7-((R)-3-amino-azepane-1-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl (R)-azepane-3-ylcarbamate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

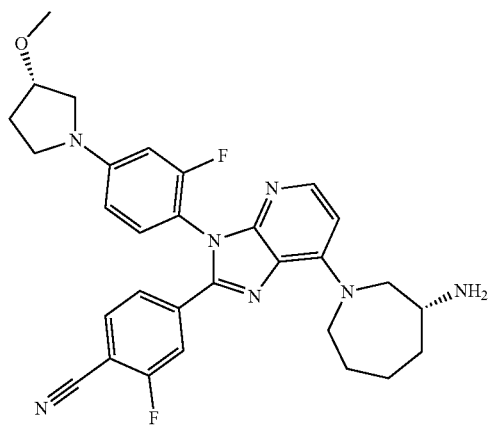 [SMILES: CO[C@H]1CCN(c2ccc(-n3c(-c4ccc(C#N)c(F)c4)nc4c(N5CCCC[C@@H](N)C5)ccnc43)c(F)c2)C1]

¹H-NMR (300 MHz, DMSO-d₆): δ 7.98 (t, 1H), 7.85 (d, 2H), 7.69 (d, 1H), 7.52 (d, 1H), 7.38 (m, 1H), 6.53 (m, 3H), 4.59-4.39 (m, 2H), 4.11 (m, 1H), 3.54-3.35 (m, 9H), 3.16 (m, 2H), 2.40-1.22 (m, 9H).

MS (ESI+): [M+H]+ m/z=544.2

Example 68: Preparation of 2-fluoro-4-(3-(2-fluoro-4-((S)-3-methoxypyrrolidine-1-yl)phenyl)-7-(tetrahydro-1H-furo[3,4-c]pyrrole-5(3H)-yl)-3H-imidazo[4,5-b]pyridine-2-yl)benzonitrile The desired compound was obtained in substantially the same manner as in Example 1, except that hexahydro-1H-furo[3,4-c]pyrrole was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

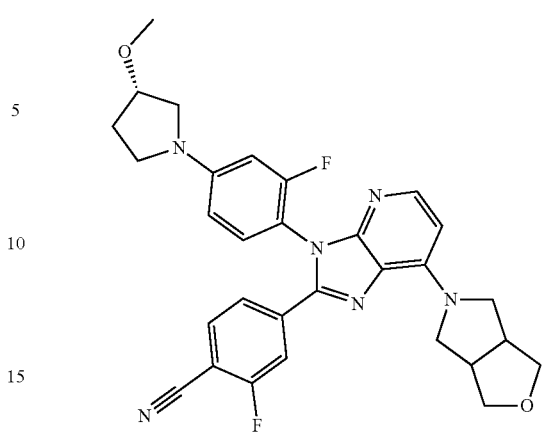

¹H-NMR (300 MHz, DMSO-d₆): δ 7.97 (t, 1H), 7.92 (d, 1H), 7.71 (d, 1H), 7.52 (d, 1H), 7.35 (m, 1H), 6.52-6.48 (m, 2H), 6.34 (d, 1H), 4.10-3.83 (m, 7H), 3.62 (m, 2H), 3.47-3.35 (m, 3H), 3.31 (m, 3H), 3.08 (m, 2H), 2.09 (m, 2H).

MS (ESI+): [M+H]+ m/z=543.2

Example 69: Preparation of (S)-2-fluoro-4-(3-(2-fluoro-4-(3-methoxypyrrolidine-1-yl)phenyl)-7-(2,6-diazaspiro[3.3]heptane-2-yl)-3H-imidazo[4,5-b]pyridine-2-yl) benzonitrile The desired compound was obtained in substantially the same manner as in Example 1, except that tert-butyl 2,6-diazaspiro[3.3]heptane-2-carboxylate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

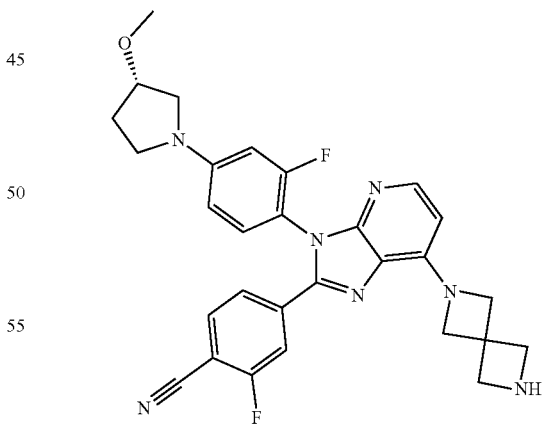

¹H-NMR (300 MHz, CDCl₃): δ 8.03-8.01 (m, 1H), 7.68-7.64 (d, 1H), 7.53-7.50 (m, 2H), 7.23-7.18 (m, 1H), 6.46-6.43 (d, 1H), 6.37-6.32 (d, 1H), 6.22-6.19 (m, 1H), 4.27-4.23 (m, 1H), 4.13-4.12 (m, 2H), 3.82-3.79 (s, 1H), 3.52-3.37 (m, 7H), 2.29-2.07 (m, 6H)

MS (ESI+): [M+H]+ m/z=528.2

Example 70: Preparation of (S)-2-fluoro-4-(3-(2-fluoro-4-(3-methoxypyrrolidine-1-yl)phenyl)-7-(3,9-diazaspiro[5.5]undecan-3-yl)-3H-imidazo[4,5-b]pyridine-2-yl) benzonitrile The desired compound was obtained in substantially the same manner as in Example 1, except that tert-butyl 3,9-diazaspiro[5.5]undecane-3-carboxylate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

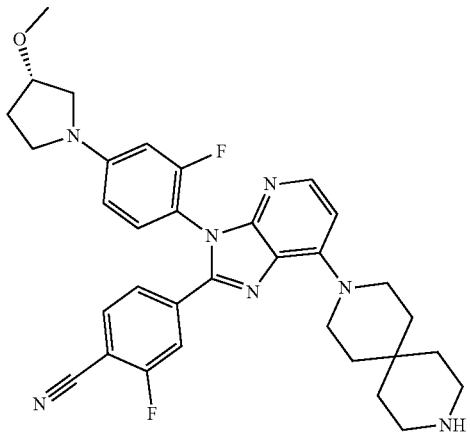 [SMILES: CO[C@H]1CCN(c2ccc(-n3c(-c4ccc(C#N)c(F)c4)nc4c(N5CCC6(CCNCC6)CC5)ccnc43)c(F)c2)C1]

$^1$H-NMR (300 MHz, DMSO): δ 8.02-7.93 (m, 2H), 7.71-7.67 (dd, 1H), 7.50-7.47 (dd, 1H), 7.40-7.39 (d, 1H), 7.37-7.34 (t, 1H), 6.71-6.70 (d, 1H), 6.56-6.51 (m, 2H), 4.12-4.02 (m, 7H), 3.29 (s, 3H), 3.29-3.11 (m, 5H), 2.14-2.08 (m, 2H), 1.69-1.67 (m, 8H)

MS (ESI$^+$): [M+H]$^+$ m/z=584.2

Example 71: Preparation of 4-(7-(3,7-diazabicyclo[3.3.1]nonane-3-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl 3,7-diazabicyclo[3.3.1]nonane-3-carboxylate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

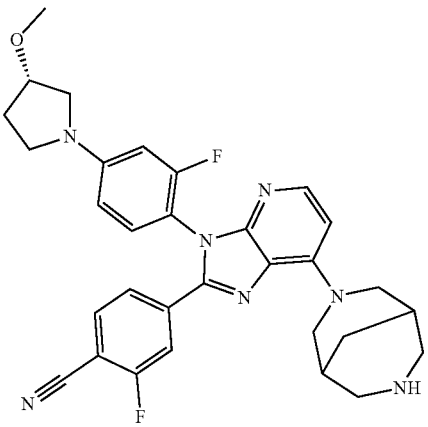 [SMILES: CO[C@H]1CCN(c2ccc(-n3c(-c4ccc(C#N)c(F)c4)nc4c(N5CC6CNCC(C6)C5)ccnc43)c(F)c2)C1]

$^1$H-NMR (300 MHz, CDCl$_3$): δ 8.24-8.23 (d, 1H), 7.62-7.56 (m, 3H), 7.23-7.167 (m, 1H), 6.63-6.61 (d, 1H), 6.46-6.43 (d, 1H), 6.38-6.34 (d, 1H), 4.91-4.87 (d, 1H), 4.60-4.56 (d, 1H), 4.14-4.11 (m, 1H), 3.81-3.70 (m, 2H), 3.59-3.37 (m, 13H), 2.39 (s, 2H), 2.23-2.19 (m, 4H)

MS (ESI$^+$): [M+H]$^+$ m/z=556.2

Example 72: Preparation of (S)-2-fluoro-4-(3-(2-fluoro-4-(3-methoxypyrrolidine-1-yl)phenyl)-7-(4-methylpiperazine-1-yl)-3H-imidazo[4,5-b]pyridine-2-yl)benzonitrile The desired compound was obtained in substantially the same manner as in Example 1, except that 1-methylpiperazine was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, 2-fluoro-4-formylbenzonitrile was used instead of 4-formylbenzonitrile in Step 5) of Example 1 and Step 6 was not performed.

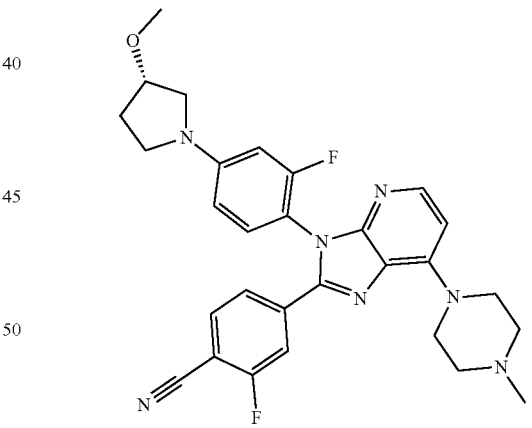

$^1$H-NMR (300 MHz, CDCl$_3$): δ 8.10 (d, 1H), 7.68 (d, 1H), 7.55 (m, 2H), 7.22 (m, 1H), 6.49 (m, 2H), 6.35 (d, 1H), 4.13 (m, 1H), 4.07 (m, 4H), 3.71 (s, 1H), 3.49 (m, 2H), 3.38 (s, 3H), 2.69 (d, 1H), 2.66 (m, 4H), 2.40 (m, 3H), 2.16 (m, 2H).

MS (ESI$^+$): [M+H]$^+$ m/z=530.3

Example 73: Preparation of 4-(7-((R)-3-aminoazepane-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile The desired compound was obtained in substantially the same manner as in Example 1, except that tert-butyl (R)-azepane-3-ylcarbamate was used instead of tert-butyl (R)- piperidine-3-ylcarbamate in Step 2) of Example 1, 2-fluoro-4-(tetrahydro-1H-furo[3,4-c]pyrrole-5(3H)-yl)aniline was used instead of p-toluidine in Step 3) of Example 1, and 2-fluoro-4-formylbenzonitrile was used instead of 4-formylbenzonitrile in Step 5) of Example 1.

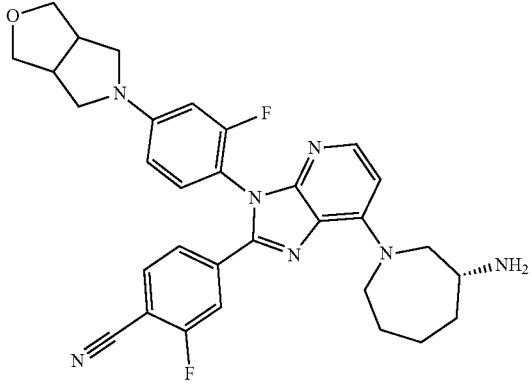 [SMILES: N#Cc1ccc(-c2nc3c(N4CCCC[C@@H](N)C4)ccnc3n2-c2ccc(N3CC4COCC4C3)cc2F)cc1F]

¹H-NMR (300 MHz, CDCl₃): δ 8.05 (d, 1H), 7.59 (m, 3H), 7.24 (m, 1H), 6.52 (m, 1H), 6.42 (m, 2H), 4.71 (t, 1H), 4.03 (m, 3H), 3.74 (m, 2H), 3.55 (m, 5H), 3.31 (m, 2H), 3.13 (m, 2H), 2.11 (m, 1H), 1.91 (m, 6H), 1.53 (m, 2H).

MS (ESI⁺): [M+H]⁺ m/z=556.3

Example 74: Preparation of 4-(7-((R)-3-amino-azepane-1-yl)-3-(2-fluoro-4-((S)-3-(methoxymethyl) pyrrolidine-1-yl)phenyl)-3H-imidazo[4,5-b]pyridine-2-yl)-2-fluorobenzonitrile The desired compound was obtained in substantially the same manner as in Example 1, except that tert-butyl (R)-azepane-3-ylcarbamate was used instead of tert-butyl (R)-piperidine-3-ylcarbamate in Step 2) of Example 1, (S)-2-fluoro-4-(3-(methoxymethyl)pyrrolidine-1-yl)aniline was used instead of p-toluidine in Step 3) of Example 1, and 2-fluoro-4-formylbenzonitrile was used instead of 4-formylbenzonitrile in Step 5) of Example 1.

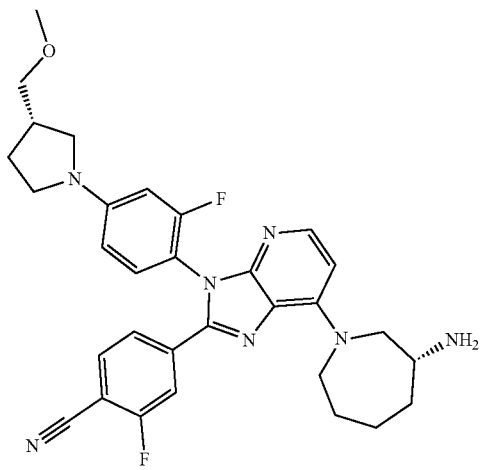 [SMILES: COC[C@H]1CCN(c2ccc(-n3c(-c4ccc(C#N)c(F)c4)nc4c(N5CCCC[C@@H](N)C5)ccnc43)c(F)c2)C1]

¹H-NMR (300 MHz, CDCl₃): δ 8.03 (d, 1H), 7.57 (m, 3H), 7.21 (m, 1H), 6.45 (m, 1H), 6.35 (m, 2H), 4.72 (t, 1H), 4.06 (m, 1H), 3.49 (m, 11H), 3.16 (m, 1H), 2.69 (m, 1H), 2.13 (m, 4H), 1.90 (m, 4H), 1.50 (m, 2H).

MS (ESI⁺): [M+H]⁺ m/z=558.3

Example 75: Preparation of 4-(7-((S)-3-(aminomethyl)piperidine-1-yl)-3-(2-fluoro-4-((S)-3-methoxypyrrolidine-1-yl)phenyl)-3H-imidazo[4,5-b]pyridine-2-yl)-2-fluorobenzonitrile The desired compound was obtained in substantially the same manner as in Example 1, except that tert-butyl (R)-(piperidine-3-ylmethyl)carbamate was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

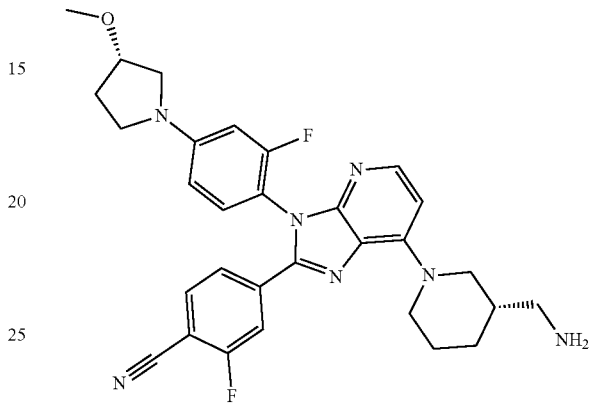

¹H-NMR (300 MHz, CDCl₃): δ 8.16 (t, 1H), 7.55 (m, 1H), 7.44 (m, 1H), 7.09 (m, 1H), 6.57 (m, 1H), 6.38 (m, 1H), 6.28 (m, 1H), 4.92 (m, 1H), 4.11 (m, 1H), 3.76 (m, 1H), 3.70 (m, 1H), 3.47 (m, 3H), 3.38 (s, 3H), 3.37 (m, 2H), 3.12 (m, 1H), 3.01 (m, 1H), 2.46 (m, 1H), 2.17 (m, 3H), 1.84 (m, 4H), 1.62 (m, 2H), 1.25 (s, 2H).

MS (ESI⁺): [M+H]⁺ m/z=544.3

Example 76: Preparation of 1-(2-(4-cyano-3-fluorophenyl)-3-(2-fluoro-4-((S)-3-methoxypyrrolidine-1-yl)phenyl)-3H-imidazo[4,5-b]pyridine-7-yl)piperidine-2-carbonitrile The desired compound was obtained in substantially the same manner as in Example 1, except that piperidine-3-carbonitrile was used instead of tert-butyl (R)-piperidine-3-ylcarbamate in Step 2) of Example 1, (S)-2-fluoro-4-(3-methoxypyrrolidine-1-yl)aniline was used instead of p-toluidine in Step 3) of Example 1, and 2-fluoro-4-formylbenzonitrile was used instead of 4-formylbenzonitrile in Step 5) of Example 1.

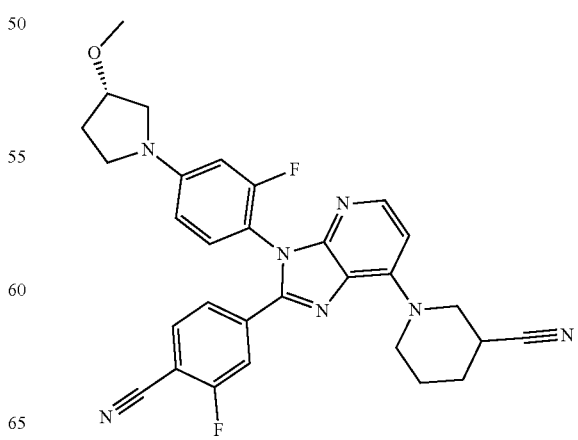

$^1$H-NMR (300 MHz, CDCl$_3$): δ 8.13 (d, 1H), 7.66 (d, 1H), 7.59 (d, 2H), 7.23 (m, 1H), 6.52 (d, 1H), 6.47 (m, 1H), 6.38 (m, 1H), 4.76 (m, 1H), 4.12 (m, 3H), 3.63 (m, 1H), 3.47 (m, 8H), 3.00 (m, 1H), 2.12 (m, 5H), 1.83 (m, 1H).

MS (ESI$^+$): [M+H]$^+$ m/z=540.2

The structures of the compounds obtained according to Examples 1 to 76 are shown in Table 1.

TABLE 1

| Example | Name | Structure |
|---|---|---|
| 1 | (R)-4-(7-(3-aminopiperidine-1-yl)-3-(p-tolyl)-3H-imidazo[4,5-b]pyridine-2-yl)benzonitrile | |
| 2 | (R)-4-(7-(3-aminopyrrolidine-1-yl)-3-(4-cyclopropylphenyl)-3H-imidazo[4,5-b]pyridine-2-yl)benzonitrile | |
| 3 | 4-(7-(4-aminopiperidine-1-yl)-3-(4-cyclopropylphenyl)-3H-imidazo[4,5-b]pyridine-2-yl)benzonitrile | |
| 4 | (R)-4-(3-(4-cyclopropylphenyl)-7-(3-(methylamino)piperidine-1-yl)-3H-imidazo[4,5-b]pyridine-2-yl)benzonitrile | |

TABLE 1-continued

| Example | Name | Structure |
|---|---|---|
| 5 | (R)-4-(7-(3-aminopiperidine-1-yl)-3-(4-cyclopropylphenyl)-3H-imidazo[4,5-b]pyridine-2-yl)benzonitrile | |
| 6 | (R)-4-(7-(3-aminopiperidine-1-yl)-3-(4-fluorophenyl)-3H-imidazo[4,5-b]pyridine-2-yl)-2-fluorobenzonitrile | |
| 7 | (R)-4-(7-(3-aminopiperidine-1-yl)-3-(2-fluoro-4-methylphenyl)-3H-imidazo[4,5-b]pyridine-2-yl)-2-fluorobenzonitrile | |
| 8 | (R)-4-(7-(3-aminoazepane-1-yl)-3-(4-cyclopropylphenyl)-3H-imidazo[4,5-b]pyridine-2-yl)-2-fluorobenzonitrile | |

TABLE 1-continued

| Example | Name | Structure |
|---|---|---|
| 9 | (R)-4-(7-(3-aminopiperidine-1-yl)-3-(4-(piperidine-1-yl)phenyl)-3H-imidazo[4,5-b]pyridine-2-yl)-2-fluorobenzonitrile | |
| 10 | (R)-4-(7-(3-aminopiperidine-1-yl)-3-(2-fluoro-4-(piperidine-1-yl)phenyl)-3H-imidazo[4,5-b]pyridine-2-yl)-2-fluorobenzonitrile | |
| 11 | (R)-4-(7-(3-aminopiperidine-1-yl)-3-(4-cyclopropyl-2-fluorophenyl)-3H-imidazo[4,5-b]pyridine-2-yl)-2-fluorobenzonitrile | |
| 12 | (R)-2-fluoro-4-(7-(3-(methylamino)piperidine-1-yl)-3-(4-(pyrrolidine-1-yl)phenyl)-3H-imidazo[4,5-b]pyridine-2-yl)benzonitrile | |

TABLE 1-continued

| Example | Name | Structure |
|---|---|---|
| 13 | (R)-4-(7-(3-aminopiperidine-1-yl)-3-(4-(pyrrolidine-1-yl)phenyl)-3H-imidazo[4,5-b]pyridine-2-yl)-2-fluorobenzonitrile | |
| 14 | (R)-4-(7-(3-aminopiperidine-1-yl)-3-(4-(dimethylamino)phenyl)-3H-imidazo[4,5-b]pyridine-2-yl)-2-fluorobenzonitrile | |
| 15 | 4-(7-(3-amino-8-azabicyclo[3.2.1]octane-8-yl)-3-(p-tolyl)-3H-imidazo[4,5-b]pyridine-2-yl)-2-fluorobenzonitrile | |
| 16 | (R)-4-(7-(3-aminopiperidine-1-yl)-3-(o-tolyl)-3H-imidazo[4,5-b]pyridine-2-yl)-2-fluorobenzonitrile | |

TABLE 1-continued

| Example | Name | Structure |
|---|---|---|
| 17 | (R)-4-(7-(3-aminopiperidine-1-yl)-3-(m-tolyl)-3H-imidazo[4,5-b]pyridine-2-yl)-2-fluorobenzonitrile | 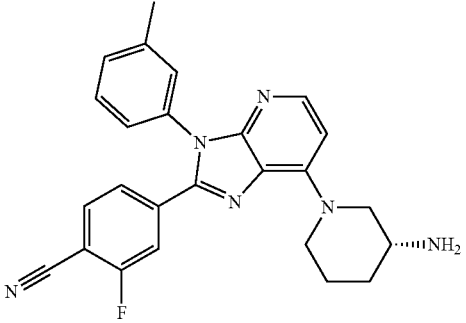 [SMILES: Cc1cccc(-n2c(-c3ccc(C#N)c(F)c3)nc3c(N4CCC[C@@H](N)C4)ccnc32)c1] |
| 18 | (R)-4-(7-(3-aminopiperidine-1-yl)-3-(4-cyclopropyl-2,6-difluorophenyl)-3H-imidazo[4,5-b]pyridine-2-yl)-2-fluorobenzonitrile | 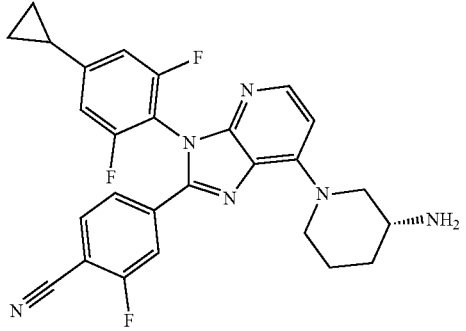 [SMILES: N#Cc1ccc(-c2nc3c(N4CCC[C@@H](N)C4)ccnc3n2-c2c(F)cc(C3CC3)cc2F)cc1F] |
| 19 | (R)-4-(7-(3-aminopiperidine-1-yl)-3-(2,6-difluoro-4-(pyrrolidine-1-yl)phenyl)-3H-imidazo[4,5-b]pyridine-2-yl)-2-fluorobenzonitrile | 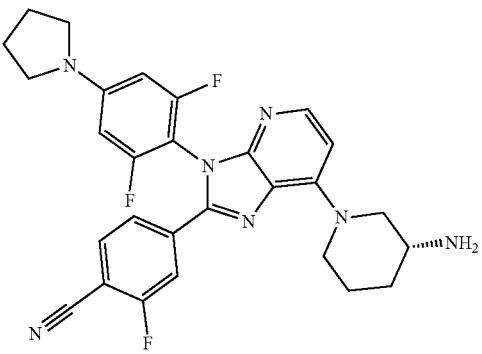 [SMILES: N#Cc1ccc(-c2nc3c(N4CCC[C@@H](N)C4)ccnc3n2-c2c(F)cc(N3CCCC3)cc2F)cc1F] |
| 20 | (R)-4-(7-(3-aminopiperidine-1-yl)-3-(3-fluoro-4-methoxyphenyl)-3H-imidazo[4,5-b]pyridine-2-yl)-2-fluorobenzonitrile | 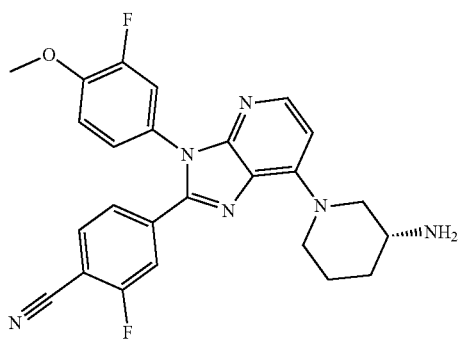 [SMILES: COc1ccc(-n2c(-c3ccc(C#N)c(F)c3)nc3c(N4CCC[C@@H](N)C4)ccnc32)cc1F] |

TABLE 1-continued

| Example | Name | Structure |
|---|---|---|
| 21 | (R)-4-(7-(3-aminopiperidine-1-yl)-3-(4-(diethylamino)phenyl)-3H-imidazo[4,5-b]pyridine-2-yl)-2-fluorobenzonitrile | |
| 22 | (R)-4-(7-(3-aminopiperidine-1-yl)-3-(4-(cyclopropyl(methyl)amino)phenyl)-3H-imidazo[4,5-b]pyridine-2-yl)-2-fluorobenzonitrile | |
| 23 | 4-(7-((R)-3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile | |
| 24 | 4-(7-((R)-3-aminopiperidine-1-yl)-3-(2-fluoro-4-((R)-3-methoxypyrrolidine-1-yl)phenyl)-3H-imidazo[4,5-b]pyridine-2-yl)-2-fluorobenzonitrile | |

TABLE 1-continued

| Example | Name | Structure |
|---|---|---|
| 25 | 4-(7-((R)-3-aminopiperidine-1-yl)-3-(2-fluoro-4-((S)-3-methoxypyrrolidine-1-yl)phenyl)-3H-imidazo[4,5-b]pyridine-2-yl)-2-fluorobenzonitrile | |
| 26 | (R)-4-(7-(3-aminopiperidine-1-yl)-3-(4-(3,3-difluoropyrrolidine-1-yl)-2-fluorophenyl)-3H-imidazo[4,5-b]pyridine-2-yl)-2-fluorobenzonitrile | |
| 27 | (R)-4-(7-(3-aminopiperidine-1-yl)-3-(2-fluoro-4-(pyrrolidine-1-yl)phenyl)-3H-imidazo[4,5-b]pyridine-2-yl)-2-fluorobenzonitrile | |
| 28 | (R)-4-(7-(3-aminopiperidine-1-yl)-3-(p-tolyl)-3H-imidazo[4,5-b]pyridine-2-yl)-2-fluorobenzonitrile | |

TABLE 1-continued

| Example | Name | Structure |
|---|---|---|
| 29 | (R)-4-(7-(3-aminopiperidine-1-yl)-3-phenyl-3H-imidazo[4,5-b]pyridine-2-yl)-2-fluorobenzonitrile | 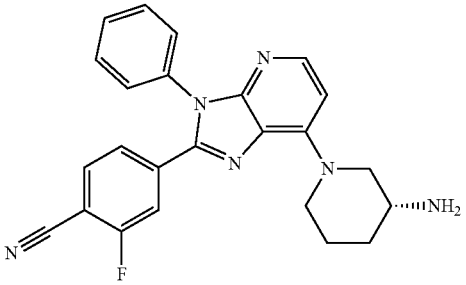 [SMILES: N#Cc1ccc(-c2nc3c(N4CCC[C@@H](N)C4)ccnc3n2-c2ccccc2)cc1F] |
| 30 | (R)-4-(7-(3-aminopiperidine-1-yl)-3-(4-cyclopentyloxy)-2-fluorophenyl)-3H-imidazo[4,5-b]pyridine-2-yl)-2-fluorobenzonitrile | 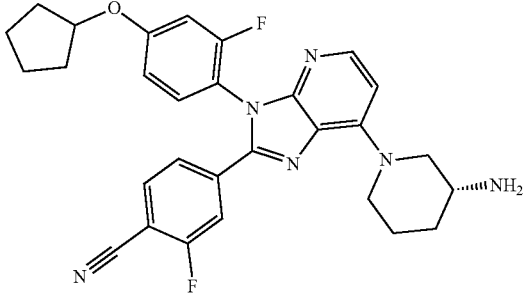 [SMILES: N#Cc1ccc(-c2nc3c(N4CCC[C@@H](N)C4)ccnc3n2-c2ccc(OC3CCCC3)cc2F)cc1F] |
| 31 | (R)-4-(7-(3-aminopiperidine-1-yl)-3-(2-fluoro-4-(3-methoxyazetidine-1-yl)phenyl)-3H-imidazo[4,5-b]pyridine-2-yl)-2-fluorobenzonitrile | 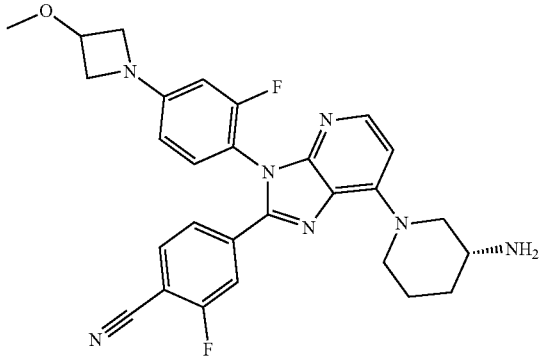 [SMILES: COC1CN(c2ccc(-n3c(-c4ccc(C#N)c(F)c4)nc4c(N5CCC[C@@H](N)C5)ccnc43)c(F)c2)C1] |
| 32 | (S)-1-(4-(7-((R)-3-aminopiperidine-1-yl)-2-(4-cyano-3-fluorophenyl)-3H-imidazo[4,5-b]pyridine-3-yl)-3-fluorophenyl)pyrrolidine-3-yl acetate | 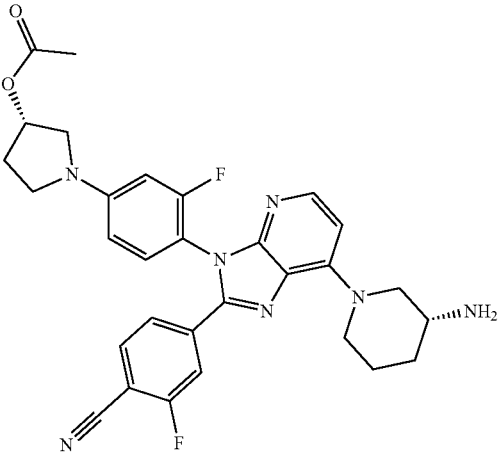 [SMILES: CC(=O)O[C@H]1CCN(c2ccc(-n3c(-c4ccc(C#N)c(F)c4)nc4c(N5CCC[C@@H](N)C5)ccnc43)c(F)c2)C1] |

TABLE 1-continued

| Example | Name | Structure |
|---|---|---|
| 33 | (R)-4-(7-(3-aminopiperidine-1-yl)-3-(2-fluoro-4-morpholinophenyl)-3H-imidazo[4,5-b]pyridine-2-yl)-2-fluorobenzonitrile | |
| 34 | (R)-4-(7-(3-aminopiperidine-1-yl)-3-(2-fluoro-4-methylpiperazine-1-yl)phenyl)-3H-imidazo[4,5-b]pyridine-2-yl)-2-fluorobenzonitrile | |
| 35 | 4-(7-((R)-3-aminopiperidine-1-yl)-3-(2-fluoro-4-((S)-3-hydroxypyrrolidine-1-yl)phenyl)-3H-imidazo[4,5-b]pyridine-2-yl)-2-fluorobenzonitrile | |
| 36 | 4-(7-((R)-3-aminopiperidine-1-yl)-3-(4-((S)-3-chloropyrrolidine-1-yl)-2-fluorophenyl)-3H-imidazo[4,5-b]pyridine-2-yl)-2-fluorobenzonitrile | |

TABLE 1-continued

| Example | Name | Structure |
|---|---|---|
| 37 | (R)-4-(7-(3-aminopiperidine-1-yl)-3-(3-(2-morpholinoethoxy)phenyl)-3H-imidazo[4,5-b]pyridine-2-yl)-2-fluorobenzonitrile | |
| 38 | (R)-4-(7-(3-aminopiperidine-1-yl)-3-(4-(morpholino-4-carbonyl)phenyl)-3H-imidazo[4,5-b]pyridine-2-yl)-2-fluorobenzonitrile | |
| 39 | 4-(7-((R)-3-aminopiperidine-1-yl)-3-(4-(S)-3-ethoxypyrrolidine-1-yl)-2-fluorophenyl)-3H-imidazo[4,5-b]pyridine-2-yl)-2-fluorobenzonitrile | |
| 40 | (R)-4-(7-(3-aminopiperidine-1-yl)-3-(4-hydroxyphenyl)-3H-imidazo[4,5-b]pyridine-2-yl)-2-fluorobenzonitrile | |

TABLE 1-continued

| Example | Name | Structure |
|---|---|---|
| 41 | (R)-4-(7-(3-aminopiperidine-1-yl)-3-(4-cyanophenyl)-3H-imidazo[4,5-b]pyridine-2-yl)-2-fluorobenzonitrile | |
| 42 | (R)-4-(7-(3-aminopiperidine-1-yl)-3-(2,3-dihydro-1H-indene-5-yl)-3H-imidazo[4,5-b]pyridine-2-yl)-2-fluorobenzonitrile | |
| 43 | (R)-4-(7-(3-aminopiperidine-1-yl)-3-(4-isopropylphenyl)-3H-imidazo[4,5-b]pyridine-2-yl)-2-fluorobenzonitrile | |
| 44 | (R)-4-(7-(3-aminopiperidine-1-yl)-3-(1-methyl-1H-indole-5-yl)-3H-imidazo(4,5-b)pyridine-2-yl)-2fluorobenzonitrile | |
| 45 | (R)-4-(7-(3-aminopiperidine-1-yl)-3-(5-methylpyridine-2-yl)-3H-imidazo[4,5-b]pyridine-2-yl)-2-fluorobenzonitrile | |

TABLE 1-continued

| Example | Name | Structure |
|---|---|---|
| 46 | (R)-4-(7-(3-aminopiperidine-1-yl)-3-(4-cyclohexylphenyl)-3H-imidazo[4,5-b]pyridine-2-yl)-2-fluorobenzonitrile | |
| 47 | (R)-4-(7-(3-aminopiperidine-1-yl)-3-(3-vinylphenyl)-3H-imidazo[4,5-b]pyridine-2-yl)-2-fluorobenzonitrile | |
| 48 | (R)-4-(7-(3-aminopiperidine-1-yl)-3-(4-((3-methoxypropyl)(methyl)amino)phenyl)-3H-imidazo[4,5-b]pyridine-2-yl)-2-fluorobenzonitrile | |
| 49 | 4-(7-((R)-3-aminopiperidine-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile | |

TABLE 1-continued

| Example | Name | Structure |
|---|---|---|
| 50 | (R)-4-(7-(3-aminopiperidine-1-yl)-3-cyclohexyl-3H-imidazo[4,5-b]pyridine-2-yl)-2-fluorobenzonitrile | |
| 51 | (R)-4-(7-(3-aminopiperidine-1-yl)-3-(4-hexylphenyl)-3H-imidazo[4,5-b]pyridine-2-yl)-2-fluorobenzonitrile | |
| 52 | 4-(7-((R)-3-aminopiperidine-1-yl)-3-(2-fluoro-4-((S)-3-methoxypyrrolidine-1-yl)phenyl)-3H-imidazo[4,5-b]pyridine-2-yl)-3-fluorobenzonitrile | |
| 53 | 4-(7-((R)-3-aminopiperidine-1-yl)-3-(2-fluoro-4-((S)-3-methoxypyrrolidine-1-yl)phenyl)-3H-imidazo[4,5-b]pyridine-2-yl)-3-methoxybenzonitrile | |

TABLE 1-continued

| Example | Name | Structure |
|---|---|---|
| 54 | (R)-4-(7-(3-aminopiperidine-1-yl)-3-(1-methyl-1H-pyrrolo[2,3-b]pyridine-5-yl)-3H-imidazo[4,5-b]pyridine-2-yl)-2-fluorobenzonitrile | 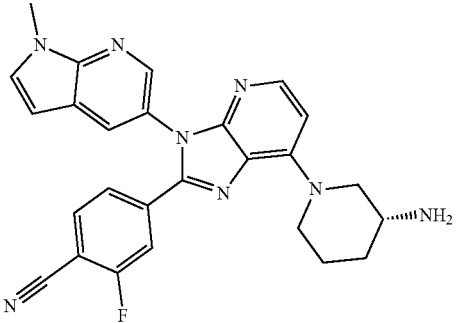 [SMILES: Cn1ccc2cc(-n3c(-c4ccc(C#N)c(F)c4)nc4c(N5CCC[C@@H](N)C5)ccnc43)cnc21] |
| 55 | (R)-4-(7-(3-aminopiperidine-1-yl)-3-(1-methyl-1H-indazole-5-yl)-3H-imidazo[4,5-b]pyridine-2-yl)-2-fluorobenzonitrile | 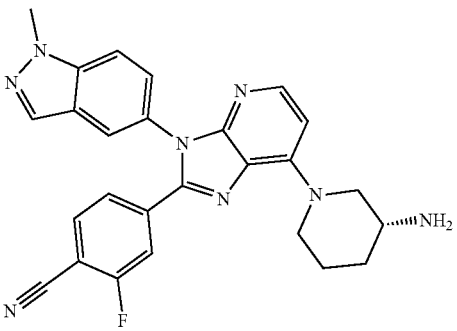 [SMILES: Cn1ncc2cc(-n3c(-c4ccc(C#N)c(F)c4)nc4c(N5CCC[C@@H](N)C5)ccnc43)ccc21] |
| 56 | 4-(7-((R)-3-aminopiperidine-1-yl)-3-(2-fluoro-4-(S)-3-methoxypiperidine-1-yl)phenyl)-3H-imidazo[4,5-b]pyridine-2-yl)-2-fluorobenzonitrile | 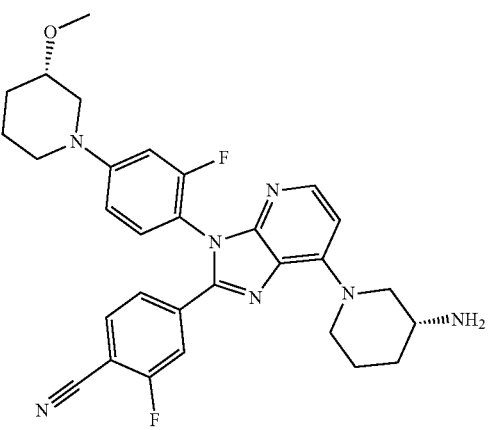 [SMILES: CO[C@H]1CCCN(c2ccc(-n3c(-c4ccc(C#N)c(F)c4)nc4c(N5CCC[C@@H](N)C5)ccnc43)c(F)c2)C1] |
| 57 | 4-(7-((R)-3-aminopiperidine-1-yl)-3-(4-(3-(dimethylamino)pyrrolidine-1-yl)-2-fluorophenyl)-3H-imidazo[4,5-b]pyridine-2-yl)-2-fluorobenzonitrile | 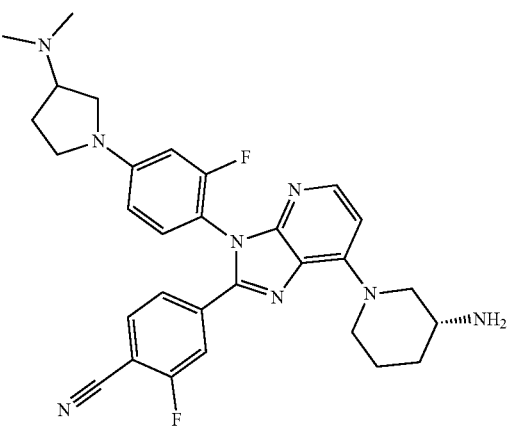 [SMILES: CN(C)C1CCN(c2ccc(-n3c(-c4ccc(C#N)c(F)c4)nc4c(N5CCC[C@@H](N)C5)ccnc43)c(F)c2)C1] |

TABLE 1-continued

| Example | Name | Structure |
|---|---|---|
| 58 | (R)-4-(7-(3-aminopiperidine-1-yl)-3-(benzo[d]thiazole-5-yl)-3H-imidazo[4,5-b]pyridine-2-yl)-2-fluorobenzonitrile | |
| 59 | 4-(7-(R)-3-aminopiperidine-1-yl)-3-(2-fluoro-4-((S)-3-(methoxymethyl)pyrrolidine-1-yl)phenyl)-3H-imidazo[4,5-b]pyridine-2-yl)-2-fluorobenzonitrile | |
| 60 | (S)-2-fluoro-4-(3-(2-fluoro-4-(3-methoxypyrrolidine-1-yl)phenyl)-7-(2,8-diazaspiro[4.5]decane-8-yl)-3H-imidazo[4,5-b]pyridine-2-yl)benzonitrile | |
| 61 | 2-fluoro-4-(3-(2-fluoro-4-((S)-3-methoxypyrrolidine-1-yl)phenyl)-7-(octahydro-6H-pyrrolo[2,3-c]pyridine-6-yl)-3H-imidazo[4,5-b]pyridine-2-yl)benzonitrile | |

TABLE 1-continued

| Example | Name | Structure |
|---|---|---|
| 62 | 4-(7-((S)-3-aminopiperidine-1-yl)-3-(2-fluoro-4-((S)-3-methoxypyrrolidine-1-yl)phenyl)-3H-imidazo[4,5-b]pyridine-2-yl)-2-fluorobenzonitrile | |
| 63 | 4-(7-(3-amino-8-azabicyclo[3.2.1]octane-8-yl)-3-(2-fluoro-((S)-3-methoxypyrrolidine-1-yl)phenyl)-3H-imidazo[4,5-b]pyridine-2-yl)-2-fluorobenzonitrile | |
| 64 | 4-(7-(3-aminopyrrolidine-1-yl)-3-(2-fluoro-4-((S)-3-methoxypyrrolidine-1-yl)phenyl)-3H-imidazo[4,5-b]pyridine-2-yl)-2-fluorobenzonitrile | |

TABLE 1-continued

| Example | Name | Structure |
|---|---|---|
| 65 | 2-fluoro-4-(3-(2-fluoro-4-((S)-3-methoxypyrrolidine-1-yl)phenyl)-7-(2,7-diazaspiro[4.4]nonane-2-yl)-3H-imidazo[4,5-b]pyridine-2-yl)benzonitrile | |
| 66 | (S)-2-fluoro-4-(3-(2-fluoro-4-(3-methoxypyrrolidine-1-yl)phenyl)-7-(2,7-diazaspiro[3.5]nonane-7-yl)-3H-imidazo[4,5-b]pyridine-2-yl)benzonitrile | |
| 67 | 4-(7-((R)-3-aminoazepane-1-yl)-3-(2-fluoro-4-((S)-3-methoxypyrrolidine-1-yl)phenyl)-3H-imidazo[4,5-b]pyridine-2-yl)-2-fluorobenzonitrile | |

TABLE 1-continued

| Example | Name | Structure |
|---|---|---|
| 68 | 2-fluoro-4-(3-(2-fluoro-4-((S)-3-methoxypyrrolidine-1-yl)phenyl)-7-(tetrahydro-1H-furo[3,4-c]pyrrole-5(3H)-yl)-3H-imidazo[4,5-b]pyridine-2-yl)benzonitrile | |
| 69 | (S)-2-fluoro-4-(3-(2-fluoro-4-(3-methoxypyrrolidine-1-yl)phenyl)-7-(2,6-diazaspiro[3.3]heptane-2-yl)-3H-imidazo[4,5-b]pyridine-2-yl)benzonitrile | |
| 70 | (S)-2-fluoro-4-(3-(2-fluoro-4-(3-methoxypyrrolidine-1-yl)phenyl)-7-(3,9-diazaspiro[5.5]undecane-3-yl)-3H-imidazo[4,5-b]pyridine-2-yl)benzonitrile | |

TABLE 1-continued

| Example | Name | Structure |
|---|---|---|
| 71 | 4-(7-(3,7-diazabicyclo[3.3.1]nonane-3-yl)-3-(2-fluoro-4-((S)-3-methoxypyrrolidine-1-yl)phenyl)-3H-imidazo[4,5-b]pyridine-2-yl)-2-fluorobenzonitrile | |
| 72 | (S)-2-fluoro-4-(3-(2-fluoro-4-(3-methoxypyrrolidine-1-yl)phenyl)-7-(4-methylpiperazine-1-yl)-3H-imidazo[4,5-b]pyridine-2-yl)benzonitrile | |
| 73 | 4-(7-(R)-3-aminoazepane-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile | |

TABLE 1-continued

| Example | Name | Structure |
|---|---|---|
| 74 | 4-(7-((R)-aminoazepane-1-yl)-3-(2-fluoro-4-((S)-3-methoxymethyl)pyrrolidine-1-yl)phenyl)-3H-imidazo[4,5-b]pyridine-2-yl)-2-fluorobenzonitrile | |
| 75 | 4-(7-((S)-3-(aminomethyl)piperidine-1-yl)-3-(2-fluoro-4-((S)-3-methoxypyrrolidine-1-yl)phenyl)-3H-imidazo[4,5-b]pyridine-2-yl)-2-fluorobenzonitrile | |
| 76 | 1-(2-(4-cyano-3-fluorophenyl)-3-(2-fluoro-4-((S)-3-methoxypyrrolidine-1-yl)phenyl)-3H-imidazo[4,5-b]pyridine-7-yl)piperidine-2-carbonitrile | |

The compounds prepared in the Examples were subjected to bioassay as follows.

Experimental Example 1: Biochemical Analysis of LSD1 Histone Demethylase Inhibitor The biochemical inhibition activity of the synthesized compounds on LSD1 was measured. The activity measurement was performed using LSD1 fluorescence analysis kit (available from BPS Bioscience Co., Ltd., Catalog No: 50106). This analysis kit is designed to measure activity of LSD1 enzyme. $H_2O_2$ generated upon demethylation of Lys4 moiety of histone H3 by LSD1 is reacted with HRP/Amplex Red reagent to form fluorescent Resorufin, which is measured by this kit, thereby confirming demethylation. Activity inhibition of each of the compounds on LSD1 is shown in Table 2.

The results are expressed as an $IC_{50}$ value. As for a control, GSK2879552 (available from GlaxoSmithKline USA) was used.

TABLE 2

| Example | LSD1 (IC$_{50}$, nM) |
|---|---|
| Control | 311 |
| 1 | 56 |
| 2 | 162 |
| 3 | 53 |
| 4 | 44 |
| 5 | 101 |
| 7 | 26 |
| 8 | 23 |
| 9 | 38 |
| 10 | 40 |
| 11 | 21 |
| 12 | 24 |
| 13 | 23 |
| 14 | 26 |
| 18 | 38 |
| 19 | 29 |
| 21 | 27 |
| 23 | 17 |
| 24 | 19 |
| 25 | 38 |
| 26 | 29 |
| 27 | 37 |
| 28 | 40 |
| 31 | 30 |
| 32 | 38 |
| 35 | 45 |
| 36 | 26 |
| 39 | 25 |
| 49 | 30 |
| 60 | 100 |
| 61 | 38 |
| 62 | 36 |
| 64 | 24 |
| 67 | 30 |
| 73 | 28 |

Experimental Example 2: Cell Growth Suppression Test

Cell growth suppression effects of the synthesized compounds on NCI-H1417 cells were identified. The cells were treated with the synthesized compounds for 10 days. Then, in order to test the cell growth suppression, CellTiter-Glo Luminescent Cell Viability Assay (available from Promega, USA) was used. This test is to measure emission signals proportional to the number of ATPs based on a fixed amount of ATPs, which represents the presence of metabolically active cells, thereby determining the number of viable cells. 50% suppression of the compounds on NCI-H1417 cells are shown in Table 2. The results are expressed as a GI$_{50}$ value. As for a control, GSK2879552 (available from GlaxoSmithKline USA) was used.

TABLE 3

| Example | NCI-H1417 (GI$_{50}$, nM) |
|---|---|
| Control | 311 |
| 1 | 90 |
| 2 | 40 |
| 3 | 230 |
| 4 | 103 |
| 5 | 159 |
| 7 | 99 |
| 8 | 56 |
| 9 | 100 |
| 10 | 30 |
| 11 | 24 |
| 13 | 62 |

TABLE 3-continued

| Example | NCI-H1417 (GI$_{50}$, nM) |
|---|---|
| 18 | 46 |
| 19 | 18 |
| 21 | 27 |
| 23 | 4.8 |
| 24 | 7.6 |
| 25 | 4.4 |
| 26 | 26 |
| 27 | 64 |
| 28 | 37 |
| 30 | 62 |
| 31 | 32 |
| 32 | 46 |
| 33 | 44 |
| 34 | 101 |
| 35 | 17 |
| 36 | 26 |
| 37 | 148 |
| 38 | 612 |
| 39 | 3.6 |
| 40 | 42 |
| 42 | 26 |
| 43 | 60 |
| 44 | 171 |
| 45 | 171 |
| 46 | 303 |
| 47 | 360 |
| 48 | 23 |
| 49 | 5.3 |
| 51 | 242 |
| 52 | 30 |
| 53 | >1000 |
| 54 | 21 |
| 55 | 7.9 |
| 56 | 14 |
| 57 | 53 |
| 58 | 64 |
| 60 | 32 |
| 61 | 11 |
| 62 | 20 |
| 63 | 290 |
| 64 | 14 |
| 65 | 39 |
| 66 | 23 |
| 67 | 2.7 |
| 68 | >1000 |
| 69 | >1000 |
| 70 | 34 |
| 71 | 44 |

The invention claimed is:

1. A compound selected from compounds of Formula 1, and tautomers, stereoisomers, solvates, and pharmaceutically acceptable salts thereof:

Formula 1

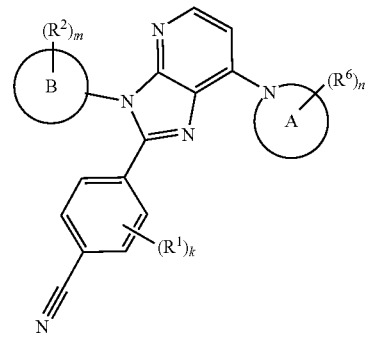

wherein, in Formula 1,

 is a $C_3$-$C_{14}$ carbocyclic group or a $C_1$-$C_{14}$ heterocyclic group;

$R^1$(s) are each independently any one selected from hydrogen, a halogen, a cyano group, a hydroxy group, a thiol group, a nitro group, an amino group, a $C_1$-$C_3$ alkyl group, a halo $C_1$-$C_3$ alkyl group, a $C_1$-$C_3$ alkoxy group, and a halo $C_1$-$C_3$ alkoxy group;

$R^2$(s) are each independently any one selected from hydrogen, a halogen, a cyano group, a hydroxy group, an acetyloxy group, a thiol group, a nitro group, an amino group, a $C_1$-$C_6$ alkyl group, a halo $C_1$-$C_6$ alkyl group, a $C_2$-$C_6$ alkenyl group, a halo $C_2$-$C_6$ alkenyl group, a $C_2$-$C_6$ alkynyl group, a $C_1$-$C_6$ alkylhydroxy group, a $C_1$-$C_6$ alkoxy group, a halo $C_1$-$C_6$ alkoxy group, a $C_1$-$C_3$ alkoxy$C_1$-$C_6$ alkyl group, a $C_3$-$C_9$ cycloalkyl group, a halo $C_3$-$C_9$ cycloalkyl group, a $C_3$-$C_9$ cycloalkoxy group, a $C_3$-$C_9$ cycloalkenyl group, —N(Q_5)(Q_6), —C(O)N(Q_5)(Q_6), —O—(C_1-C_6 alkyl)-N(Q_5)(Q_6), $C_3$-$C_9$ heterocycloalkyl group, a $C_3$-$C_9$ heterobicycloalkyl group, and a $C_3$-$C_9$ heterocycloalkenyl group, wherein $Q_5$ and $Q_6$ are each independently any one selected from hydrogen, a $C_1$-$C_6$ alkyl group, a $C_2$-$C_6$ alkenyl group, a $C_1$-$C_6$ alkoxy group, and a $C_3$-$C_6$ cycloalkyl group, each of which is unsubstituted or substituted with one to four substituents independently selected from a halogen, a hydroxy group, an amino group, a $C_1$-$C_3$ alkyl group, and a $C_1$-$C_3$ alkoxy, and $Q_5$ and $Q_6$ form, together with a nitrogen atom to which they are bonded, a $C_3$-$C_8$ heterocyclic group or a $C_6$-$C_{14}$ heterobicyclic group, and the $C_3$-$C_8$ heterocyclic group or the $C_6$-$C_{14}$ heterobicyclic group are unsubstituted or substituted with any one substituent selected from a halogen, a cyano group, a hydroxyl group, an acetyloxy group, a thiol group, a nitro group, an amino group, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy($C_1$-$C_6$ alkyl)amino group, a $C_1$-$C_3$ alkoxydi($C_1$-$C_3$ alkyl)amino group, a $C_3$-$C_6$ cycloalkyl($C_1$-$C_3$ alkyl)amino group, a $C_1$-$C_3$ alkoxy group, a halo $C_1$-$C_3$ alkoxy group, a $C_1$-$C_3$ alkoxy$C_1$-$C_6$ alkyl group, a $C_3$-$C_6$ cycloalkyl group, and a halo $C_3$-$C_6$ cycloalkyl group;

is any one selected from a piperidinyl group, a pyrrolidinyl group, piperazinyl group, azepanyl group, a diazaspiro$C_5$-$C_{14}$cyclic group, a pyridinyl group, a pyridazinyl group, a pyrimidinyl group, a pyrazinyl group, a pyrazolyl group, an indolyl group, a dihydroindolyl group, a octahydroindolyl group, a octahydroisoindolyl group, a furopyrrolyl group, a pyrrolopyridinyl group, an azabicyclo $C_8$-$C_{10}$ alkanyl group, and a diazabicyclo $C_8$-$C_{12}$ cyclic group;

$R^6$(s) are each independently any one selected from hydrogen, a halogen, a cyano group, a hydroxy group, a thiol group, a nitro group, an amino group, a $C_1$-$C_6$ alkyl group, a halo $C_1$-$C_6$ alkyl group, a $C_1$-$C_6$ alkylhydroxy group, a $C_2$-$C_6$ alkenyl group, a halo $C_2$-$C_6$ alkenyl group, a $C_2$-$C_6$ alkynyl group, a halo $C_2$-$C_6$ alkynyl group, a $C_3$-$C_9$ cycloalkyl group, a halo $C_3$-$C_9$ cycloalkyl group, a $C_1$-$C_6$ alkoxy group, a halo $C_1$-$C_6$ alkoxy group, a $C_1$-$C_3$ alkylamino group, a $C_1$-$C_3$ dialkylamino group, a $C_3$-$C_6$ cycloalkylamino group, and a halo $C_1$-$C_3$ alkylamino group;

k is an integer from 0 to 4, wherein, when k is 2 or more, two or more $R^1$(s) are identical to or different from each other;

m is an integer from 0 to 8, wherein, when m is 2 or more, two or more $R^2$(s) are identical to or different from each other;

n is an integer from 0 to 10, wherein, when n is 2 or more, two or more $R^6$(s) are identical to or different from each other; and the heterocyclic group, the heterocycloalkyl group, the heterocycloalkenyl group, and the heterobicyclic group each refer to a substituted group in which a ring-forming carbon is substituted with at least one atom selected from O, N, P, and S.

2. The compound of claim 1, wherein  is any one selected from a phenyl group, a pyridinyl group, a pyridazinyl group, a pyrimidinyl group, a pyrazinyl group, a pyrrolyl group, a pyrazolyl group, an indolyl group, a pyrazolopyridinyl group, a pyrrolopyridinyl group, a benzimidazolyl group, a benzopyrazolyl group, a benzothiophenyl group, a quinolinyl group, a benzothiazolyl group, an indazolyl group, a furopyrrolyl group, a benzofuranyl group, a benzodioxinyl group, a benzopyranyl group, an indanyl group, an indenyl group, a naphthyl group, a cyclopentyl group, a cyclohexyl group, and a cycloheptyl group.

3. The compound of claim 1, wherein $R^1$ is any one selected from hydrogen, a halogen, a cyano group, a hydroxy group, an amino group, a $C_1$-$C_3$ alkyl group, and a $C_1$-$C_3$ alkoxy group.

4. The compound of claim 1, wherein $R^2$ is any one selected from hydrogen, a halogen, a cyano group, a hydroxy group, an acetyloxy group, a thiol group, a nitro group, an amino group, a $C_1$-$C_6$ alkyl group, a $C_2$-$C_6$ alkenyl group, a $C_2$-$C_6$ alkynyl group, a $C_1$-$C_3$ alkylamino group, a $C_1$-$C_3$ dialkylamino group, a $C_1$-$C_3$ alkoxy($C_1$-$C_6$ alkyl) amino group, a $C_1$-$C_3$ alkoxydi($C_1$-$C_3$ alkyl)amino group, a $C_1$-$C_3$ cycloalkyl($C_1$-$C_3$ alkyl)amino group, a $C_1$-$C_6$ alkoxy group, a $C_3$-$C_9$ cycloalkyl group, a $C_3$-$C_9$ cycloalkoxy group, a $C_3$-$C_9$ cycloalkenyl group, —C(O)-morpholinyl group, —O—($C_1$-$C_3$ alkyl)-morpholinyl group, a piperidinyl group, a pyrrolidinyl group, a piperazinyl group, an azetidinyl group, a morpholinyl group,

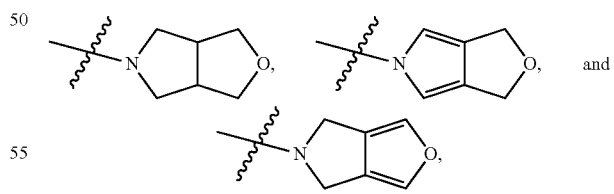

wherein the piperidinyl group, the pyrrolidinyl group, the piperazinyl group, the azetidinyl group, the morpholinyl group,

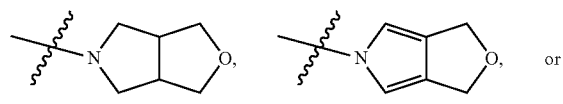

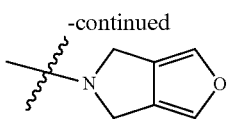

is unsubstituted or substituted with any one substituent selected from:
a halogen, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy group, a halo $C_1$-$C_3$ alkoxy group, and a $C_1$-$C_3$ alkoxy$C_1$-$C_3$ alkyl group.

5. The compound of claim 1, wherein

is any one selected from a piperidinyl group, a pyrrolidinyl group, piperazinyl group, azepanyl group, a diazaspiro $C_7$-$C_{12}$ cyclic group, a pyridinyl group, a pyridazinyl group, a pyrimidinyl group, a pyrazinyl group, a pyrazolyl group, a furo[3,4-c]pyrrolyl group, a pyrrolo[2,3-c]pyridinyl group, an azabicyclo $C_8$-$C_{10}$ alkanyl group, and a diazabicyclo $C_8$-$C_{12}$ cyclic group.

6. The compound of claim 1, wherein Ⓑ is any one selected from a phenyl group, a pyridinyl group, a pyridazinyl group, a pyrimidinyl group, a pyrazinyl group, a pyrrolyl group, a pyrazolyl group, an indolyl group, a pyrazolopyridinyl group, a pyrrolo[2,3-b]pyridinyl group, a benzothiazolyl group, an indazolyl group, a furo[3,4-c]-pyrrolyl group, an indanyl group, an indenyl group, and a cyclohexyl group;
$R^1$(s) are each independently any one selected from hydrogen, a halogen, a hydroxy group, a thiol group, a $C_1$-$C_3$ alkyl group, a halo $C_1$-$C_3$ alkyl group, a $C_1$-$C_3$ alkoxy group, and a halo $C_1$-$C_3$ alkoxy group;
$R^2$(s) are each independently any one selected from hydrogen, a halogen, a cyano group, a hydroxy group, an acetyloxy group, a thiol group, a nitro group, an amino group, a $C_1$-$C_6$ alkyl group, a halo $C_1$-$C_6$ alkyl group, a $C_2$-$C_6$ alkenyl group, a halo $C_2$-$C_6$ alkenyl group, a $C_1$-$C_3$ alkylamino group, a $C_1$-$C_3$ dialkylamino group, a $C_1$-$C_6$ alkylhydroxy group, a $C_1$-$C_6$ alkoxy group, a halo $C_1$-$C_6$ alkoxy group, a $C_1$-$C_3$ alkoxy$C_1$-$C_6$ alkyl group, a $C_3$-$C_9$ cycloalkyl group, a halo $C_3$-$C_9$ cycloalkyl group, a $C_3$-$C_6$ cycloalkoxy group, a $C_3$-$C_6$ cycloalkylamino group, a $C_3$-$C_6$ cycloalkyl($C_1$-$C_3$ alkyl)amino group, a —C(O)-morpholinyl group, and a —O—($C_1$-$C_3$ alkyl)-morpholinyl group, or
any one heterocyclic compound selected from a piperidinyl group, a pyrrolidinyl group, a piperazinyl group, an azetidinyl group, a morpholinyl group,

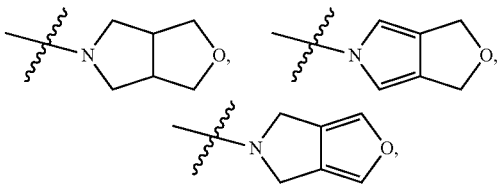

the heterocyclic compound being unsubstituted or substituted with any one substituent selected from halogen, a cyano group, a hydroxyl group, an acetyloxy group, an amino group, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy group, a halo $C_1$-$C_3$ alkoxy group, and a $C_1$-$C_3$ alkoxy$C_1$-$C_3$ alkyl group;

is any one selected from a piperidinyl group, a pyrrolidinyl group, piperazinyl group, an azepanyl group, a diazaspiroheptanyl group, a diazaspirononanyl group, a diazaspirodecanyl group, a diazaspiroundecanyl group, a diazabicyclononanyl group, a pyridinyl group, a pyridazinyl group, a pyrimidinyl group, a pyrazinyl group, a pyrazolyl group, a tetrahydro-1H-furo[3,4-c]pyrrolyl group, an octahydro-6H-pyrrolo[2,3-c]pyridinyl group, and an azabicyclo $C_8$-$C_{10}$ alkanyl group;
$R^6$(s) are each independently any one selected from hydrogen, a halogen, a cyano group, a hydroxy group, a nitro group, a $C_1$-$C_6$ alkyl group, a halo $C_1$-$C_6$ alkyl group, a $C_1$-$C_6$ alkylhydroxy group, a $C_1$-$C_6$ alkoxy group, a halo $C_1$-$C_6$ alkoxy group, an amino group, a $C_1$-$C_3$ alkylamino group, a $C_1$-$C_3$ dialkylamino group, a $C_3$-$C_6$ cycloalkylamino group, and a halo $C_1$-$C_3$ alkylamino group;
k is an integer from 0 to 4, wherein, when k is 2 or more, two or more $R^1$(s) are identical to or different from each other;
m is an integer from 0 to 4, wherein, when m is 2 or more, two or more $R^2$(s) are identical to or different from each other, and
n is an integer from 0 to 6, wherein, when n is 2 or more, two or more $R^6$(s) are identical to or different from each other.

7. The compound of claim 1, wherein

Ⓑ is any one selected from a phenyl group, a pyridinyl group, a pyridazinyl group, a pyrimidinyl group, a pyrazinyl group, a pyrrolyl group, a pyrazolyl group, an indolyl group, a pyrrolo[2,3-c]pyridinyl group, an indazolyl group, an indanyl group, a benzothiazolyl group, a tetrahydrofuro[3,4-c]pyrrolyl group, and a cyclohexyl group;
$R^1$(s) are each independently any one selected from hydrogen, a halogen, a hydroxy group, a thiol group, a $C_1$-$C_3$ alkyl group, a halo $C_1$-$C_3$ alkyl group, a $C_1$-$C_3$ alkoxy group, and a halo $C_1$-$C_3$ alkoxy group;
$R^2$(s) are each independently any one selected from hydrogen, a halogen, a cyano group, a hydroxy group, an acetyloxy group, a thiol group, a nitro group, an amino group, a $C_1$-$C_6$ alkyl group, a $C_2$-$C_6$ alkenyl group, a halo $C_1$-$C_6$ alkyl group, a $C_1$-$C_3$ alkoxy$C_1$-$C_6$ alkyl group, a $C_1$-$C_3$ alkylamino group, a $C_1$-$C_3$ dialkylamino group, a $C_1$-$C_3$ alkoxy($C_1$-$C_6$ alkyl)amino group, a $C_1$-$C_3$ alkoxydi($C_1$-$C_3$ alkyl)amino group, a $C_3$-$C_6$ cycloalkyl($C_1$-$C_3$ alkyl)amino group, a $C_1$-$C_6$ alkoxy group, a halo $C_1$-$C_6$ alkoxy group, a $C_3$-$C_9$ cycloalkyl group, a $C_3$-$C_9$ cycloalkoxy group, a halo $C_3$-$C_9$ cycloalkyl group, a halo $C_3$-$C_9$ cycloalkoxy group, a piperidinyl group, a pyrrolidinyl group, a piperazinyl group, an azetidinyl group, a morpholinyl group, a —C(O)-morpholinyl group, a —O—($C_1$-$C_3$ alkyl)-morpholinyl group, and

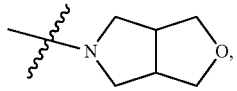 [SMILES: *N1CC2COCC2C1]

wherein the piperidinyl group, the pyrrolidinyl group, the piperazinyl group, the azetidinyl group, the morpholinyl group, the —C(O)-morpholinyl group, the —O—($C_1$-$C_3$ alkyl)-morpholinyl group, or

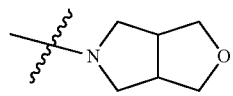 [SMILES: *N1CC2COCC2C1]

is unsubstituted or substituted with any one substituent selected from
a halogen, a hydroxy group, an acetyloxy group, a $C_1$-$C_3$ alkyl group, a halo $C_1$-$C_3$ alkyl group, a $C_1$-$C_3$ alkylamino group, a $C_1$-$C_3$ dialkylamino group, a $C_3$-$C_6$ cycloalkyl($C_1$-$C_3$ alkyl)amino group, a $C_1$-$C_3$ alkoxy group, a halo $C_1$-$C_3$ alkoxy group, a $C_1$-$C_3$ alkoxy$C_1$-$C_6$ alkyl group, a $C_3$-$C_6$ cycloalkyl group, and a halo $C_3$-$C_6$ cycloalkyl group;

forms a piperidinyl group, a pyrrolidinyl group, piperazinyl group, azepanyl group, a diazaspiro[3,3]heptanyl group, a diazaspiro[3.5]nonanyl group, a diazaspiro[4.4]nonanyl group, a diazaspiro[4.5]decanyl group, a diazaspiro[5.5]undecanyl group, a diazabicyclononanyl group, a tetrahydro-1H-furo[3,4-c]pyrrolyl group, an octahydro-6H-pyrrolo[2,3-c]pyridinyl group, a pyridinyl group, a pyridazinyl group, a pyrimidinyl group, a pyrazinyl group, a pyrazolyl group, an azabicyclo[3.2.1]octanyl group, and a diazabicyclo[3.3.1]nonanyl group;
$R^6$(s) are each independently any one selected from hydrogen, a halogen, a cyano group, a hydroxy group, a nitro group, an amino group, a $C_1$-$C_6$ alkyl group, a halo $C_1$-$C_6$ alkyl group, a $C_1$-$C_6$ alkylhydroxy group, a $C_1$-$C_6$ alkoxy group, a halo $C_1$-$C_6$ alkoxy group, a $C_1$-$C_3$ alkylamino group, a $C_1$-$C_3$ dialkylamino group, a $C_3$-$C_6$ cycloalkylamino group, and a halo $C_1$-$C_3$ alkylamino group;
k is an integer from 0 to 4, wherein, when k is 2 or more, two or more $R^1$(s) are identical to or different from each other;
m is an integer from 0 to 4, wherein, when m is 2 or more, two or more $R^2$(s) are identical to or different from each other; and
n is an integer from 0 to 6, wherein, when n is 2 or more, two or more $R^6$(s) are identical to or different from each other.

8. The compound of claim 1, wherein the compound is selected from compounds represented by Formula 2, and tautomers, stereoisomers, solvates, and pharmaceutically acceptable salts thereof:

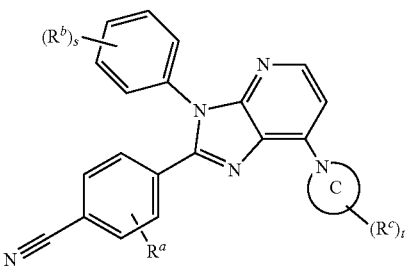

Formula 2 wherein, in Formula 2,

is any one selected from a piperidinyl group, a pyrrolidinyl group, an azepanyl group, a furo[3,4-c]-pyrrolyl group, a pyrrolo[2,3-c]pyridinyl group, and an azabicyclo $C_5$-$C_{10}$ alkanyl group;
$R^a$(s) are each independently hydrogen, fluorine, chlorine, bromine, iodine, a $C_1$-$C_3$ alkyl group, or a $C_1$-$C_3$ alkoxy group;
$R^b$(s) are each independently any one selected from hydrogen, a halogen, a cyano group, a hydroxy group, an acetyloxy group, a thiol group, a $C_1$-$C_6$ alkyl group, a halo $C_1$-$C_6$ alkyl group, a $C_2$-$C_6$ alkenyl group, a $C_1$-$C_6$ alkylhydroxy group, a $C_2$-$C_6$ alkenylhydroxy group, a $C_1$-$C_6$ alkoxy group, a halo $C_1$-$C_6$ alkoxy group, a $C_3$-$C_6$ cycloalkyl group, a $C_3$-$C_6$ cycloalkoxy group, a piperidinyl group, a pyrrolidinyl group, a piperazinyl group, an azetidinyl group, a morpholinyl group, a —C(O)-morpholinyl group, a —O—($C_1$-$C_3$ alkyl)-morpholinyl group,

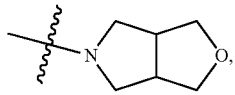 [SMILES: *N1CC2COCC2C1]

—N($Q_{13}$)($Q_{14}$), —C(O)N($Q_{13}$)($Q_{14}$), and —O—($C_1$-$C_6$ alkyl)-N($Q_{13}$)($Q_{14}$),
wherein $Q_{13}$ and $Q_{14}$ are each independently any one selected from hydrogen, a $C_1$-$C_6$ alkyl group, a $C_2$-$C_6$ alkenyl group, a halo $C_1$-$C_6$ alkyl group, a $C_1$-$C_6$ alkylhydroxy group, a $C_1$-$C_6$ alkylamino group, a $C_2$-$C_6$ alkenylamino group, a $C_1$-$C_6$ alkoxy group, a halo $C_1$-$C_6$ alkoxy group, a $C_3$-$C_6$ cycloalkyl group, and a $C_3$-$C_6$ heterocycloalkyl group, each of which may be unsubstituted or substituted with any one substituent selected from a hydroxy group, an amino group, a $C_1$-$C_3$ alkyl group, and a $C_1$-$C_3$ alkoxy group;
when $R^b$ is a piperidinyl group, a pyrrolidinyl group, a piperazinyl group, an azetidinyl group, a morpholinyl group, a —C(O)-morpholinyl group, a —O—($C_1$-$C_3$ alkyl)-morpholinyl group, or,

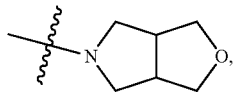 [SMILES: *N1CC2COCC2C1]

the piperidinyl group, the pyrrolidinyl group, the piperazinyl group, the azetidinyl group, the morpholinyl group, the —C(O)-morpholinyl group, the —O—(C₁-C₃ alkyl)-morpholinyl group, or

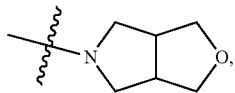 [SMILES: *N1CC2COCC2C1]

is unsubstituted or substituted with any one substituent selected from a halogen, a $C_1$-$C_3$ alkyl group, a halo $C_1$-$C_3$ alkyl group, a $C_1$-$C_3$ alkylamino group, a $C_1$-$C_3$ dialkylamino group, a $C_1$-$C_3$ alkoxy group, a halo $C_1$-$C_3$ alkoxy group, and a $C_1$-$C_3$ alkoxy $C_1$-$C_3$ alkyl group;
wherein, when $R^b$ is a $C_1$-$C_6$ alkyl group, a $C_2$-$C_6$ alkenyl group, or —N($Q_{13}$)($Q_{14}$), two or more $R^b$(s) are fused with a phenyl group to which they are linked to form

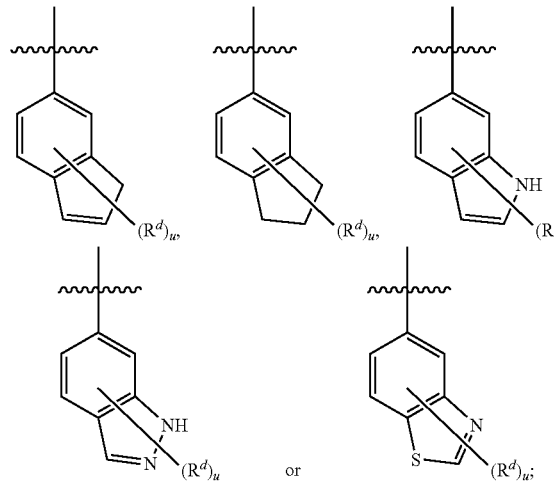

$R^c$(s) are each independently any one selected from hydrogen, an amino group, a $C_1$-$C_3$ alkyl group, a halo $C_1$-$C_6$ alkyl group, a $C_1$-$C_3$ alkylamino group, a $C_1$-$C_3$ dialkylamino group, a $C_1$-$C_3$ alkylhydroxy group, a $C_3$-$C_9$ cycloalkylamino group, and a $C_3$-$C_6$ cycloalkyl ($C_1$-$C_3$ alkyl)amino group;
$R^d$(s) are each independently hydrogen, a $C_1$-$C_3$ alkyl group, or a halo $C_1$-$C_6$ alkyl group;
s is an integer from 0 to 2;
t is an integer from 1 to 2, and
u is an integer from 0 to 6.

9. The compound of claim 1, wherein the compound is selected from Compounds 1 to 76, and tautomers, stereoisomesr, solvates, and pharmaceutically acceptable salts thereof:
1) 4-(7-(3-aminopiperidine-1-yl)-3-(p-tolyl)-3H-imidazo[4,5-b]pyridine-2-yl)benzonitrile
2) 4-(7-(3-aminopyrrolidine-1-yl)-3-(4-cyclopropylphenyl)-3H-imidazo[4,5-b]pyridine-2-yl)benzonitrile
3) 4-(7-(4-aminopiperidine-1-yl)-3-(4-cyclopropylphenyl)-3H-imidazo[4,5-b]pyridine-2-yl)benzonitrile
4) 4-(3-(4-cyclopropylphenyl)-7-(3-(methylamino)piperidine-1-yl)-3H-imidazo[4,5-b]pyridine-2-yl)benzonitrile
5) 4-(7-(3-aminopiperidine-1-yl)-3-(4-cyclopropylphenyl)-3H-imidazo[4,5-b]pyridine-2-yl)benzonitrile
6) 4-(7-(3-aminopiperidine-1-yl)-3-(4-fluoro-phenyl)-3H-imidazo[4,5-b]pyridine-2-yl)-2-fluorobenzonitrile
7) 4-(7-(3-aminopiperidine-1-yl)-3-(2-fluoro-4-methylphenyl)-3H-imidazo[4,5-b]pyridine-2-yl)-2-fluorobenzonitrile
8) 4-(7-(3-aminoazepane-1-yl)-3-(4-cyclopropylphenyl)-3H-imidazo[4,5-b]pyridine-2-yl)-2-fluorobenzonitrile
9) 4-(7-(3-aminopiperidine-1-yl)-3-(4-(piperidine-1-yl)phenyl)-3H-imidazo[4,5-b]pyridine-2-yl)-2-fluorobenzonitrile
10) 4-(7-(3-aminopiperidine-1-yl)-3-(2-fluoro-4-(piperidine-1-yl)phenyl)-3H-imidazo[4,5-b]pyridine-2-yl)-2-fluorobenzonitrile
11) 4-(7-(3-aminopiperidine-1-yl)-3-(4-cyclopropyl-2-fluorophenyl)-3H-imidazo[4,5-b]pyridine-2-yl)-2-fluorobenzonitrile
12) 2-fluoro-4-(7-(3-(methylamino)piperidine-1-yl)-3-(4-(pyrrolidine-1-yl)phenyl)-3H-imidazo[4,5-b]pyridine-2-yl)benzonitrile
13) 4-(7-(3-aminopiperidine-1-yl)-3-(4-(pyrrolidine-1-yl)phenyl)-3H-imidazo[4,5-b]pyridine-2-yl)-2-fluorobenzonitrile
14) 4-(7-(3-aminopiperidine-1-yl)-3-(4-(dimethylamino)phenyl)-3H-imidazo[4,5-b]pyridine-2-yl)-2-fluorobenzonitrile
15) 4-(7-(3-amino-8-azabicyclo[3.2.1]octane-8-yl)-3-(p-tolyl)-3H-imidazo[4,5-b]pyridine-2-yl)-2-fluorobenzonitrile
16) 4-(7-(3-aminopiperidine-1-yl)-3-(o-tolyl)-3H-imidazo[4,5-b]pyridine-2-yl)-2-fluorobenzonitrile
17) 4-(7-(3-aminopiperidine-1-yl)-3-(m-tolyl)-3H-imidazo[4,5-b]pyridine-2-yl)-2-fluorobenzonitrile
18) 4-(7-(3-aminopiperidine-1-yl)-3-(4-cyclopropyl-2,6-difluorophenyl)-3H-imidazo[4,5-b]pyridine-2-yl)-2-fluorobenzonitrile
19) 4-(7-(3-aminopiperidine-1-yl)-3-(2,6-difluoro-4-(pyrrolidine-1-yl)phenyl)-3H-imidazo[4,5-b]pyridine-2-yl)-2-fluorobenzonitrile
20) 4-(7-(3-aminopiperidine-1-yl)-3-(3-fluoro-4-methoxyphenyl)-3H-imidazo[4,5-b]pyridine-2-yl)-2-fluorobenzonitrile
21) 4-(7-(3-aminopiperidine-1-yl)-3-(4-(diethylamino)phenyl)-3H-imidazo[4,5-b]pyridine-2-yl)-2-fluorobenzonitrile
22) 4-(7-(3-aminopiperidine-1-yl)-3-(4-(cyclopropyl(methyl)amino)phenyl)-3H-imidazo[4,5-b]pyridine-2-yl)-2-fluorobenzonitrile
23) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
24) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
25) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
26) 4-(7-(3-aminopiperidine-1-yl)-3-(4-(3,3-difluoropyrrolidine-1-yl)-2-fluorophenyl)-3H-imidazo[4,5-b]pyridine-2-yl)-2-fluorobenzonitrile
27) 4-(7-(3-aminopiperidine-1-yl)-3-(2-fluoro-4-(pyrrolidine-1-yl)phenyl)-3H-imidazo[4,5-b]pyridine-2-yl)-2-fluorobenzonitrile
28) 4-(7-(3-aminopiperidine-1-yl)-3-(p-tolyl)-3H-imidazo[4,5-b]pyridine-2-yl)-2-fluorobenzonitrile
29) 4-(7-(3-aminopiperidine-1-yl)-3-phenyl-3H-imidazo[4,5-b]pyridine-2-yl)-2-fluorobenzonitrile 30) 4-(7-(3-aminopiperidine-1-yl)-3-(4-cyclopentyloxy)-2-fluorophenyl)-3H-imidazo[4,5-b]pyridine-2-yl)-2-fluorobenzonitrile
31) 4-(7-(3-aminopiperidine-1-yl)-3-(2-fluoro-4-(3-methoxyazetidine-1-yl)phenyl)-3H-imidazo[4,5-b]pyridine-2-yl)-2-fluorobenzonitrile
32) 1-(4-(7-(3-aminopiperidine-1-yl)-2-(4-cyano-3-fluorophenyl)-3H-imidazo[4,5-b]pyridine-3-yl)-3-fluorophenyl)pyrrolidine-3-yl acetate
33) 4-(7-(3-aminopiperidine-1-yl)-3-(2-fluoro-4-morpholinophenyl)-3H-imidazo[4,5-b]pyridine-2-yl)-2-fluorobenzonitrile
34) 4-(7-(3-aminopiperidine-1-yl)-3-(2-fluoro-4-methylpiperazine-1-yl)phenyl)-3H-imidazo[4,5-b]pyridine-2-yl)-2-fluorobenzonitrile
35) 4-(7-(3-aminopiperidine-1-yl)-3-(2-fluoro-4-(3-hydroxypyrrolidine-1-yl)phenyl)-3H-imidazo[4,5-b]pyridine-2-yl)-2-fluorobenzonitrile
36) 4-(7-(3-aminopiperidine-1-yl)-3-(4-(3-chloropyrrolidine-1-yl)-2-fluorophenyl)-3H-imidazo[4,5-b]pyridine-2-yl)-2-fluorobenzonitrile
37) 4-(7-(3-aminopiperidine-1-yl)-3-(3-(2-morpholinoethoxy)phenyl)-3H-imidazo[4,5-b]pyridine-2-yl)-2-fluorobenzonitrile
38) 4-(7-(3-aminopiperidine-1-yl)-3-(4-(morpholino-4-carbonyl)phenyl)-3H-imidazo[4,5-b]pyridine-2-yl)-2-fluorobenzonitrile
39) 4-(7-(3-aminopiperidine-1-yl)-3-(4-3-ethoxypyrrolidine-1-yl)-2-fluorophenyl)-3H-imidazo[4,5-b]pyridine-2-yl)-2-fluorobenzonitrile
40) 4-(7-(3-aminopiperidine-1-yl)-3-(4-hydroxyphenyl)-3H-imidazo[4,5-b]pyridine-2-yl)-2-fluorobenzonitrile
41) 4-(7-(3-aminopiperidine-1-yl)-3-(4-cyanophenyl)-3H-imidazo[4,5-b]pyridine-2-yl)-2-fluorobenzonitrile
42) 4-(7-(3-aminopiperidine-1-yl)-3-(2,3-dihydro-1H-indene-5-yl)-3H-imidazo[4,5-b]pyridine-2-yl)-2-fluorobenzonitrile
43) 4-(7-(3-aminopiperidine-1-yl)-3-(4-isopropylphenyl)-3H-imidazo[4,5-b]pyridine-2-yl)-2-fluorobenzonitrile
44) 4-(7-(3-aminopiperidine-1-yl)-3-(1-methyl-1H-indole-5-yl)-3H-imidazo(4,5-b)pyridine-2-yl)-2fluorobenzonitrile
45) 4-(7-(3-aminopiperidine-1-yl)-3-(5-methylpyridine-2-yl)-3H-imidazo[4,5-b]pyridine-2-yl)-2-fluorobenzonitrile
46) 4-(7-(3-aminopiperidine-1-yl)-3-(4-cyclohexylphenyl)-3H-imidazo[4,5-b]pyridine-2-yl)-2-fluorobenzonitrile
47) 4-(7-(3-aminopiperidine-1-yl)-3-(3-vinylphenyl)-3H-imidazo[4,5-b]pyridine-2-yl)-2-fluorobenzonitrile
48) 4-(7-(3-aminopiperidine-1-yl)-3-(4-((3-methoxypropyl)(methyl)amino)phenyl)-3H-imidazo[4,5-b]pyridine-2-yl)-2-fluorobenzonitrile
49) 4-(7-(3-aminopiperidine-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile
50) 4-(7-(3-aminopiperidine-1-yl)-3-cyclohexyl-3H-imidazo[4,5-b]pyridine-2-yl)-2-fluorobenzonitrile
51) 4-(7-(3-aminopiperidine-1-yl)-3-(4-hexylphenyl)-3H-imidazo[4,5-b]pyridine-2-yl)-2-fluorobenzonitrile
52) 4-(7-(3-aminopiperidine-1-yl)-3-(2-fluoro-4-(3-methoxypyrrolidine-1-yl)phenyl)-3H-imidazo[4,5-b]pyridine-2-yl)-3-fluorobenzonitrile
53) 4-(7-(3-aminopiperidine-1-yl)-3-(2-fluoro-4-(3-methoxypyrrolidine-1-yl)phenyl)-3H-imidazo[4,5-b]pyridine-2-yl)-3-methoxybenzonitrile
54) 4-(7-(3-aminopiperidine-1-yl)-3-(1-methyl-1H-pyrrolo[2,3-b]pyridine-5-yl)-3H-imidazo[4,5-b]pyridine-2-yl)-2-fluorobenzonitrile
55) 4-(7-(3-aminopiperidine-1-yl)-3-(1-methyl-1H-indazole-5-yl)-3H-imidazo[4,5-b]pyridine-2-yl)-2-fluorobenzonitrile
56) 4-(7-(3-aminopiperidine-1-yl)-3-(2-fluoro-4-3-methoxypiperidine-1-yl)phenyl)-3H-imidazo[4,5-b]pyridine-2-yl)-2-fluorobenzonitrile
57) 4-(7-(3-aminopiperidine-1-yl)-3-(4-(3-(dimethylamino)pyrrolidine-1-yl)-2-fluorophenyl)-3H-imidazo[4,5-b]pyridine-2-yl)-2-fluorobenzonitrile
58) 4-(7-(3-aminopiperidine-1-yl)-3-(benzo[d]thiazole-5-yl)-3H-imidazo[4,5-b]pyridine-2-yl)-2-fluorobenzonitrile
59) 4-(7-3-aminopiperidine-1-yl)-3-(2-fluoro-4-(3-(methoxymethyl)pyrrolidine-1-yl)phenyl)-3H-imidazo[4,5-b]pyridine-2-yl)-2-fluorobenzonitrile
60) 2-fluoro-4-(3-(2-fluoro-4-(3-methoxypyrrolidine-1-yl)phenyl)-7-(2,8-diazaspiro[4.5]decane-8-yl)-3H-imidazo[4,5-b]pyridine-2-yl)benzonitrile
61) 2-fluoro-4-(3-(2-fluoro-4-(3-methoxypyrrolidine-1-yl)phenyl)-7-(octahydro-6H-pyrrolo[2,3-c]pyridine-6-yl)-3H-imidazo[4,5-b]pyridine-2-yl)benzonitrile
62) 4-(7-(3-aminopiperidine-1-yl)-3-(2-fluoro-4-(3-methoxypyrrolidine-1-yl)phenyl)-3H-imidazo[4,5-b]pyridine-2-yl)-2-fluorobenzonitrile
63) 4-(7-(3-amino-8-azabicyclo[3.2.1]octane-8-yl)-3-(2-fluoro-4-(3-methoxypyrrolidine-1-yl)phenyl)-3H-imidazo[4,5-b]pyridine-2-yl)-2-fluorobenzonitrile
64) 4-(7-(3-aminopyrrolidine-1-yl)-3-(2-fluoro-4-(3-methoxypyrrolidine-1-yl)phenyl)-3H-imidazo[4,5-b]pyridine-2-yl)-2-fluorobenzonitrile
65) 2-fluoro-4-(3-(2-fluoro-4-(3-methoxypyrrolidine-1-yl)phenyl)-7-(2,7-diazaspiro[4.4]nonane-2-yl)-3H-imidazo[4,5-b]pyridine-2-yl)benzonitrile
66) 2-fluoro-4-(3-(2-fluoro-4-(3-methoxypyrrolidine-1-yl)phenyl)-7-(2,7-diazaspiro[3.5]nonane-7-yl)-3H-imidazo[4,5-b]pyridine-2-yl)benzonitrile
67) 4-(7-(3-aminoazepane-1-yl)-3-(2-fluoro-4-(3-methoxypyrrolidine-1-yl)phenyl)-3H-imidazo[4,5-b]pyridine-2-yl)-2-fluorobenzonitrile
68) 2-fluoro-4-(3-(2-fluoro-4-(3-methoxypyrrolidine-1-yl)phenyl)-7-(tetrahydro-1H-furo[3,4-c]pyrrole-5(3H)-yl)-3H-imidazo[4,5-b]pyridine-2-yl)benzonitrile
69) 2-fluoro-4-(3-(2-fluoro-4-(3-methoxypyrrolidine-1-yl)phenyl)-7-(2,6-diazaspiro[3.3]heptane-2-yl)-3H-imidazo[4,5-b]pyridine-2-yl) benzonitrile
70) 2-fluoro-4-(3-(2-fluoro-4-(3-methoxypyrrolidine-1-yl)phenyl)-7-(3,9-diazaspiro[5.5]undecan-3-yl)-3H-imidazo[4,5-b]pyridine-2-yl) benzonitrile
71) 4-(7-(3,7-diazabicyclo[3.3.1]nonane-3-yl)-3-(2-fluoro-4-(3-methoxypyrrolidine-1-yl)phenyl)-3H-imidazo[4,5-b]pyridine-2-yl)-2-fluorobenzonitrile
72) 2-fluoro-4-(3-(2-fluoro-4-(3-methoxypyrrolidine-1-yl)phenyl)-7-(4-methylpiperazine-1-yl)-3H-imidazo[4,5-b]pyridine-2-yl)benzonitrile
73) 4-(7-(3-aminoazepane-1-yl)-3-(2-fluoro-4-(tetrahydro-1H-furo[3,4-c]pyrrole-5(3H)-yl)phenyl)-3H-imidazo[4,5-b]pyridine-2-yl)-2-fluorobenzonitrile
74) 4-(7-(aminoazepane-1-yl)-3-(2-fluoro-4-(3-methoxymethyl)pyrrolidine-1-yl)phenyl)-3H-imidazo[4,5-b]pyridine-2-yl)-2-fluorobenzonitrile
75) 4-(7-(3-(aminomethyl)piperidine-1-yl)-3-(2-fluoro-4-(3-methoxypyrrolidine-1-yl)phenyl)-3H-imidazo[4,5-b]pyridine-2-yl)-2-fluorobenzonitrile 76) 1-(2-(4-cyano-3-fluorophenyl)-3-(2-fluoro-4-(3-methoxypyrrolidine-1-yl)phenyl)-3H-imidazo[4,5-b]pyridine-7-yl)piperidine-2-carbonitrile.

10. A pharmaceutical composition comprising: as an active ingredient, the compound selected from compounds, tautomers, stereoisomers, solvates, and pharmaceutically acceptable salts thereof according to claim 1; and a pharmaceutically acceptable carrier.

11. The pharmaceutical composition of claim 10, wherein the pharmaceutical composition is formulated into tablets, pills, powder, capsules, syrup, an emulsion, or a microemulsion.

* * * * *